(12) United States Patent
Totani et al.

(10) Patent No.: US 6,969,100 B2
(45) Date of Patent: Nov. 29, 2005

(54) MOUNTING STRUCTURE AND MOUNTING METHOD FOR VEHICLE INTERIOR PARTS

(75) Inventors: Chiharu Totani, Aichi (JP); Shuji Inui, Aichi (JP); Hidenori Yokoyama, Aichi (JP); Hiroyuki Tajima, Aichi (JP); Takeshi Hosokawa, Aichi (JP); Hikaru Ando, Aichi (JP); Mitsuyoshi Ohno, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/437,040

(22) Filed: May 14, 2003

(65) Prior Publication Data

US 2003/0234549 A1    Dec. 25, 2003

(30) Foreign Application Priority Data

| May 14, 2002 | (JP) | ............................ P2002-139010 |
| May 29, 2002 | (JP) | ............................ P2002-156239 |
| Nov. 5, 2002 | (JP) | ............................ P2002-320605 |
| Feb. 21, 2003 | (JP) | ............................ P2003-044883 |

(51) Int. Cl.$^7$ .............................................. B60N 3/02
(52) U.S. Cl. .................... 296/1.02; 296/214; 16/110.1; 248/222.12
(58) Field of Search ................................ 296/214, 1.02, 296/97.9; 16/110.1, DIG. 40, DIG. 41; 248/222.12, 248/222.13

(56) References Cited

U.S. PATENT DOCUMENTS

| 4,981,323 | A | * | 1/1991 | Dowd et al. ................. 296/214 |
| 5,507,545 | A | * | 4/1996 | Krysiak ...................... 296/97.9 |
| 5,662,375 | A | * | 9/1997 | Adams et al. ............... 296/214 |
| 5,920,957 | A | * | 7/1999 | Wagner ....................... 16/408 |
| 6,106,055 | A | * | 8/2000 | Fischer ........................ 296/214 |
| 6,141,837 | A | * | 11/2000 | Wisniewski .................. 24/295 |
| 6,176,660 | B1 | * | 1/2001 | Lewis et al. .................. 411/45 |
| 6,220,645 | B1 | * | 4/2001 | Jacquemin ............... 296/97.12 |
| 6,415,478 | B1 | * | 7/2002 | Watanabe et al. ............. 16/444 |
| 6,428,089 | B1 | * | 8/2002 | Noda .......................... 296/214 |
| 6,616,222 | B1 | * | 9/2003 | Ponceau ..................... 296/214 |
| 6,668,424 | B1 | * | 12/2003 | Allen et al. ................... 16/444 |

FOREIGN PATENT DOCUMENTS

| JP | A-H3-279035 | 12/1991 |
| JP | A-2001-114006 | 4/2001 |
| JP | A-2002-52969 | 2/2002 |

* cited by examiner

Primary Examiner—Dennis H. Pedder
(74) Attorney, Agent, or Firm—Posz Law Group, PLC

(57) ABSTRACT

A clip engages an assist grip with an engaging portion of the clip engaged with a clip insertion hole of an attachment part. The assist grip is mounted to a body panel by engaging a first locking pawl of the clip with a rear surface of the body panel, and engaging a second locking pawl of the clip with a front surface of the body panel. A pressure plug is fitted into a rear end gap portion of the clip when a cap on the attachment part is closed.

9 Claims, 40 Drawing Sheets

MOUNTING STRUCTURE AND MOUNTING METHOD FOR VEHICLE INTERIOR PARTS

BACKGROUND OF THE INVENTION

1. Field of the Invention

The present invention relates to a mounting structure and a mounting method for a vehicle interior part, which is mounted in a compartment of the vehicle.

2. Description of the Related Art

As one of the vehicle interior parts to be mounted in a compartment of an automobile, there is an assist grip, which is used by a person sitting on the seat of the automobile for maintaining his/her posture, for example.

Japanese Patent Publications Nos. 2002-52969 and 2001-114006 etc. disclose the conventional attaching structures of such the assist grips.

FIG. 58 shows an example of the mounting method for mounting an assist grip 9 to a body panel 4 of the automobile by fixing clips 93 to a fixing member 92 provided at both ends of the assist grip 9 via screws 95, and engaging the clip 93 into a panel hole 41 formed on the body panel 4 to mount the assist grip 9 on the body panel 4.

In this mounting method, the clip 93 of a shape having a pair of left and right leg portions 930, which are connected only at the distal ends 901 thereof, and folded portions 939 formed by folding the pair of leg portions 930 at the rear ends thereof is employed. The folded portion 939 is formed with an engagement hole 933.

Each leg portion 930 includes a first locking pawl 931 for engaging aback surface 402 of the body panel 4 when being inserted into a panel hole 41 formed on the body panel 4. The folded portion 939 at the rear end includes a second locking pawl 932 for engaging a front surface 401 of the body panel 4.

When mounting the assist grip 9 on the body panel 4, the clip 93 is fixed to the fixing member 92 of the assist grip 9 via the screw 95 in a first place. In this case, the screw 95 is passed through a through hole 922 formed on the fixing member 92 and a threaded portion 951 is screwed into the engagement hole 933 of the clip 93.

Subsequently, the clip 93 is inserted into the panel hole 41 and then the first locking pawl 931 and the second locking pawl 932 engage the peripheral edge of the panel hole 41 on the body panel 4. Accordingly, the assist grip 9 fixed with the clip 93 is attached onto the body panel 4. Subsequently, a cap 921 is mounted on the fixing member 92 of the assist grip 9 so as to cover the screw 95 from the front.

In this manner, the assist grip 9 is mounted on the body panel 4 via the clip 93.

In a mounting method described above, in the case of maintenance, the assist grip 9 is removed from the body panel 4 by removing the screw 95 from the clip 93.

However, since the clip 93 is not designed for removal, which is, so-called, a disposable type, when the assist grip 9 is removed from the body panel 4, the clip 93 stays on the body panel 4. Therefore, when replacement of the clip 93 is necessary, the operator must break the clip 93 forcedly to remove it, and this is a laborious work.

As described above, the clip 93 is fixed to the assist grip 9 via the screw 95. Therefore, when mounting and dismounting the assist grip 9 to/from the body panel 4, the screw 95 must be attached or detached every time, which is also a laborious work.

Engagement between the screw 95 and the clip 93 is achieved by engaging between a pair of screw threads 955 of the threaded portion 951 and the peripheral edge of the engagement hole 933 of the clip 93. Therefore, for example, when a large load is exerted onto the assist grip 9, a load is exerted at the peripheral edge of the engagement hole 933 of the clip 93 in the direction of thickness. Therefore, the clip 93 is subjected to deformation, and thus the mounting method of the assist grip 9 is not superior in terms of strength.

Further, in the assist grip disclosed in Japanese Patent Publication No. JP-A-2001-114006 as well, removal of the base member is not considered. In addition, according to the assist grip disclosed in JP-A-2001-114006, for example, when engagement of the locking pawl is released by a strong impact exerted from the outside thereon, the assist grip may come off the body panel.

On the other hand, the assist grip in the related art is mounted to the body panel in the compartment by a weld nut and a screw so as to be capable of drawing out (for example, Japanese Patent Publication No. JP-A-3-279035).

For example, as shown in FIG. 59 as an example of the related art, an assist grip 891 includes engaging members 912 each formed with an elongated hole 913 thereon at both ends thereof. The engaging member 912 is mounted to a body panel 904 by being placed on a base member 892, disposing a spacer 895 and a retainer 896 on the upper surface thereof, inserting a screw 893 through screw holes formed on the base member, the engaging member, the spacer and the retainer, respectively, and screwing the screw 893 into a weld nut 894 welded on the body panel. The engaging member 912 is pressed against the upper surface of the base member 892 via the spacer 895 and the retainer 896 so as to be capable of a sliding movement between the base portion and the spacer, and thus the assist grip can be pulled out from the stored state.

In this manner, the assist grip in the related art is mounted to the weld nut on the body panel via a screw. The body panel is assembled to a main frame of the automobile, and the working space around there is small.

Therefore, in order to assemble the assist grip, it is necessary to turn the screw in the small working space, and thus the assembling performance of the assist grip is not good.

SUMMARY OF THE INVENTION

In view of such problems in the related art, the present invention is intended to provide a mounting structure and a mounting method for a vehicle interior part, in which both of the vehicle interior part and the clip can easily be mounted and dismounted to/from the body panel, and a high degree of mounting strength is achieved. In other words, the interior part such as an assist grip is prevented from coming off the body panel even when, for example, a strong impact is abruptly exerted from the outside thereon.

Further the invention is directed to provide a mounting structure in which the pullout type assist grip can easily be assembled.

According to the invention, there is provided a mounting structure of a vehicle interior part on a panel, comprising:

a clip having a pair of leg portions connected at a distal end thereof so as to be resiliently deformable, forming a rear end gap portion at a rear end thereof;

wherein the clip is inserted into a panel hole formed on the panel and a clip insertion hole formed in the vehicle interior part, and a pressure plug is fitted into the rear end gap portion of the clip to thereby prevent narrowing a gap formed between the pair of leg portions from narrowing.

In a mounting structure according to the present invention, the vehicle interior part is mounted to the body panel using the clip including the pair of leg portions having the engaging portion and the locking device. In other words, in the mounting structure of the present invention, part of the vehicle interior part and the body panel are clamped between the locking device and the engaging portion by engaging the locking device of the clip with the portion of the body panel in the vicinity of the panel hole, and engaging the engaging portion of the clip with the peripheral edge of the clip insertion hole of the vehicle interior part.

In the rear end gap portion of the clip is fitted with the pressure plug, so as to prevent the rear end gap portion from narrowing. Therefore, the engaging portion of the clip is prevented from coming off the peripheral edge of the clip insertion hole of the vehicle interior part, and thus engagement of the engaging portion can be maintained in a stable state. In addition, the rear end gap portion is not narrowed, the locking device of the clip does not come off the portion of the body panel in the vicinity of the panel hole, and engagement of the locking device can be maintained in a stable state.

Therefore, the clip and the vehicle interior part are integrated via the pressure plug, and thus a stable mounting state of the vehicle interior part to the body panel is achieved. Therefore, according to the mounting structure of the present invention, a high degree of mounting strength of the vehicle interior part with respect to the body panel is achieved.

The pressure plug and the rear ends of the clip are covered by the cap. Therefore, the cap can improve the design performance of the appearance of the vehicle interior part and prevent the pressure plug from dropping out from the rear end gap portion.

In the present invention, when mounting the vehicle interior part onto the body panel, the vehicle interior part having the clip attached thereon can be mounted to the body panel through one-touch operation.

Therefore, when mounting the vehicle interior part onto the body panel, the mounting operation can be performed easily while avoiding necessity of turning the screw in a state in which the workability is not good.

When it is necessary to remove the vehicle interior part for maintenance, for example, after removing the pressure plug, the clip can be resiliently deformed by pinching the rear ends of the pair of leg portions to narrow the rear end gap portion. Therefore, both of the vehicle interior part and the clip can be removed from the body panel by removing the locking device of the clip from the portion in the vicinity of the panel hole.

Therefore, according to the mounting structure of the present invention, both of the vehicle interior part and the clip can easily be mounted dismounted to/from the body panel.

The other aspect of the invention is a method of mounting a vehicle interior part to a body panel, including the steps of:

providing a clip having a pair of left and right leg portions connected only at the distal ends thereof, the leg portion including a locking device for engaging the portion of the body panel in the vicinity of a panel hole and an engaging portion for engaging the peripheral edge of a clip insertion hole formed on the vehicle interior part;

inserting the distal end of the clip into the clip insertion hole on the vehicle interior part and engaging the engaging portion with the peripheral edge;

mounting the vehicle interior part to the body panel by engaging the locking device of the clip with the portion of the body panel in the vicinity of the panel hole;

fitting a pressure plug into a rear end gap portion formed between the rear ends of the pair of leg portions of the clip for preventing narrowing of the rear end gap portion; and covering the pressure plug and the rear ends of the clip is covered by a cap.

In a method of mounting a vehicle interior part of the present invention, a screw is not used as in the related art. Therefore, attachment and detachment of the clip with respect to the vehicle interior part can easily be made, and thus attachment and detachment of the vehicle interior part with respect to the body panel can also be made easily. Therefore, according to the mounting method of the present invention, both of the vehicle interior part and the clip can easily be attached and detached to/from the body panel.

In a mounting structure obtained from the mounting method of the present invention, a high degree of mounting strength of the vehicle interior part with respect to the body panel is obtained by a combination of the clip and the pressure plug.

Preferably, in a mounting structure of a vehicle interior part according to the invention, an interior panel is disposed on the front surface of the body panel, a reinforcing plate having a through hole, which is in communication with the clip insertion hole, is disposed on the opposing surface of the vehicle interior part, which opposes the body panel, the reinforcing plate includes a body contact portion that comes into contact with the body panel, the distal end of the clip is also inserted into the through hole on the reinforcing plate, the opposing surface of the vehicle interior part abuts against the interior panel, and the body contact portion of the reinforcing plate abuts against the body panel.

In this arrangement, the vehicle interior part is mounted to the body panel and the interior panel in a state in which the opposing surface is brought into contact with the interior panel and the body contact portion of the reinforcing plate is brought into contact with the body panel. In other words, the vehicle interior part abuts against both of the interior panel and the body panel. Therefore, the vehicle interior part is prevented from being unsteady with respect to the interior panel and the body panel.

Therefore, in this arrangement, the mounting strength of the vehicle interior part with respect to the body panel and the interior panel can be improved by fitting of the pressure plug into the rear end gap portion, and abutment between the opposing surface and the interior panel and between the body contact portion and the body panel.

Preferably, the locking devices formed on the respective leg portions of the clip includes a first locking pawl, which is inserted into the panel hole on the body panel and engages the back surface of the body panel, and a second locking pawl, which engages the front surface of the body panel.

In this arrangement, the mounting strength of the vehicle interior part can further be improved by clamping the body panel between the first locking pawl and the second locking pawl on the clip.

Preferably, the pressure plug is formed integrally on the back surface of the cap.

Preferably, the cap is integrally formed with the attachment part in which the clip insertion hole is formed via a hinge.

In this arrangement, the cap can be attached to and detached from the vehicle interior part by rotating the cap around the hinge. Therefore, the cap can easily be attached to and detached from the vehicle interior part.

In addition, since the cap and the pressure plug do not come off the vehicle interior part, it almost never happens to lose the cap and the pressure plug.

The vehicle interior part may be an assist grip.

In this case, the superior mounting structure of the vehicle interior part can be realized in the assist grip.

Preferably, the assist grip includes a body member and an attachment part rotatably disposed at both ends of the body member, and the attachment part includes the clip insertion hole.

In this arrangement, the assist grip can be mounted to the body panel via the attachment part by engaging the clip into the clip insertion hole on the attachment part. Therefore, the assist grip can rotatably mounted to the body panel.

Preferably, the pressure plug is formed of a plurality of plate strips to be inserted between the rear ends of the pair of leg portions of the clip.

In this arrangement, a function to prevent the rear end gap portion of the clip from narrowing can easily be added to the pressure plug, and the pressure plug can be reduced in weight. In this arrangement, surface sink (distortion generated by shrinkage of a molding material during molding operation) may be prevented from occurring on the surface of the cap.

In the method of mounting a vehicle interior part according to the invention, the locking device provided on the leg portion of the clip preferably includes a first locking pawl, which is inserted into the panel hole on the body panel and engages the back surface of the body panel, and a second locking pawl, which engages the front surface of the body panel.

In this arrangement, the mounting strength of the vehicle interior part can further be improved by clamping the body panel between the first locking pawl and the second locking pawl of the clip.

Preferably, the pressure plug is integrally formed with the back surface of the cap, the pressure plug and the rear ends of the clip are covered by the cap and, simultaneously the pressure plug is fitted into the rear end gap portion.

In this arrangement, fitting and removal of the pressure plug can be performed by attaching and detaching the cap to/from the vehicle interior part. Therefore, fitting and removal of the pressure plug is facilitated.

Preferably, the cap is formed integrally with the attachment part via a hinge, and the pressure plug and the rear ends of the clip are covered by rotating the cap around the hinge.

In this arrangement, the cap can be attached to and detached from the vehicle interior part by rotating the cap around the hinge. Therefore, attachment and detachment of the cap to/from, the vehicle interior part is facilitated.

Since the cap and the pressure plug do not come off the vehicle interior part, it almost never happens to lose the cap and the pressure plug.

The vehicle interior part may be the assist grip.

In this arrangement, the superior method of mounting the vehicle interior part can be realized in the assist grip.

Preferably, the assist grip includes the body member and the attachment part rotatably disposed at both ends of the body member, and the attachment part includes the clip insertion hole.

In this arrangement, the assist grip can be mounted to the body panel via the attachment part by engaging the clip into the clip insertion hole on the attachment part. Therefore, the assist grip can be mounted rotatably to the body panel.

Preferably, the pressure plug is formed of a plurality of plate strips to be inserted between the rear ends of the pair of leg portions of the clip.

In this arrangement, a function to prevent the rear end gap portion of the clip from narrowing can easily be added to the pressure plug, and the pressure plug can be reduced in weight. In this arrangement, surface sink (distortion generated by shrinkage of a molding material during molding operation) may be prevented from occurring on the surface of the cap or on the surface of a second cushion.

The mounting structure and the mounting method of the vehicle interior part may be applied to various interior parts other than the assist grip, as a vehicle interior part.

For example, it is applicable to interior parts, which are built in the ceiling, such as a sun visor, a coat hook, a register, and a room lamp.

In the invention, at least one of the leg portions may include a detachment prevention pawl formed thereon at the position closer to the distal end with respect to the main locking pawl so as to project outwardly of the leg portion, the assist grip is mounted to the body panel by inserting the distal end of the clip into a clip insertion hole formed on the attachment part and the panel hole formed on the body panel to engage the main locking pawl with the peripheral edge of the panel hole, and engaging the engaging portion of the clip with the portion in the vicinity of the clip insertion hole, and a pressure plug for preventing a rear end gap portion from narrowing is fitted into a gap formed between the rear ends of the pair of leg portions of the clip.

In the mounting structure of the present invention, the assist grip is mounted to the body panel using the clip including the pair of leg portions each having the engaging potion and the main locking pawl.

In other words, according to the mounting structure of the present invention, the attachment part and the body panel are clamped between the main locking pawl and the engaging portion by engaging the main locking pawl of the clip with the peripheral edge of the panel hole on the body panel, and engaging the engaging portion of the clip with the attachment part at the portion in the vicinity of the clip insertion hole.

In addition, the detachment prevention pawl is formed on at least one of the leg portions of the clip. The detachment prevention pawl is formed at the position closer to the distal end with respect to the main locking pawl, and it is inserted into the panel hole in a state in which the assist grip is mounted on the body panel.

When a strong impact or the like is exerted on the assist grip from the outside, and thus engagement of the main locking pawl with the peripheral edge of the panel hole is released, the detachment prevention pawl can be engaged with the peripheral edge of the panel hole.

Therefore, according to the mounting structure of the present invention, the assist grip is prevented from coming off the body panel unexpectedly even when a strong impact is exerted on the assist grip from the outside.

In the present invention, preferably, the pair of leg portions each include a distal end guide member, which is obliquely formed so as to expand outward from the distal end thereof toward the rear end, and a hole-facing portion, which faces an inner wall surface of the clip insertion hole, and the engaging portion is formed by bending the hole-facing portion outwardly of the pair of leg portions, the main locking pawl is formed so as to extend from the rear end of the distal end guide member, and the detachment prevention pawl is formed on the distal end guide member.

In this arrangement, the distal end of the clip can easily be inserted into the clip insertion hole and the panel hole by the distal end guide member. In addition, the main locking pawl can easily be formed by extending it from the rear end of the distal end guide member.

In addition, the hole-facing portion engages the inner wall surface of the clip insertion hole and the engaging portion engages the portion in the vicinity of the clip insertion hole, and thus a high degree of connecting strength between the clip and the assist grip is achieved.

Preferably, a distance from the distal end of the detachment prevention pawl to the centerline between the pair of leg portions is less than a half the distance between the inner wall surfaces of the panel hole; which face toward the leg portions.

In this arrangement, the distal end of the clip can be inserted into the panel hole without interference between the detachment prevention pawl and the panel hole. Therefore, the detachment prevention pawl can be formed without deteriorating insertibility of the clip into the panel hole.

In the invention, the assist grip may include joint members formed at the both ends thereof and covered by a cap formed separately from the assist grip, and at least one of the joint members is fixed to the body panel via the clip, the joint member includes:
a thin-plate sliding portion formed integrally with the body member of the assist grip at both ends thereof and formed with an elongated hole so as to be capable of moving by a predetermined distance,
a base member, which is formed separately from the assist grip, includes an inner surface on which the sliding portion is slidably placed, and formed with a hole, through which the clip can be inserted, and
a pressing member, which is formed separately from the assist grip and presses and holds the sliding portion;
the sliding portion is clamped between the base member and the pressing member via the clip,
the clip includes a pair of leg portions, the opening of which can be varied by its resilient deformation, and an engaging portion engaged with the body panel so as to prevent the clip from coming off, and is inserted into and fitted to a hole on the joint member and into a hole formed on the body panel in advance at the position where the assist grip is mounted.

In other words, in the mounting structure of the present invention, the sliding portion is clamped between the base member and the pressing member via the clip and then the clip is inserted into the hole formed on the joint member, so that the clip is integrated with the assist grip, and then inserted into and fixed to the hole formed on the body panel at the position where the assist grip is mounted through one-touch operation.

Therefore, when mounting the assist grip on the body panel, it is not necessary to turn the screw within a narrow space, and mounting operation can easily be performed only by insertion.

After the assist grip is mounted, since the sliding portion is slidable in a state of being clamped between the base member and the pressing member via the clip, the assist grip can easily be pulled out from the stored state in the compartment.

When the assist grip has to be removed, for example, for maintenance, the clip can be resiliently deformed by pinching the pair of leg portions. Therefore, the clip can easily be pulled out by releasing engagement with respect to the hole formed on the body panel at the position where the assist grip is mounted. As a consequence, according to the mounting structure of the present invention, the assist grip, the base member, and the pressing member can all easily be attached to and detached from the body panel.

A locking device that contributes to maintain the state of being pulled out from the stored state is formed integrally with one side of the elongated hole of the sliding portion, and the pressing member is formed with an engaged portion that the locking device can engage.

In this arrangement, the state of being pulled out can stably be maintained by engagement of locking device formed integrally with the sliding portion with the engaged portion on the pressing member when the assist grip is pulled out to the maximum extent possible. Since the locking device is formed integrally with the sliding member, it is not necessary to provide a separate locking means, and thus the holding structure can be simplified.

The pressure plug is integrally formed with the cap inside the cap.

In this arrangement, since necessity to provide clip retaining means separately is eliminated by forming the pressure plug integrally with the cap, and the pressure plug can be formed simultaneously with the cap, increase in number of components can be prevented. The cap can detachably disposed with respect to the joint member, and thus the pressure plug can be fitted in or removing from between the leg portions by attaching and detaching the cap with respect to the joint member.

Further, at both ends of the assist grip of the invention, the cushion member may be coupled to the joint members.

The pressure plug can be provided on a cap for covering the cushion member and the clip.

In this case, the pressure plug can be formed by utilizing the cap.

In this case, for example, the cap can be disposed detachably with respect to the cushion member, and by attaching and detaching the cap with respect to the cushion member, the pressure plug can be fitted into and pulled out from the rear end gap portion.

The cushion member includes a first cushion formed with the clip insertion hole, and a second cushion connected with a joint member of the assist grip and formed with the pressure plug. The second cushion can be fixed to the first cushion in a state in which the pressure plug is fitted into the rear end gap portion of the clip inserted into the clip insertion hole on the first cushion.

In this arrangement, since the cushion member is divided into the first cushion and the second cushion, the assist grip mounting structure in which the pressure plug is fitted into the rear end gap portion of the clip is easily realized.

Preferably, at least one of the joint members at both ends of the assist grip is slidably connected to the cushion member by inserting a screw, which is engaged with the cushion member, into an elongated hole formed on the joint member.

In this arrangement, the joint member can easily be slid with respect to the cushion member using the elongated hole, and thus the assist grip can easily be pulled out.

The cushion member includes a recessed groove, in which the joint member of the assist grip can be accommodated, a pair of projections formed at the ends of the recessed groove, and a spacer for laying across the surfaces of the pair of projections. Preferably, the joint member of the assist grip is slidably connected to the cushion member by being stored in the recessed groove and clamped between the recessed groove and the spacer.

In this arrangement, by storing the joint member of the assist grip in the recessed groove of the cushion member and allowing it to slide therein, a stable sliding movement is realized. By clamping the joint member between the recessed groove of the cushion member and the spacer, a smooth sliding movement of the joint member is realized while preventing a load generated by tightening the screw from exerting directly on the joint member.

Preferably, the pressure plug is formed of a plurality of plate strips, which are inserted between the rear ends of a pair of leg portions of the clip.

In this arrangement, a function to prevent narrowing of the rear end gap portion of the clip may easily be provided on the pressure plug, and thus reduction in weight of the pressure plug maybe realized. In this arrangement, generation of surface sink (distortion generated by shrinkage of a molding material during molding operation) may be prevented from occurring on the surface of the cap or the surface of the second cushion.

The locking device formed on the leg portion of the clip includes a first locking pawl, which is inserted into the panel hole on the body panel and engaged with the back surface of the body panel, and a second locking pawl to be engaged with the front surface of the body panel.

In this arrangement, the mounting strength of the assist grip can further be increased by clamping the body panel between the first locking pawl and the second locking pawl on the clip.

Preferably, an interior panel is provided on the compartment side surface of the body panel and the assist grip is attached to the body panel by the clip, which passes through the through hole formed on the interior panel and engages with the panel hole formed on the body panel.

In this arrangement, even when the interior panel exists on the compartment side of the body panel, the assist grip can easily be attached to the body panel.

BRIEF DESCRIPTION OF THE DRAWINGS

FIGS. 6A and 6B are drawings showing the clip in Embodiment 1, in which FIG. 6A is a front view, and FIG. 6B is a side view.

DETAILED DESCRIPTION OF THE PREFERRED EMBODIMENTS

Figure 1:
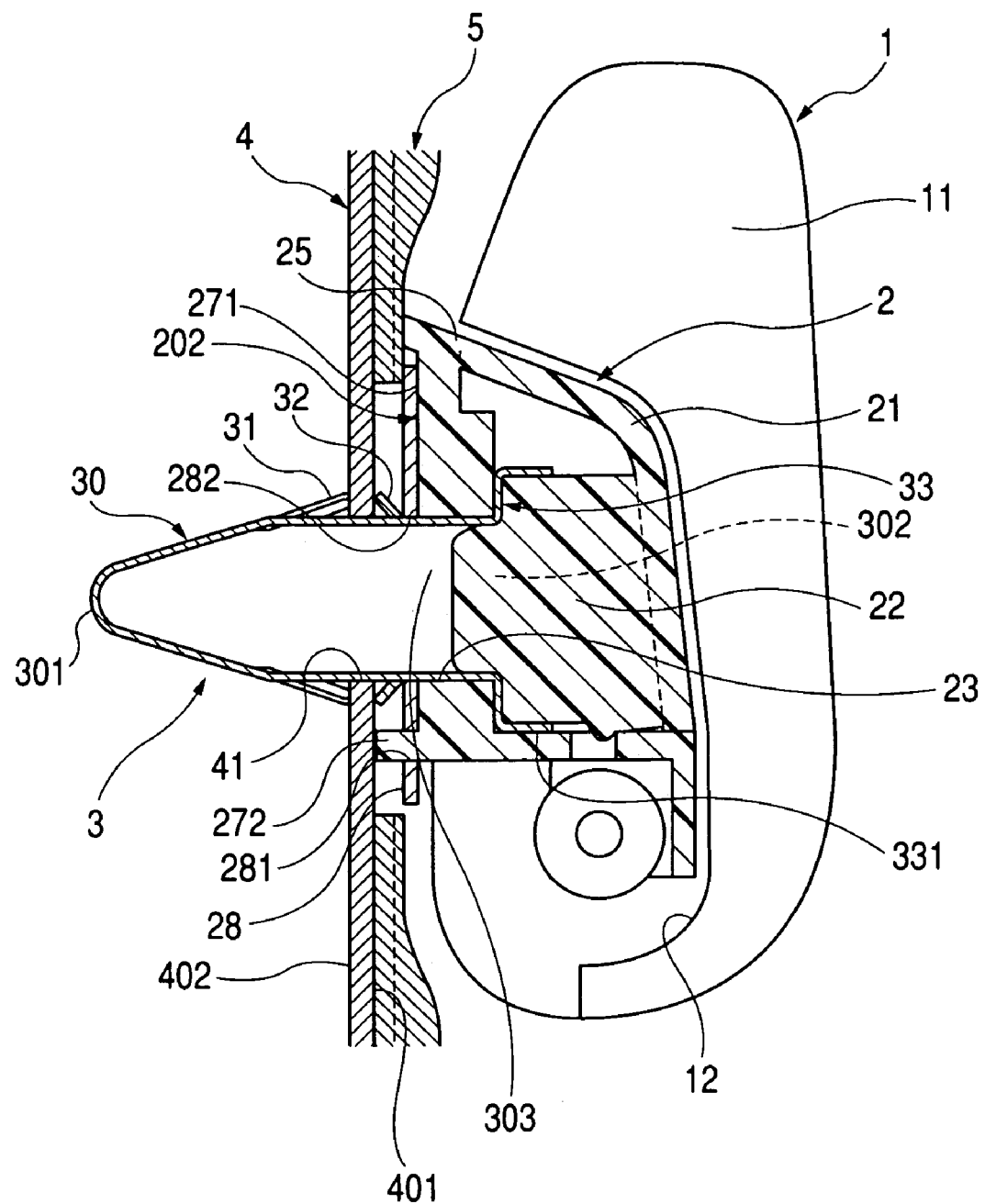
FIG. 1 is an explanatory cross-sectional view showing a mounting structure of an assist grip according to Embodiment 1.

Referring now to the drawings, embodiments of the present invention will be described.

(Embodiment 1)

Figure 2:
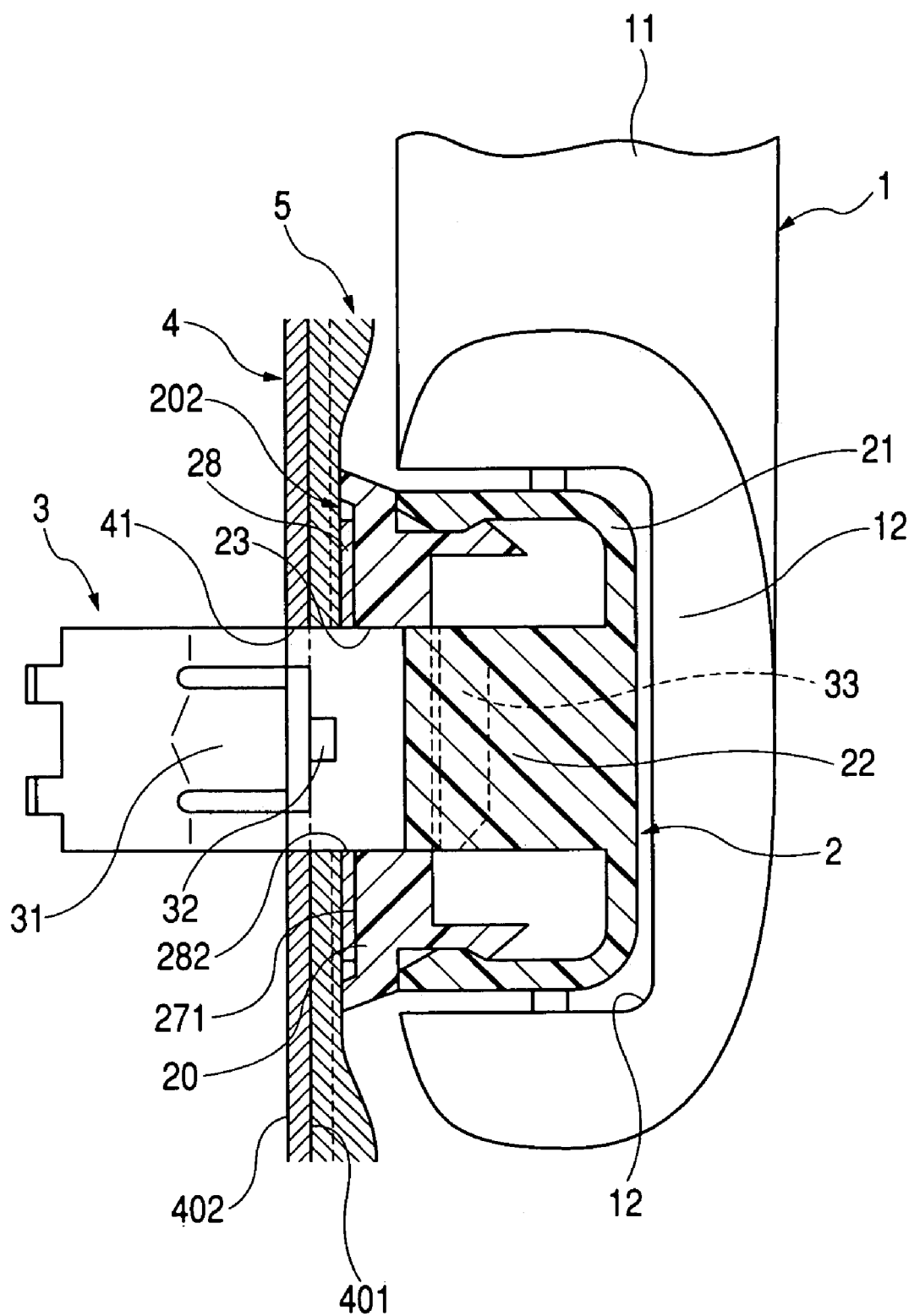
FIG. 2 is an explanatory cross-sectional view taken along the direction orthogonal to the explanatory cross-sectional view in FIG. 1, showing a mounting structure of the assist grip according to Embodiment 1.

As shown in FIG. 1 and FIG. 2, in a mounting structure of a vehicle interior part 1 in Embodiment 1, the vehicle interior part 1 is mounted to a body panel 4 via a clip 3.

The clip 3 includes a pair of left and right leg portions 30, which are connected only at the distal end 301 thereof. Each of the pair of left and right leg portions 30 includes a first locking pawl 31, which engages the back surface 402 of the body panel 4 when being inserted into a panel hole 41 (a hole for inserting the clip 3) formed on the body panel 4, a second locking pawl 32, which engages the front surface 401 of the body panel 4, and an engaging portion 33, which engages the peripheral edge of a clip insertion hole 23 formed on the vehicle interior part 1.

In the mounting structure described above, the clip 3 is engaged with the vehicle interior part 1 by engaging the engaging portion 33 of the clip 3 with the peripheral edge of the clip insertion hole 23 of the vehicle interior part 1. The vehicle interior part 1 is attached to the body panel 4 by engaging the first locking pawl 31 and the second locking pawl 32 of the clip 3 with the body panel 4.

In the clip 3, a pressure plug 22 is fitted into a rear end gap portion 303 formed between the rear ends 302 of the pair of leg portions 30 for preventing the rear end gap portion 303 302 from narrowing. The pressure plug 22 and the rear ends of the clip 3 are covered by a cap 21.

In Embodiment 1, a direction in which the rear end gap portion 303 narrows is referred to as a narrowing direction, or as inward, and a direction in which the rear end gap portion 303 expands is referred to as a expanding direction, or as outward.

Detailed description will now be given below.

Figure 3:
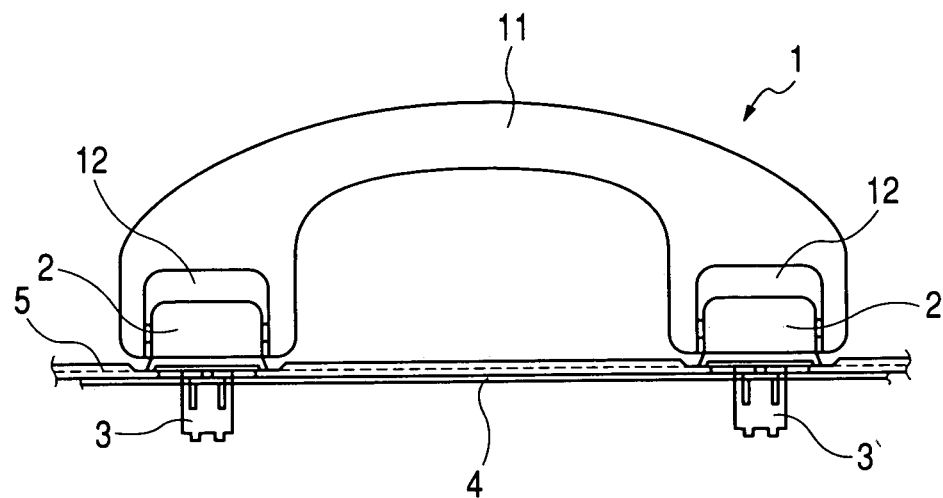
FIG. 3 is an explanatory drawing showing a state in which the assist grip is mounted to the body panel according to Embodiment 1.

As shown in FIG. 3, in Embodiment 1, the vehicle interior part 1 is an assist grip 1 used by a person sitting on the seat of the automobile for holding his/her posture. The assist grip 1 in this embodiment is mounted to the automobile having a curtain shield air bag mounted in a front pillar section or a roof side section of the body panel 4, which is located at a higher level than a side door in a compartment.

The assist grip 1 in Embodiment 1 includes a body member 11, and attachment parts 2 disposed at both ends of the body member 11. The attachment part 2 is rotatably mounted to the assist grip 1.

The assist grip 1 includes concave mounting recesses 12 on the body member at the positions where the attachment parts 2 is disposed.

Figure 4:
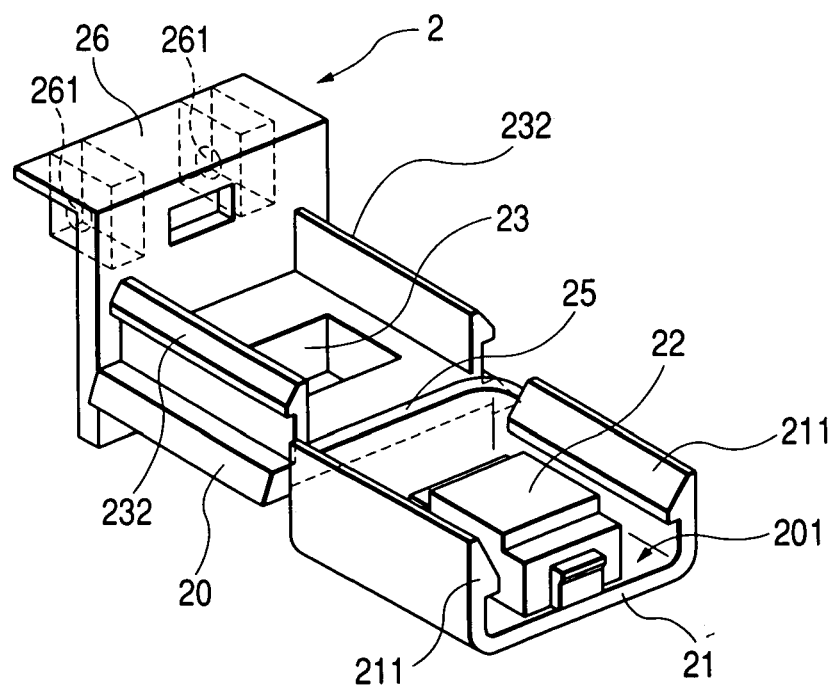
FIG. 4 is a perspective view showing an attachment part in Embodiment 1.

As shown in FIG. 4, in Embodiment 1, the clip insertion hole 23 is formed on the attachment part 2 for engaging the clip 3 with the attachment part 2.

The attachment part 2 includes a base portion 20 for fixing the clip 3 and an upright portion 26 standing upright from the end of the base portion 20. The upright portion 26 includes a pair of bearings 261 for engaging the attachment part 2 to the mounting recess 12 on the assist grip 1.

The base portion 20 includes a fixing notch 232 for fixing the clip insertion hole 23 and the cap 21 to the base portion 20.

In Embodiment 1, the pressure plug 22 is formed integrally with the cap 21 so as to stand upright on a back surface 201 of the cap 21. The cap 21 is formed integrally with the attachment part 2 on the side opposite from the upright portion 26 via a hinge 25. The cap 21 is adapted to rotate with respect to the base portion 20 around the hinge 25.

The cap 21 includes a projection 211, which engages the fixed notch 232 formed on the base portion 20. In this manner, the cap 21 can be fixed to the base portion 20 by means of engagement between the fixed notch 232 and the projection 211.

Figure 5:
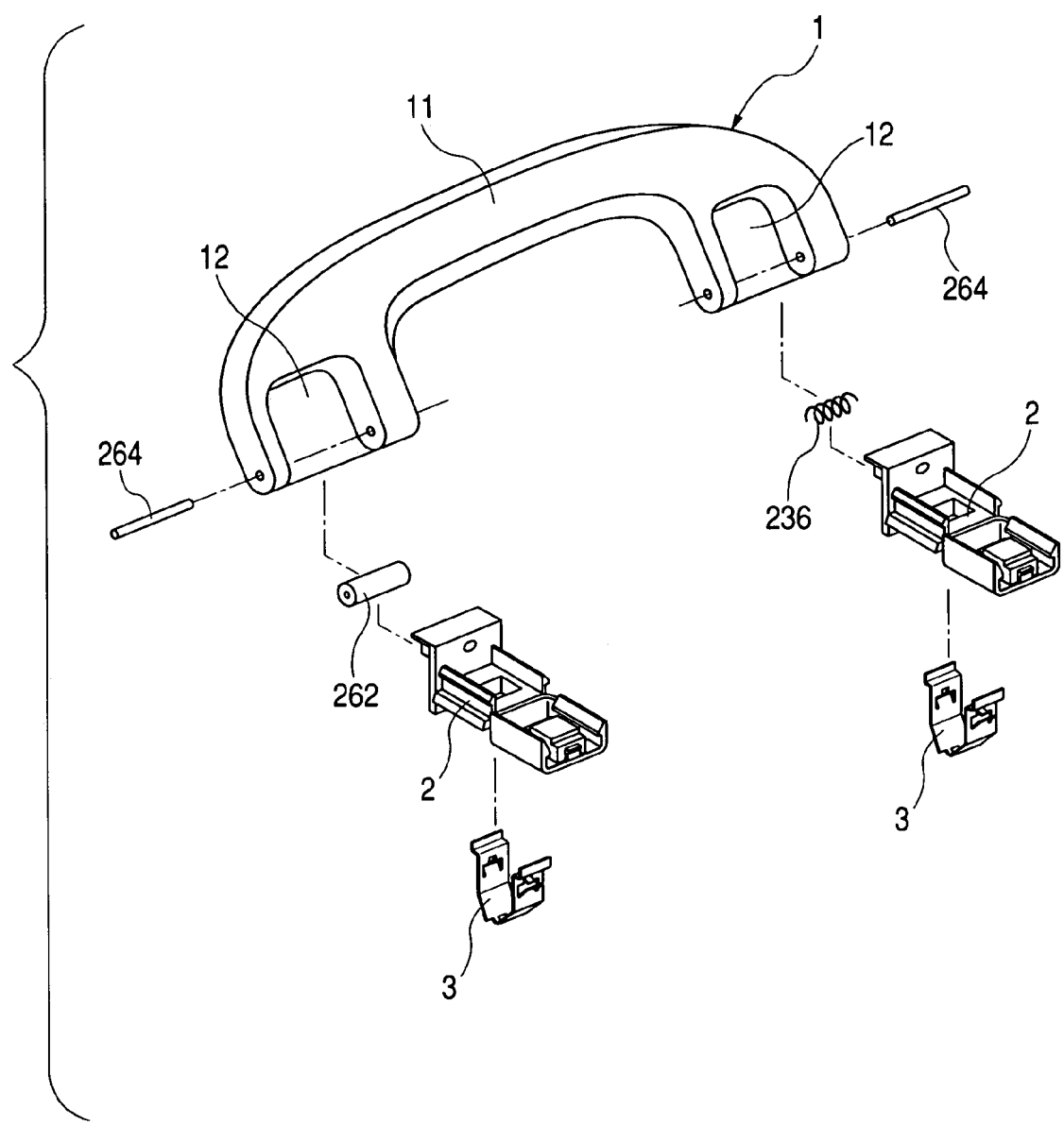
FIG. 5 is an explanatory perspective view showing an arrangement of the attachment part and a clip on the assist grip, according to Embodiment 1.

As shown in FIG. 5, the attachment part 2 is mounted to the assist grip 1 by inserting a shaft 264 into the pair of bearings 261 via a damper 262 or a spring 263, and then inserting the shaft 264 into the shaft holes formed on the assist grip 1.

In this manner, the assist grip 1 is adapted to rotate with respect to the body panel 4 via the attachment part 2.

Figure 6A:
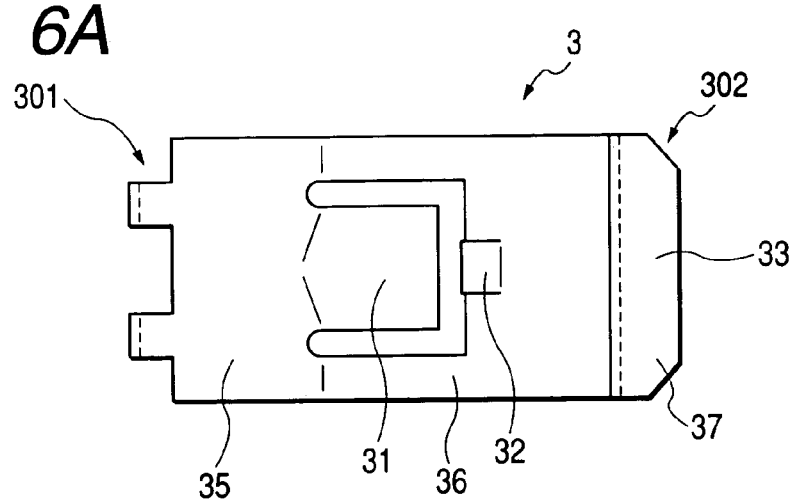
Figure 6B:
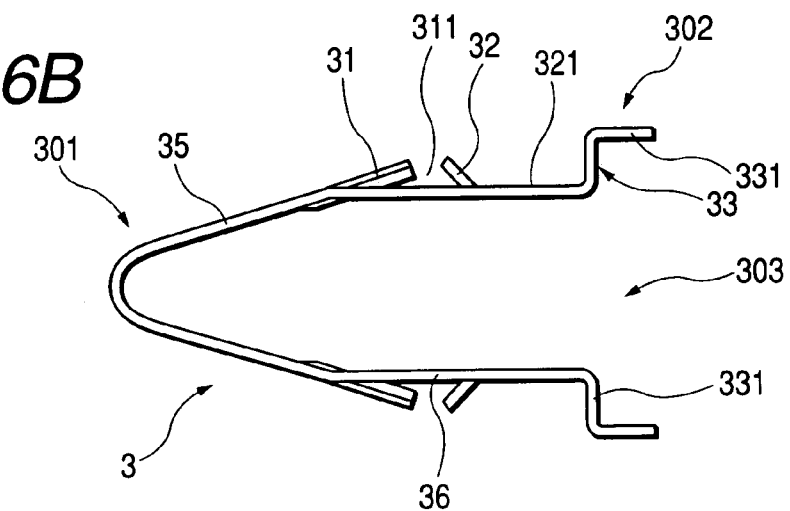
Figure 7:
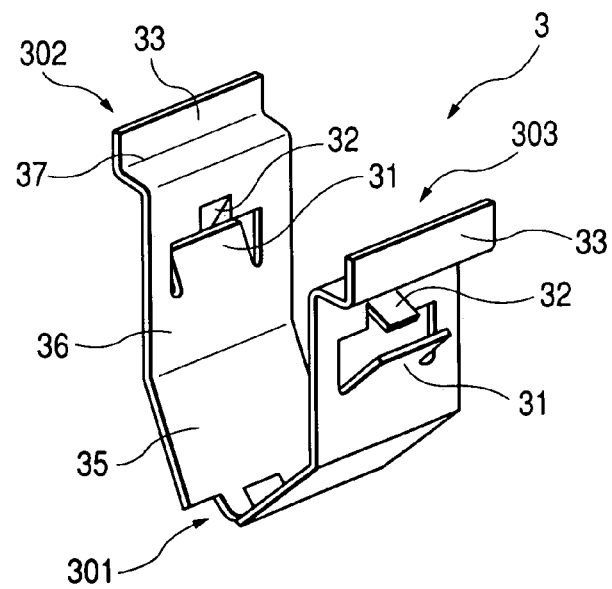
FIG. 7 is a perspective view showing the clip in Embodiment 1.

As shown in FIG. 6A, FIG. 6B and FIG. 7, the clip 3 is formed by bending a piece of metal plate, and the first locking pawl 31 and the second locking pawl 32 are formed by cutting and bending a portion of the metal plate outward. The clip 3 has the distal end 301 at the bent portion at the center.

The clip 3 includes a guiding portion 35 formed of a pair of bevels, parallel portions 36 continuing from the guiding portion 35 and including a pair of parallel planes, and engaging strips 331 formed by bending the parallel portions 36 outward by about 90°. The engaging portion 33 includes a engaging strip 331 and an engaging recess 321 formed by being surrounded by the engaging strip 331 and the second locking pawl 32. The distal end of the engaging strip 331 is further bent by 90°.

The first locking pawl 31 and the second locking pawl 32 are formed on the respective parallel portions 36. The second locking pawl 32 is formed at the position closer to the rear end 302 in comparison with the first locking pawl 31, and the first locking pawl 31 and the second locking pawl 32 project outward from the respective parallel portions 36.

The distance between the first locking pawl 31 and the second locking pawl 32 is substantially the same as the thickness of the body panel 4 so that it can engage the body panel 4 from both sides on the front and back.

When the clip 3 is engaged with the attachment part 2, the engaging recess 321 of the engaging portion 33 abuts against the clip insertion hole 23 formed on the base portion 20 of the attachment part 2. The width of the engaging recess 321 is substantially the same as the depth of the clip insertion hole 23.

As described above, the leg portions 30 of the clip 3 are connected only at the distal ends 301 thereof, and are opened at the rear ends 302. Therefore, the clip 3 is resiliently deformed inward, that is, in the narrowing direction by pinching the pair of engaging strips 331 inward.

As shown in FIG. 1 and FIG. 2, in Embodiment 1, an opposing surface 202 of the attachment part 2 of the assist grip 1 facing toward the body panel 4 is provided with a reinforcing plate 28 for enhancing the mounting strength of the attachment part 2 to the body panel 4. In this embodiment, the reinforcing plate 28 is formed of metal, and at least part of it is disposed in the recess 271 formed on the opposing surface 202.

The reinforcing plate 28 includes a through hole 282 in communication with the clip insertion hole 23 formed on the attachment part 2, and the clip 3 is inserted into the clip insertion hole 23 and the through hole 282.

The attachment part 2 includes a body contact portion 272 formed on a part of the opposing surface 202 so as to project from the opposing surface 202 for bringing the attachment part 2 into abutment against the body panel 4. The reinforcing plate 28 is assembled to the attachment part 2 by inserting the body contact portion 272 into an attachment hole 281 formed on the reinforcing plate 28.

In this example, an interior panel 5 considering the design performance is disposed on the front surface 401 of the body panel 4. The assist grip 1 is mounted to the body panel 4 and the interior panel 5 by bringing the opposing surface 202 into abutment against the interior panel 5 and the body contact portion 272 against the body panel 4.

A method of mounting the assist grip 1 to the body panel 4 will be described below.

Figure 8:
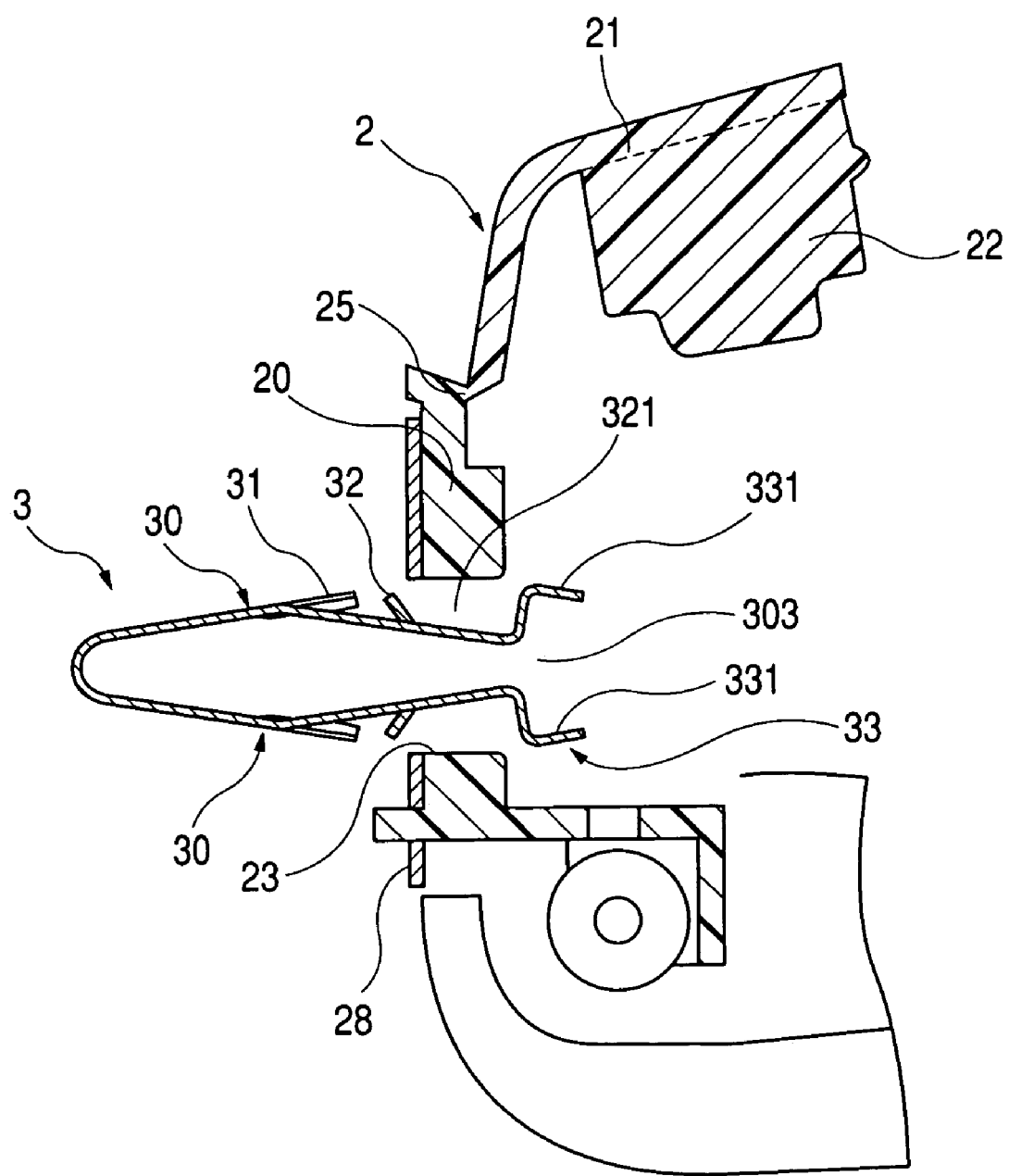
FIG. 8 is an explanatory cross-sectional view illustrating a method of mounting the assist grip, in which the clip is fixed to the attachment part provided on the assist grip according to Embodiment 1.

As shown in FIG. 8, the clip 3 is fixed to the attachment part 2, which is assembled to the assist grip 1. In this case, the clip 3 is resiliently deformed inward so as to narrow the rear end gap portion 303 by pinching the pair of engaging strips 331.

Figure 9:
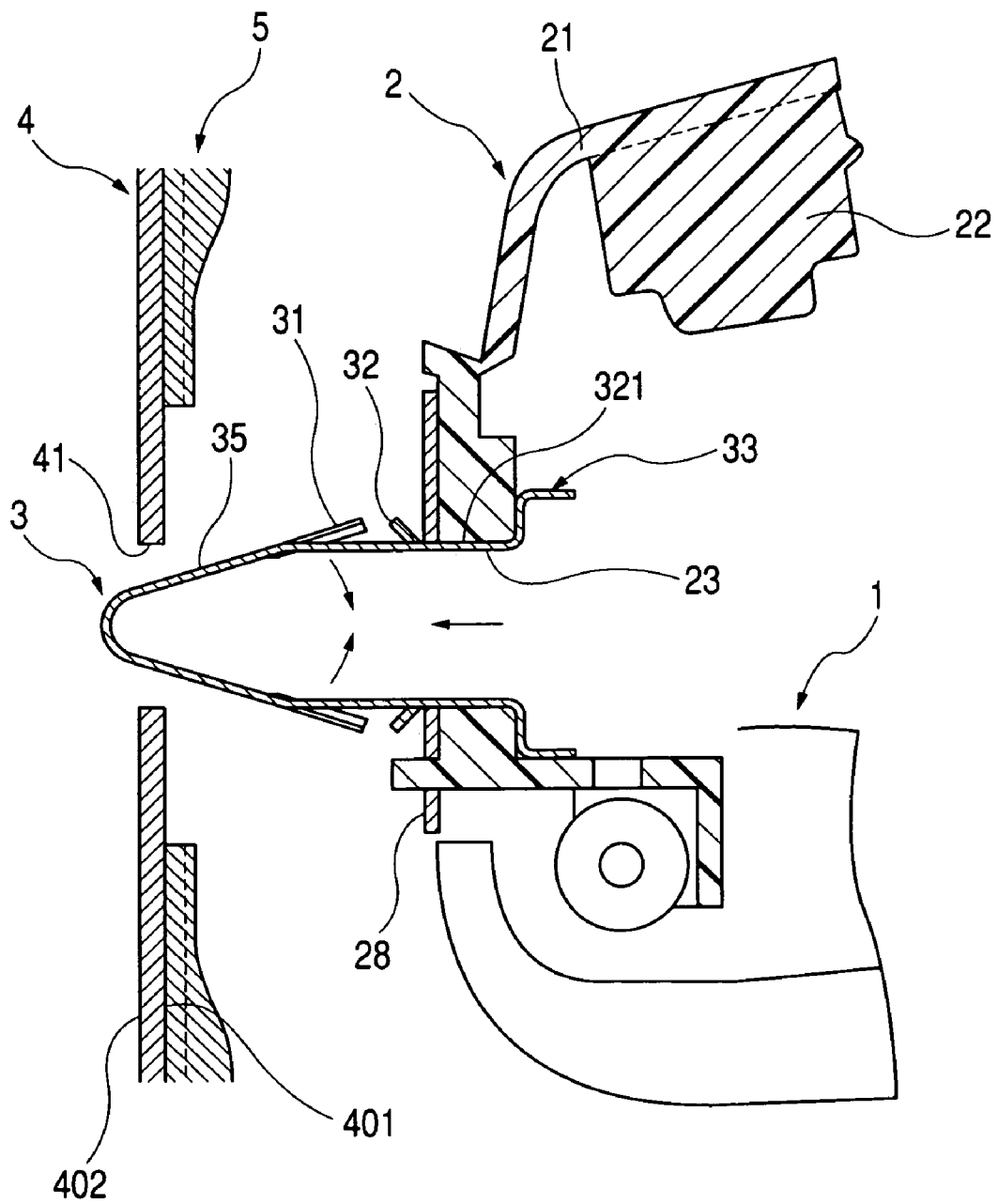
FIG. 9 is an explanatory cross-sectional view illustrating a method of mounting the assist grip, in which the assist grip fixed with the clip is being mounted to the body panel according to Embodiment 1.

Then, as shown in FIG. 9, after the guiding portion 35 of the clip 3 is passed through the clip insertion hole 23, the state in which the engaging strip 331 is pinched is released to restore the resilient deformation. At this moment, the engaging portion 33 of the clip 3 engages the peripheral edge of the clip insertion hole 23, and the engaging recess 321 abuts against the clip insertion hole 23, so that the clip 3 is attached to the attachment part 2.

When attaching the clip 3 to the attachment part 2, the cap 21 of the attachment part 2 is rotated via the hinge 25 to keep it in an opened state.

Subsequently, the assist grip 1 having the clip 3 fixed to the attachment part 2 is mounted to the body panel 4 in a state in which the interior panel 5 is assembled. In order to do so, the guiding portion 35 of the clip 3 is inserted into a panel hole 41 formed on the body panel 4. Then the guiding portion 35 abuts against the panel hole 41 and the pair of leg portions 30 deforms inward.

Figure 10:
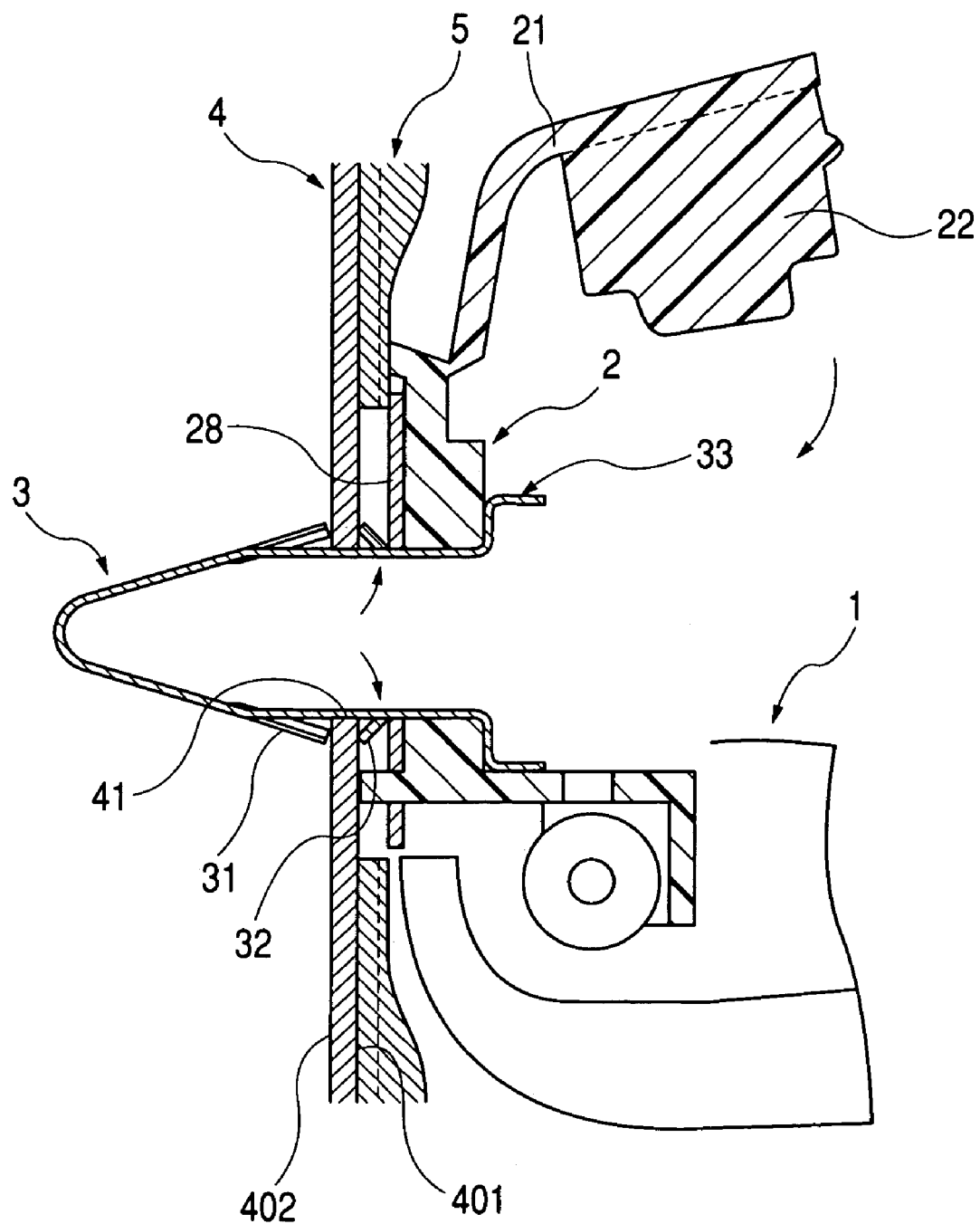
FIG. 10 is an explanatory cross-sectional view illustrating a method of mounting the assist grip, in which the assist grip fixed with the clip is being mounted to the body panel according to Embodiment 1.

As shown in FIG. 10, after the first locking pawl 31 of the clip 3 has passed through the panel hole 41, the inward resilient deformation of the leg portions is restored. Then, the first locking pawl 31 engages the back surface 402 of the body panel 4 and the second locking pawl 32 engages the front surface 401 of the body panel 4, so that the assist grip 1 is mounted to the body panel 4. In this manner, the assist grip 1 can easily be mounted to the body panel 4.

When inserting the guiding portion 35 of the clip 3 into the panel hole 41 of the body panel 4, the clip 3 maybe resiliently deformed by pinching the engaging strips 331 of the clip 3. In this case, the clip 3 can easily be inserted into the panel hole 41.

When mounting the assist grip 1 to the body panel 4, the cap 21 of the attachment part 2 is rotated via the hinge 25 in an opened state.

Subsequently, as shown in FIG. 1, the cap 21 provided on the attachment part 2 rotates around the hinge 25 to a closed position. In this case, the pressure plug 22 provided on the back surface 201 of the cap 21 is fitted into the rear end gap portion 303 of the clip 3.

In this manner, the clip 3 is covered by the cap 21, and mounting of the assist grip 1 to the body panel 4 is completed.

In this mounting structure of this embodiment, presence of the pressure plug 22 can prevent the width of the rear end gap portion 303 from being narrowed, and thus engagement between the engaging portion 33 of the leg portion 30 and the peripheral edge of the clip insertion hole 23 can be maintained in a stable state.

The clip 3 can be mounted to the body panel 4 by clamping the body panel 4 from both sides of the front surface 401 and the back surface 402. The pressure plug 22 prevents the rear end gap portion 303 from being narrowed. Therefore, disengagement of the first locking pawl 31 and the second locking pawl 32 due to narrowing of the gap between the left and right leg portions 30 may be prevented.

When the pressure plug 22 is fitted into the rear end gap portion 303, the clip 3 is pressed in the expanding direction by the pressure plug 22. Then the engaging recess 321 of the clip 3 can be brought into intimate contact with the clip insertion hole 23 of the attachment part 2.

Therefore, even when a large load is exerted onto the assist grip 1, for example, the clip 3 can receive the load by the entire surface, which is in intimate contact, and thus almost no deformation occurs.

As described above, the attachment part 2 is mounted to the body panel 4 and the interior panel 5 by bringing the opposing surface 202 into abutment against the interior panel 5 and the body contact portion 272 against the body panel 4. In other words, the assist grip 1 described above abuts against both of the interior panel 5 and the body panel 4. Therefore, the assist grip 1 may be prevented from being unsteady with respect to the interior panel 5 and the body panel 4.

Therefore, according to the mounting structure of this embodiment, the mounting strength of the assist grip 1 with respect to the body panel 4 and the interior panel 5 may be improved.

In the mounting structure of this embodiment, no screw, which is used in the related art, is used. Therefore, the clip 3 can easily attached to and detached from the assist grip 1.

In the mounting structure of this embodiment, the pressure plug 22 comes off the rear end gap portion 303 by opening the cap 21, which enables the clip 3 to be deformed resiliently in the narrowing direction. Therefore, in the case of maintenance, the assist grip 1 can easily be removed from the body panel 4 by resiliently deforming the clip 3 by pinching the engaging strips 331. In this arrangement, it is also easy to remove the clip 3 itself from the body panel 4 by resiliently deforming the clip.

Therefore, according to the mounting structure of the assist grip 1 of this embodiment, both of the assist grip 1 and the clip 3 can easily be mounted to and dismounted from the body panel 4.

The pressure plug 22 and the rear ends 302 of the clip 3 are covered by the cap 21. Therefore, the design performance of the appearance of the assist grip 1 is improved by the cap 21.

By fixing the cap 21 to the base portion 20 of the attachment part 2, the pressure plug 22 can be prevented from coming off the rear end gap portion 303.

Figure 11:
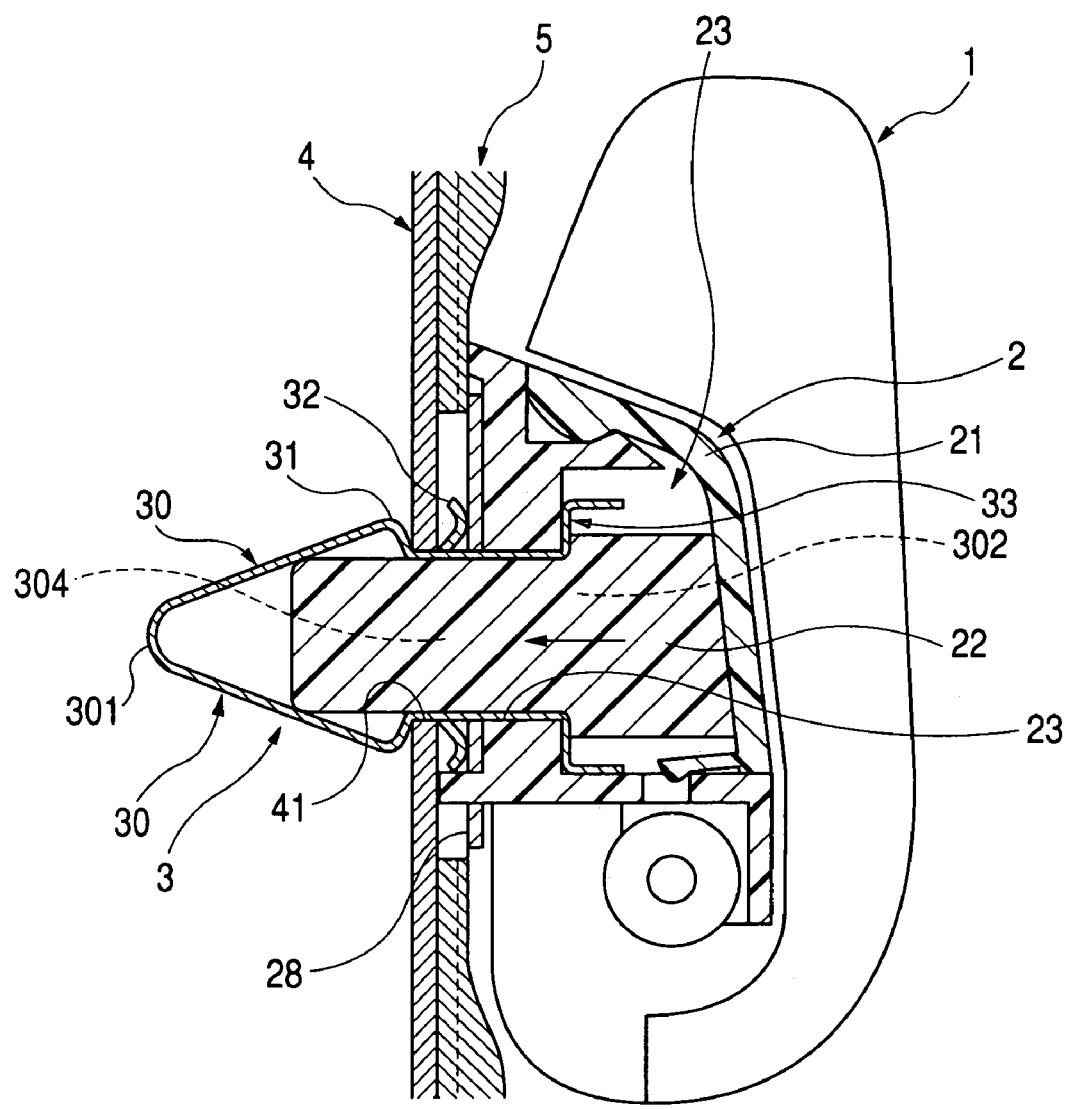
FIG. 11 is an explanatory cross-sectional view illustrating another mounting structure of the assist grip according to Embodiment 1.

In Embodiment 1, the pressure plug 22 is integrally provided with the cap 21. In contrast, as shown in FIG. 11, the pressure plug 22 and the cap 21 may be provided separately, as a matter of course. In this arrangement, since the pressure plug 22 is slid between the leg portions 30 and inserted from the rear ends 302 of the clip 3 toward the distal end 301, the pressure plug 22 may be formed into an elongated shape so as to reach the distal end 301.

In Embodiment 1, the first locking pawl 31 of the clip 3 is formed by cutting and opening the parallel portion 36. In contrast, the first locking pawl 31 may be bent into a projecting form, which is projecting outward from the rear end of the guiding portion 35, as shown in FIG. 11.

Figure 12:
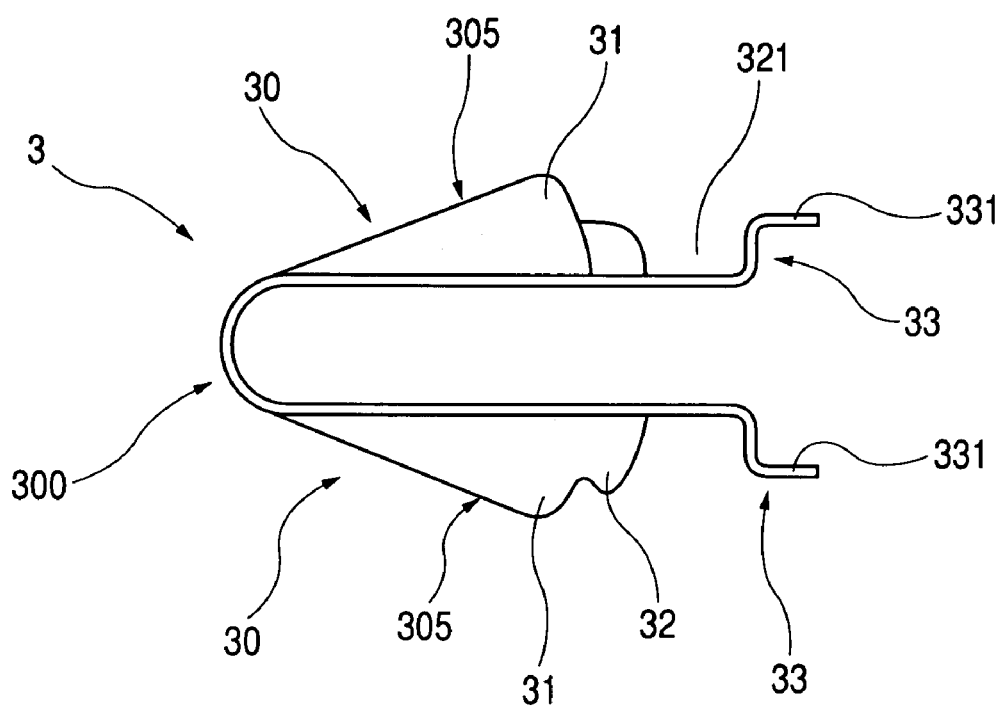
FIG. 12 is a side view showing another lip according to Embodiment 1.

In Embodiment 1, the clip 3 is formed by bending a piece of metal plate. In contrast, the clip 3 may be formed of a metal plate 300 and a resin portion 305 formed integrally with the metal plate 300 on the outside thereof, as shown in FIG. 12.

As shown in the same figure, the second locking pawl 32 does not have to be provided on both of the leg portions 30, but may be formed only on one leg portion 30.

(Embodiment 2)

Figure 13:
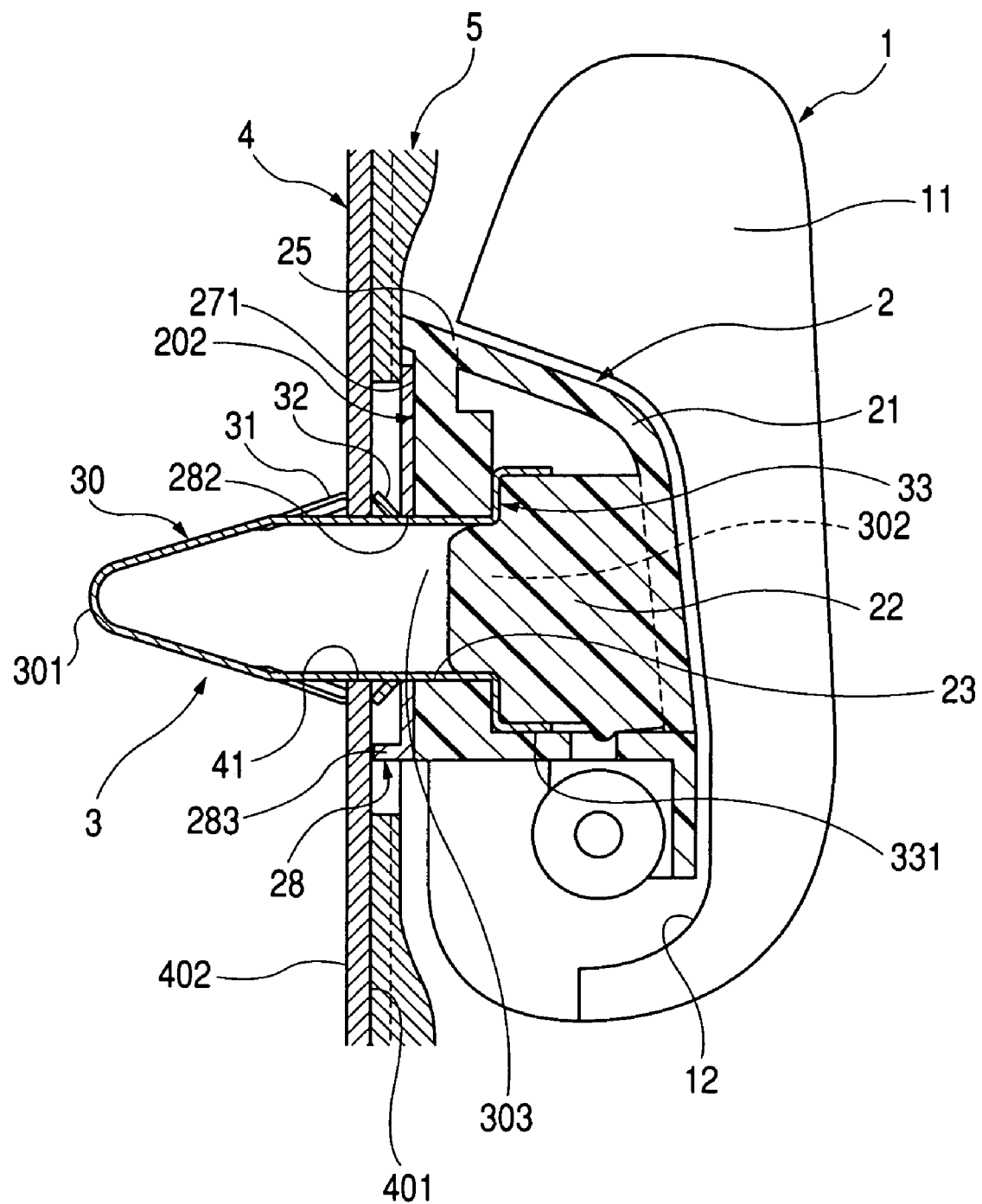
FIG. 13 is an explanatory cross-sectional view showing a mounting structure of the assist grip according to Embodiment 2.

FIG. 13 shows an example in which the body contact portion 272 on the assist grip 1 in Embodiment 1 is provided not on the attachment part 2, but on the reinforcing plate 28 to form a body contact portion 283.

In other words, the body contact portion 283 is formed by bending the reinforcing plate 28. The reinforcing plate 28 of Embodiment 2 does not have the attachment hole 281, and thus punching process is not necessary as in the case of the reinforcing plate 28 of Embodiment 1. The metal plate 28 is located with respect to the attachment part 2 by inserting the clip 3 into the clip insertion hole 23 of the attachment part 2, and into the through hole 282. Other constructions are the same as Embodiment 1.

In Embodiment 2 as well, the attachment part 2 of the assist grip 1 is mounted to the body panel 4 and the interior panel 5 by bringing the opposing surface 202 into abutment with the interior panel 5 and bringing the body contact portion 283 of the reinforcing plate 28 into abutment with the body panel 4. The assist grip 1 abuts against both of the interior panel 5 and the body panel 4. Therefore, the assist grip 1 is prevented from being unstable with respect to the interior panel 5 and the body panel 4.

Therefore, according to the mounting structure of Embodiment 2, the mounting strength of the assist grip 1 with respect to the body panel 4 and the interior panel 5 is increased.

In addition, the same effect as Embodiment 1 may also be achieved.

(Embodiment 3)

Figure 14:
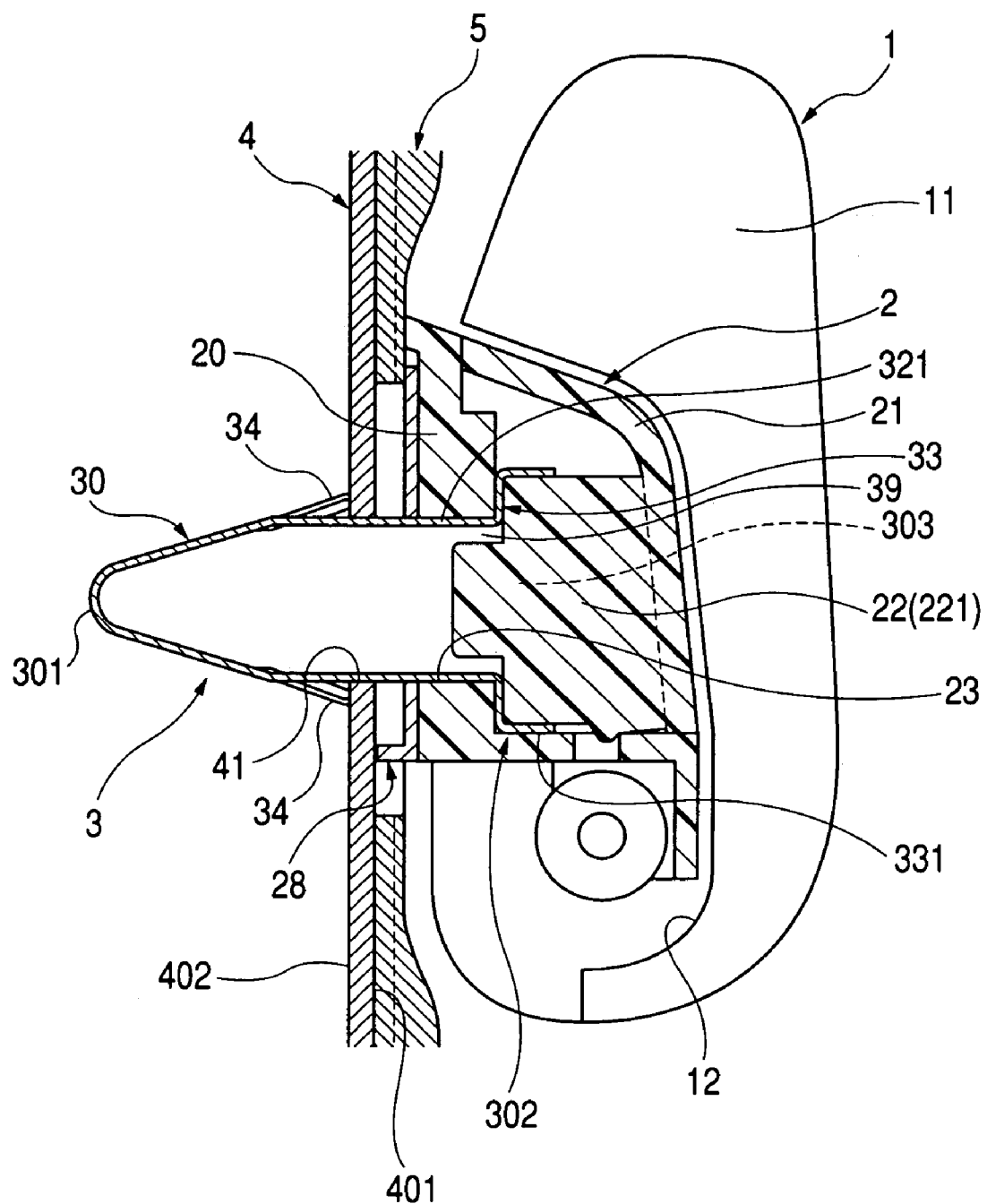
FIG. 14 is an explanatory cross-sectional view showing a mounting structure of the assist grip according to Embodiment 3.
Figure 15:
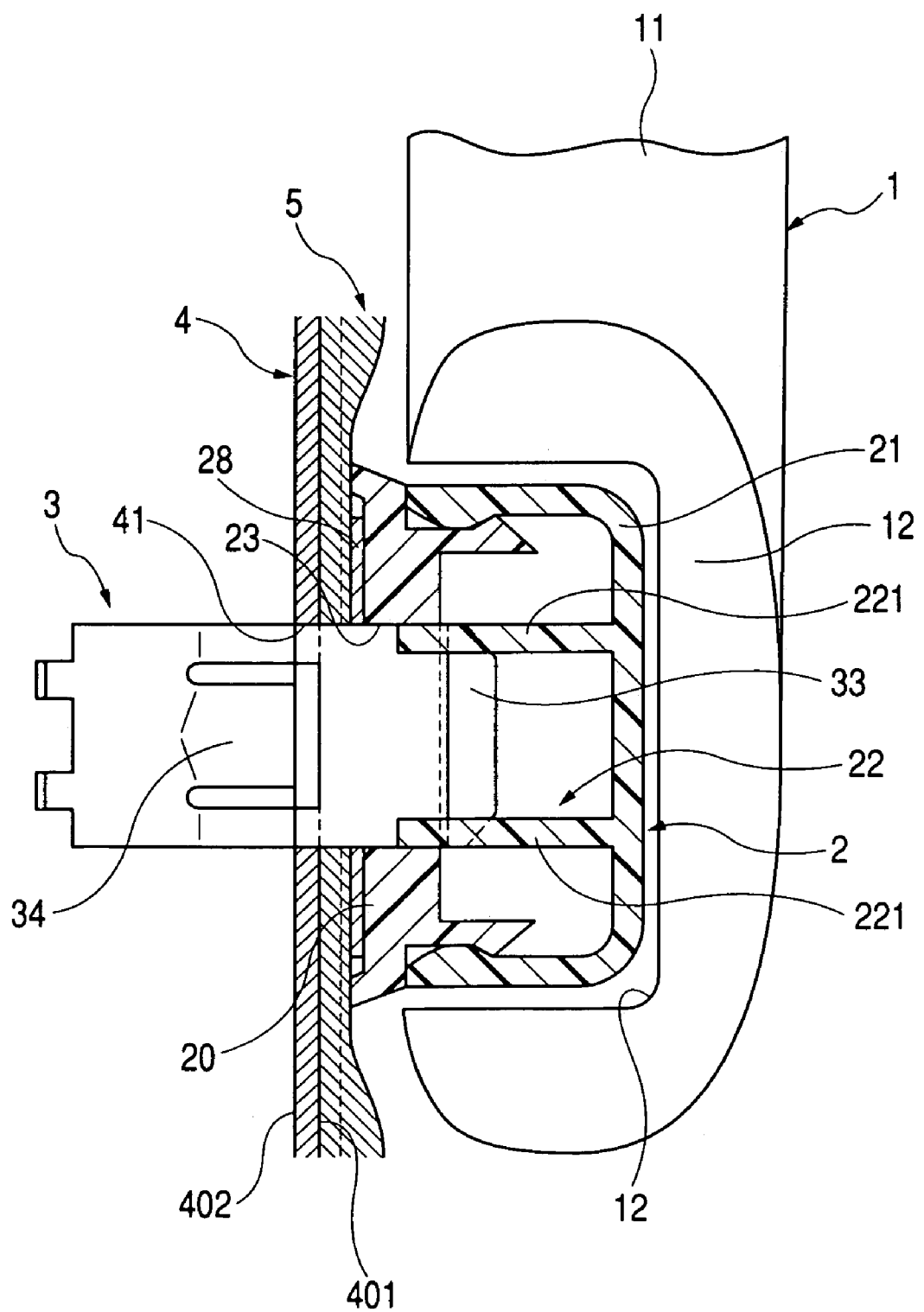
FIG. 15 is an explanatory cross-sectional view taken in the direction orthogonal to the explanatory cross-sectional view in FIG. 14, illustrating a mounting structure of the assist grip according to Embodiment 3.

This embodiment is an example of the assist grip 1 shown in Embodiment 2, in which the clip 3 is not provided with the second locking pawl 32, and the first locking pawl 31 constitutes the locking device 34 that engages the portion of the body panel 4 in the vicinity of the panel hole 41 as shown in FIG. 14 and FIG. 15.

In the mounting structure of Embodiment 3, the body panel 4, the interior panel 5, and the base portion 20 of the attachment part 2 are clamped between the locking device 34 and the engaging portion 33 by engagement between the locking device 34 of the clip 3 and the portion of the body panel 4 in the vicinity of the panel hole 41 and engagement between the engaging portion 33 of the clip 3 and the peripheral edge of the clip insertion hole 23 on the attachment part 2 of the assist grip 1.

Figure 16:
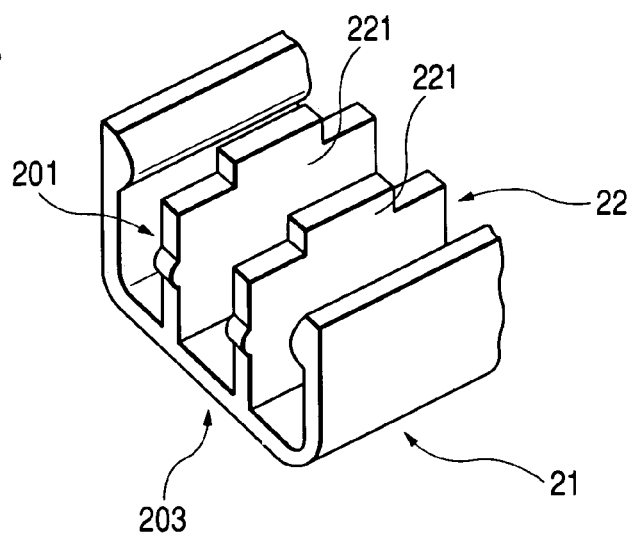
FIG. 16 is a perspective view showing a cap provided with a pressure plug formed of two plate strips according to Embodiment 3.

According to Embodiment 3, the shape of the pressure plug 22 provided on the cap 21 is inventive. In other words, as shown in FIG. 16, the pressure plug 22 of Embodiment 3 includes a plurality (two in Embodiment 3) of plate strips (ribs) 221 to be inserted between the rear ends 302 of the pair of leg portions 30 of the clip 3, and the plate strips 221 are standing upright from the back surface of the cap 21. Therefore, a function to prevent narrowing of the rear end gap portion 33 of the clip 3 can easily be added to the pressure plug 22, and the pressure plug 22 can be reduced in weight. In addition, since the pressure plug 22 is formed of the plate strips 221, surface sink may be prevented from occurring on the front surface 203 of the cap 21.

In Embodiment 3, the cap 21 having the pressure plug 22 is provided separately from the fixed member 2.

In addition, in Embodiment 3, the pressure plug 22 is adapted to be inserted between the engaging strips 331 of the clip 3, and the gap 39 is formed between the engaging recesses 321 of the clip 3 (See FIG. 14). In contrast, the pressure plug 22 may be adapted to be inserted between the engaging recesses 321 of the clip 3, and the gap may be formed between the engaging strips 331 of the clip 3, as a matter of course. Other constructions are the same as Embodiment 1.

Figure 17:
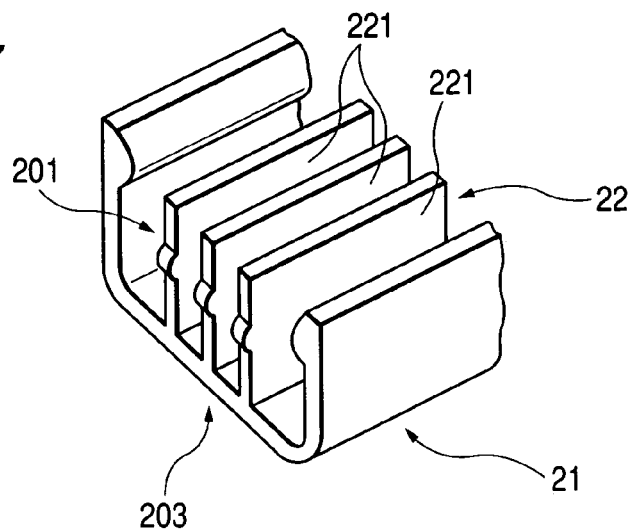
FIG. 17 is a perspective view showing the cap provided with the pressure plug formed of three plate strips according to Embodiment 3.

As shown in FIG. 17, the pressure plug 22 may be formed of three plate strips 221, which are to be inserted between the rear ends 302 of the pair of leg portions 30 of the clip 3, as a matter of course.

The plate strips 221 may be connected with each other by reinforcing strips (reinforcing ribs) 222. In this arrangement, the strength of the pressure plug 22 owing to the plurality of plate strips 221 may be improved by providing deflection-proof properties to the plate strips 221.

Figure 18:
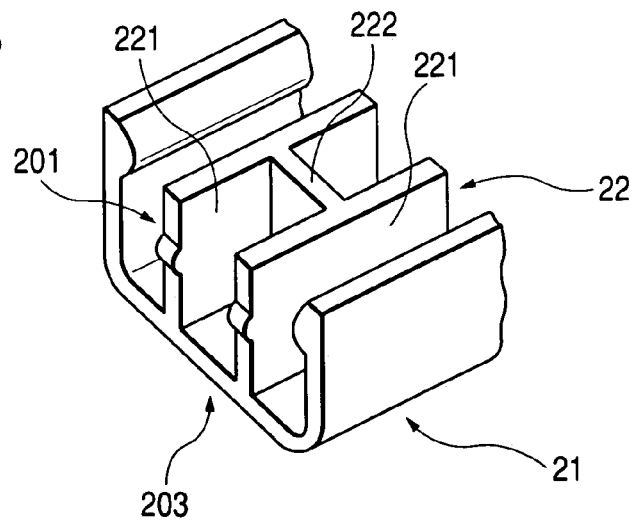
FIG. 18 is a perspective view showing a cap provided with the pressure plug having a H-shaped cross section according to Embodiment 3.
Figure 19:
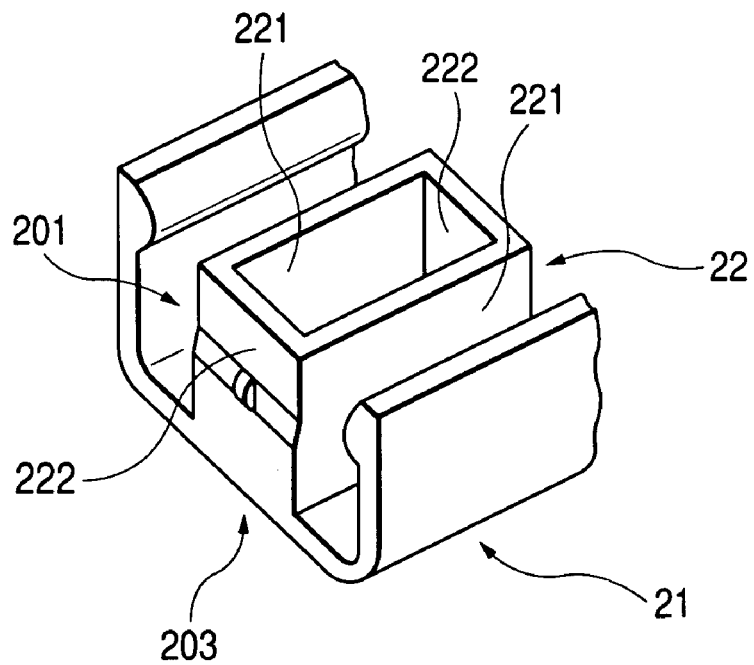
FIG. 19 is a perspective view showing a cap provided with the pressure plug having an annular cross section according to Embodiment 3.

As another mode of the pressure plug 22, as shown in FIG. 18, for example, the pressure plug 22 may have a H-shape in cross section with two plate strips 221 and one reinforcing strip 222. Alternatively, the pressure plug 22 may have an annular cross section with two plate strips 221 and two reinforcing strips 222, as shown in FIG. 19.

Figure 20:
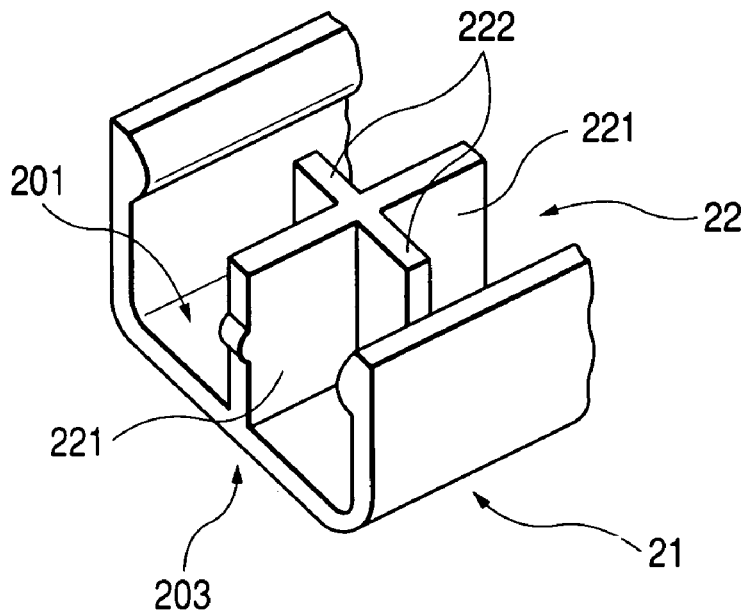
FIG. 20 is a perspective view showing a cap provided with the pressure plug formed of plate strips and a reinforcing strip intersecting therewith according to Embodiment 3.

Alternatively, as shown in FIG. 20, the pressure plug 22 may be formed of a plate strip 221 and a reinforcing strip 222 standing upright so as to intersect therewith.

When the assist grip 1 is mounted to the body panel 4, the clip 3 is inserted into the clip insertion hole 23 of the attachment part 2 of the assist grip 1 as in the case of Embodiment 1. Then, the distal end 301 and the locking device 34 of the clip 3, which is attached to the attachment part 2 of the assist grip 1, are inserted into the panel hole 41 of the body panel 4.

The assist grip 1 can be mounted to the body panel 4 through one-touch operation by engaging the locking device 34 of the clip 3 to the portion of the back surface 402 of the body panel 4 in the vicinity of the panel hole 41

Subsequently, by closing the cap 21 provided on the attachment part 2, the pressure plug 22 (the plurality of plate strips 221) of the cap 21 is fitted into the rear end gap portion 33 of the clip 3, the assist grip 1 is completely mounted.

When the assist grip 1 has to be removed, both of the assist grip 1 and the clip 3 can be removed from the body panel 4 by opening the cap 21, pinching the engaging strips 331 of the pair of leg portions 30 of the clip 3, and releasing the locking device 34 of the clip 3 from the portion in the vicinity of the panel hole 41, as in the case of Embodiment 1.

Therefore, according to the mounting structure of Embodiment 3, both of the assist grip 1 and the clip 3 can easily be mounted to and dismounted from the body panel 4. In Embodiment 3 as well, the same effects as in Embodiment 1 may be achieved.

(Embodiment 4)

Figure 21:
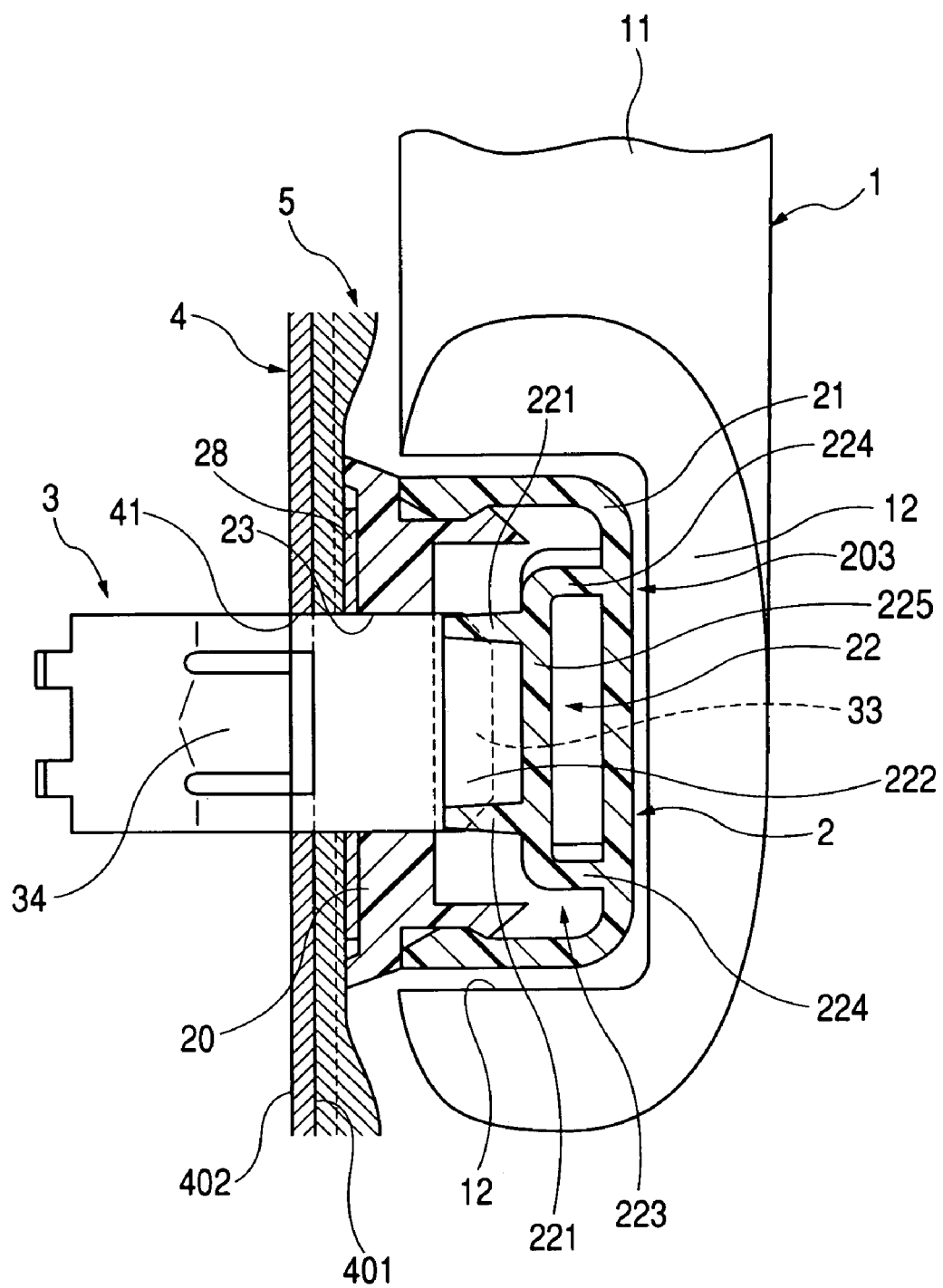
FIG. 21 is an explanatory cross-sectional view showing a mounting structure of the assist grip according to Embodiment 4.
Figure 22:
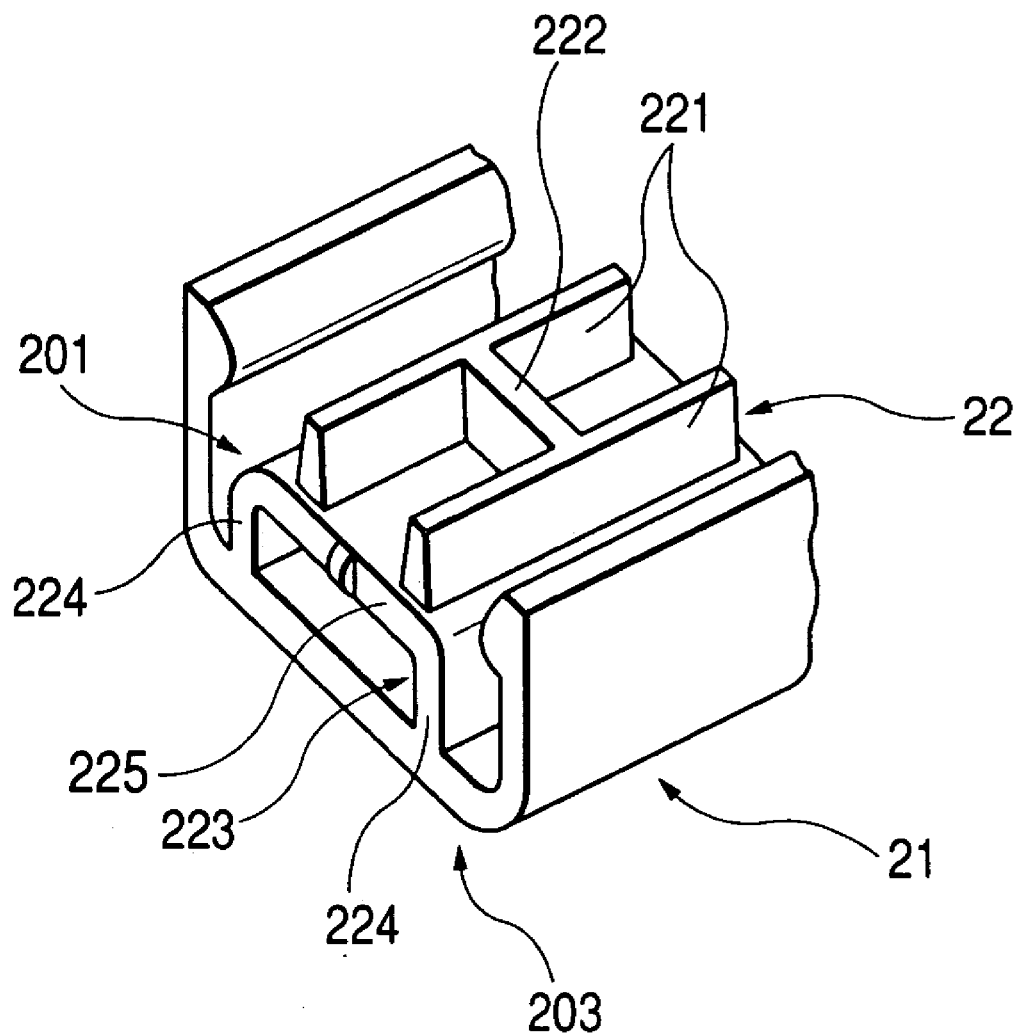
FIG. 22 is a perspective view of a cap having a pressure plug of H-shape in cross section on the upright portion.

As shown in FIG. 21 and FIG. 22, the mounting structure of the assist grip 1 according to Embodiment 4, the pressure plug 22 formed of the plate strips 221 is provided on the cap 21 as in Embodiment 3. The pressure plug 22 of Embodiment 4 is formed on a seat member 223 projecting upright from the back surface 201 of the cap 21. The seat member 223 may be constructed of a pair of upright portions 224 and a plate portion 225 extending therebetween, and may be inclined with respect to the cap 21.

The plate strips 221 may have a cross-sectional area, which increases in thickness toward the proximal end. Although the pressure plug 22 in Embodiment 4 is formed into the H-shape in cross section with the two plate strips 221 and the reinforcing strip 222 connecting therebetween, other various modes may also be employed as in Embodiment 3. Other constructions are the same as in Embodiment 3.

According to the cap 21 in Embodiment 4, generation of surface sink may be prevented further effectively from occurring on the front surface 203 of the cap 21. In Embodiment 4 as well, the same effects as in Embodiment 3 may be achieve.

(Embodiment 5)

Figure 23:
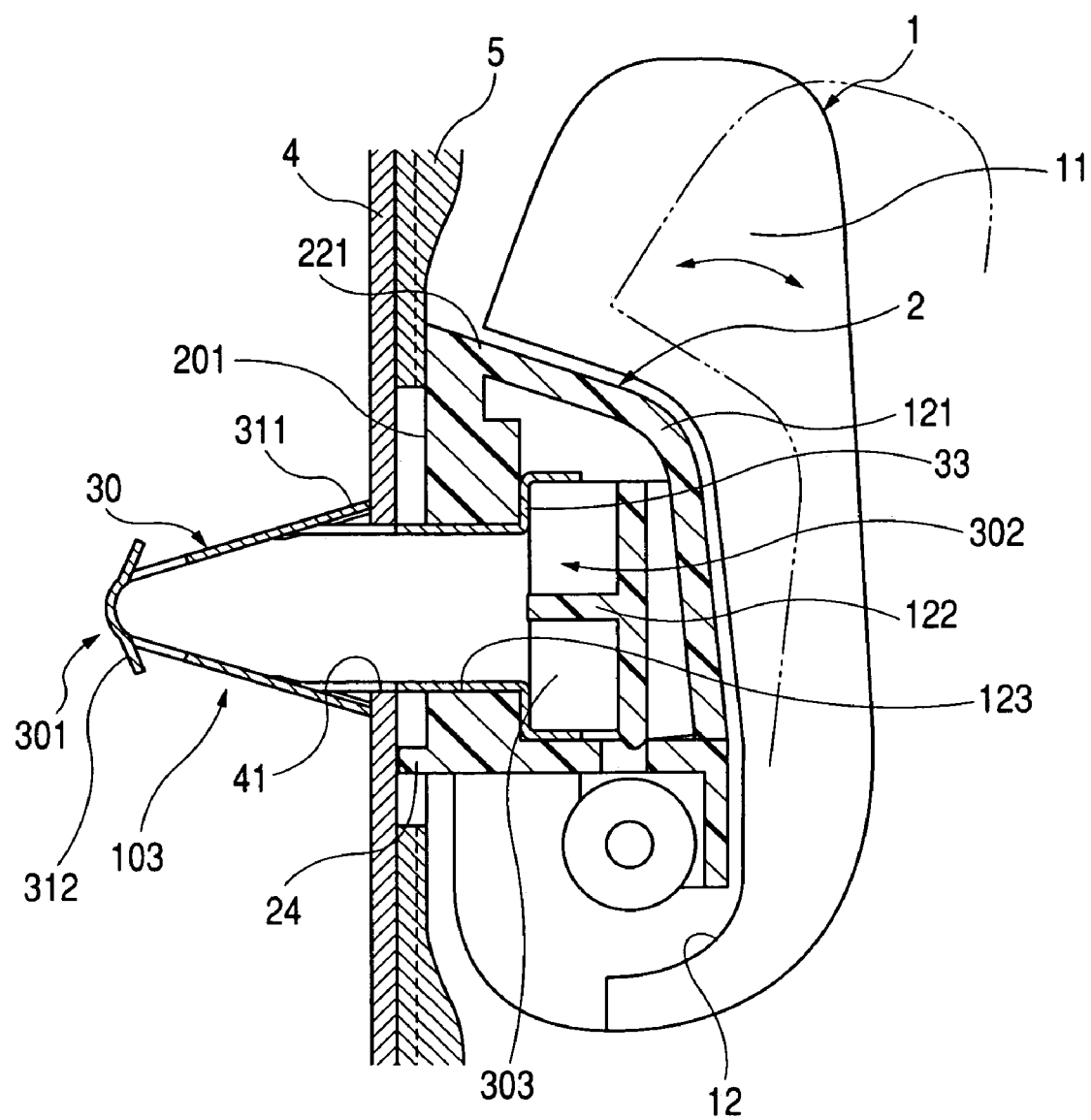
FIG. 23 is an explanatory cross-sectional view showing an assist grip mounting structure according to Embodiment 5.
Figure 24:
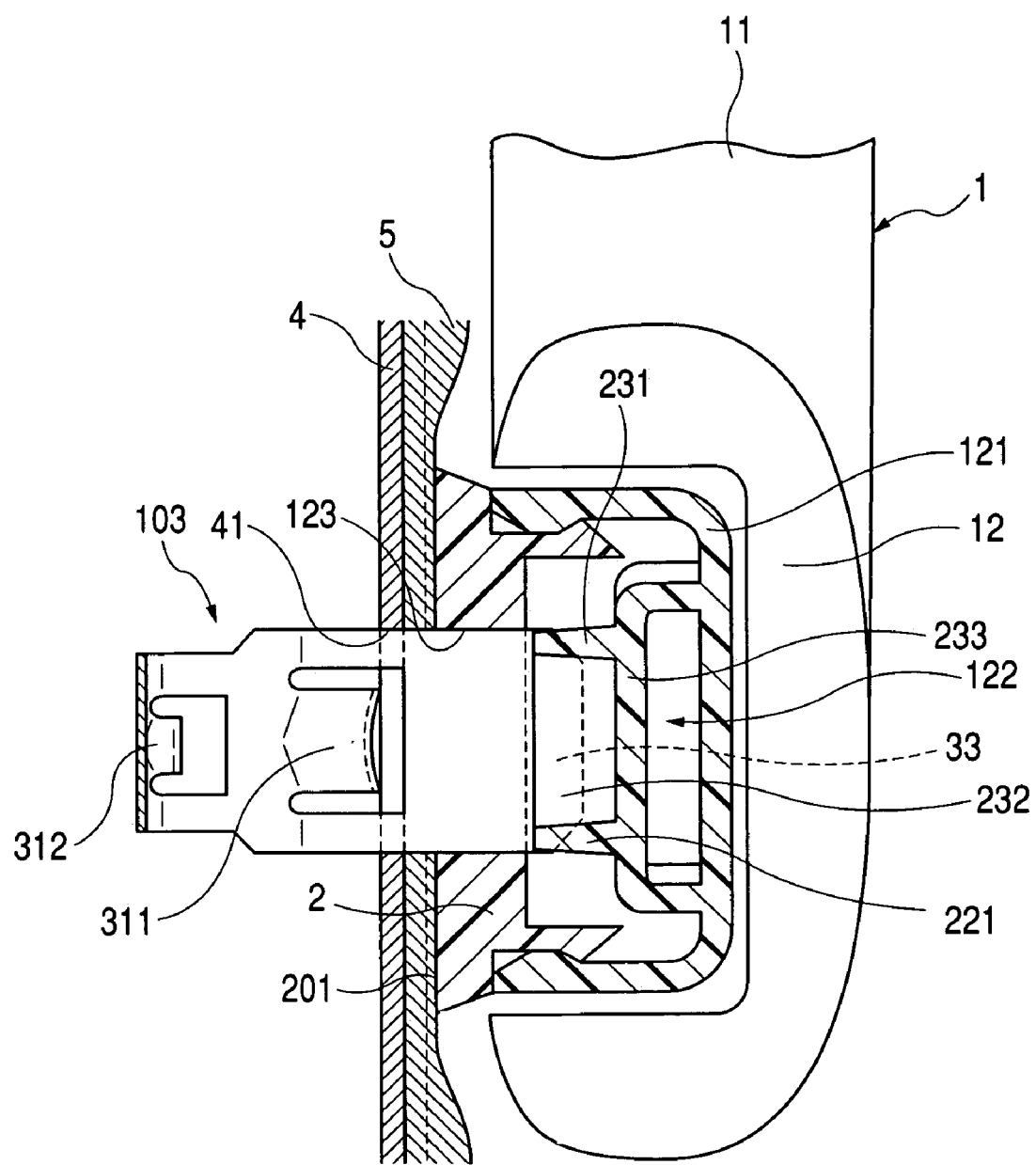
FIG. 24 is an explanatory cross-sectional view of the assist grip mounting structure according to Embodiment 5, taken in the direction orthogonal to the explanatory cross-sectional view shown in FIG. 23.

According to the mounting structure of an assist grip 1 of Embodiment 5, as shown in FIG. 23 and FIG. 24, the assist grip 1 is mounted to a body panel 4 by mounting attachment parts 2 provided on both ends of the assist grip 1 to the body panel 4 via clips 3.

Figure 25:
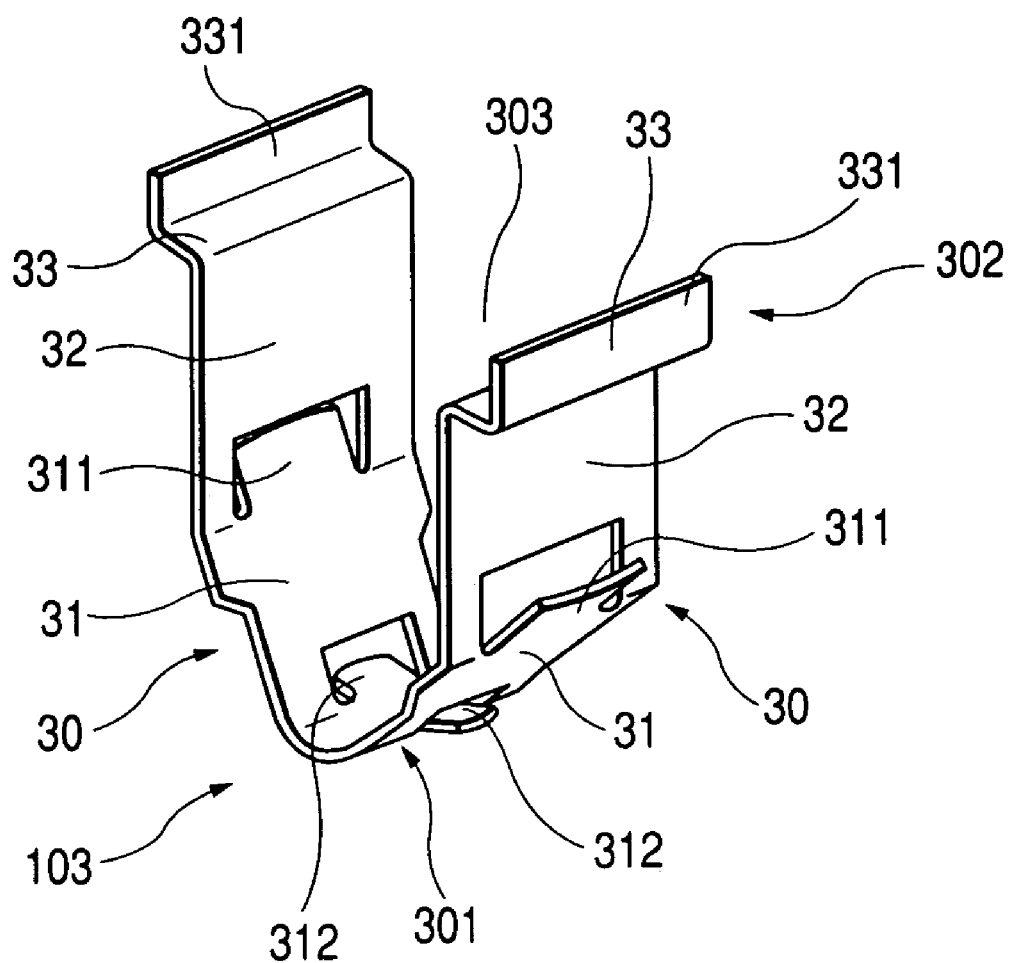
FIG. 25 is a perspective view showing a clip according to Embodiment 5.
Figure 26:
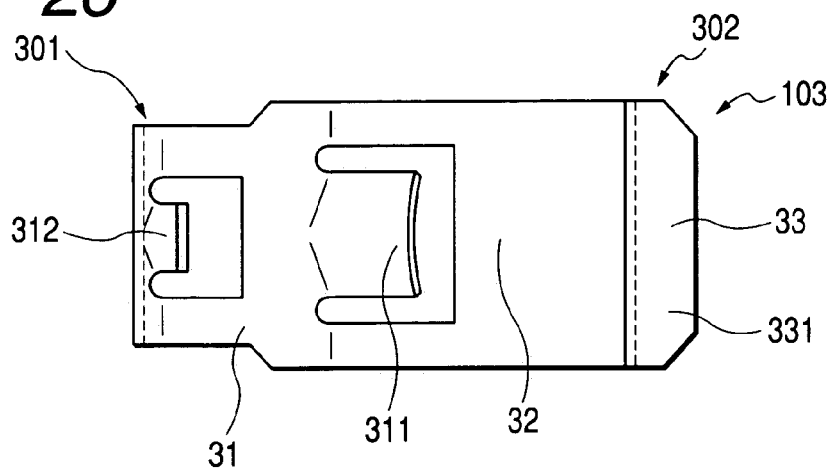
FIG. 26 is a plan view showing the clip according to Embodiment 5.
Figure 27:
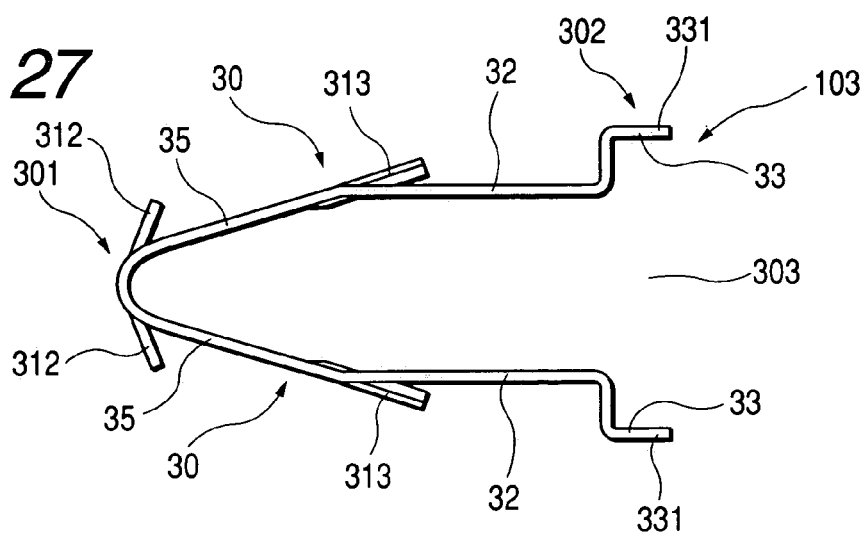
FIG. 27 is a side view showing the clip according to Embodiment 5.

The clip 103 includes a pair of left and right leg portions 30 connected only at the distal end thereof 301, as shown in FIGS. 25 to 27. The pair of leg portions 30 each include an engaging portion 33 for engaging the attachment part 2 and a main locking pawl 313 to be inserted into a panel hole 41 of the body panel 4 to be engaged with the peripheral edge of he panel hole 41. The pair of leg portions 30 each include a detachment prevention pawl 312 formed thereon at the position closer to the distal end 301 with respect to the main locking pawl 313 so as to project outward of the leg portion 30.

In the mounting structure described above, as shown in FIG. 23 and FIG. 24, the distal end 301 of the clip 103 is inserted into a clip insertion hole 123 formed on the attachment part 2 and the panel hole 41 provided on the body panel 4. In the mounting structure described above, the main locking pawl 313 of the clip 103 engages the peripheral edge of the panel hole 41, and the engaging portion 33 of the clip 103 engages the portion in the vicinity of the clip insertion hole 123. A pressure plug 122 for preventing a rear end gap portion 303 from narrowing is inserted into the gap 303 formed between the rear ends of the clip 103. In this manner the assist grip 1 is mounted to the body panel 4.

Figure 28:
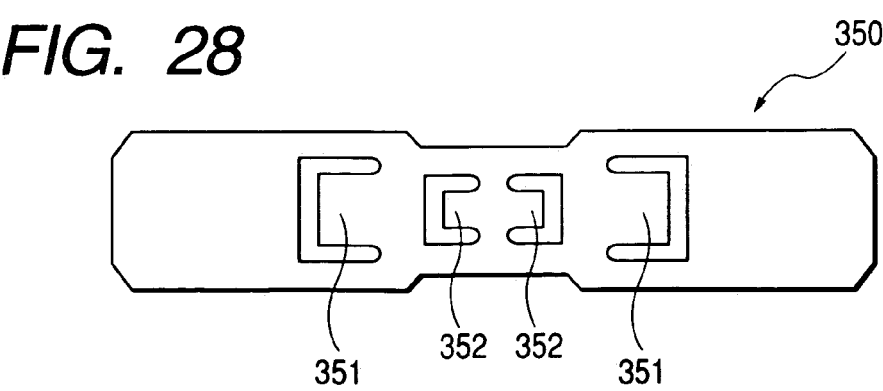
FIG. 28 is a plan view showing a metallic plate for manufacturing the clip of Embodiment 5.

As shown in FIGS. 25 to 27, the clip 103 is a metallic clip 103, and formed by cutting and opening a piece of metallic plate 350 into a single piece of part. In other words, as shown in FIG. 28, when manufacturing the clip 103 in this embodiment, the metallic plate 350 is punched and formed with a portion 351 for forming the main locking pawl continuing from the metallic plate 350 at one side, and a portion 352 for forming the detachment prevention pawl continuing from the metallic plate 350 at one side, one each on both left and right sides as pairs. Then the pair of detachment prevention pawls 312 are formed by bending the metallic plate 350 along the laterally center of the metallic plate 350, and the pair of main locking pawls 313 are formed by bending along the connecting side between the portion 351 for forming the main locking pawl and the metallic plate 350. The engaging portion 33 is formed by further bending the metallic plate 350.

As shown in FIG. 25 to FIG. 27, the pair of leg portions 30 of the clip 103 includes a distal end guide member 35, which is obliquely formed so as to expand outward from the distal end 301 toward the rear end 302. The distal end guide member 35 is a portion that is inserted into the panel hole 41 in advance. Therefore, insertion of the distal end 301 of the clip 103 into the clip insertion hole 123 and the panel hole 41 is facilitated by the presence of the distal end guide member 35.

Figure 29:
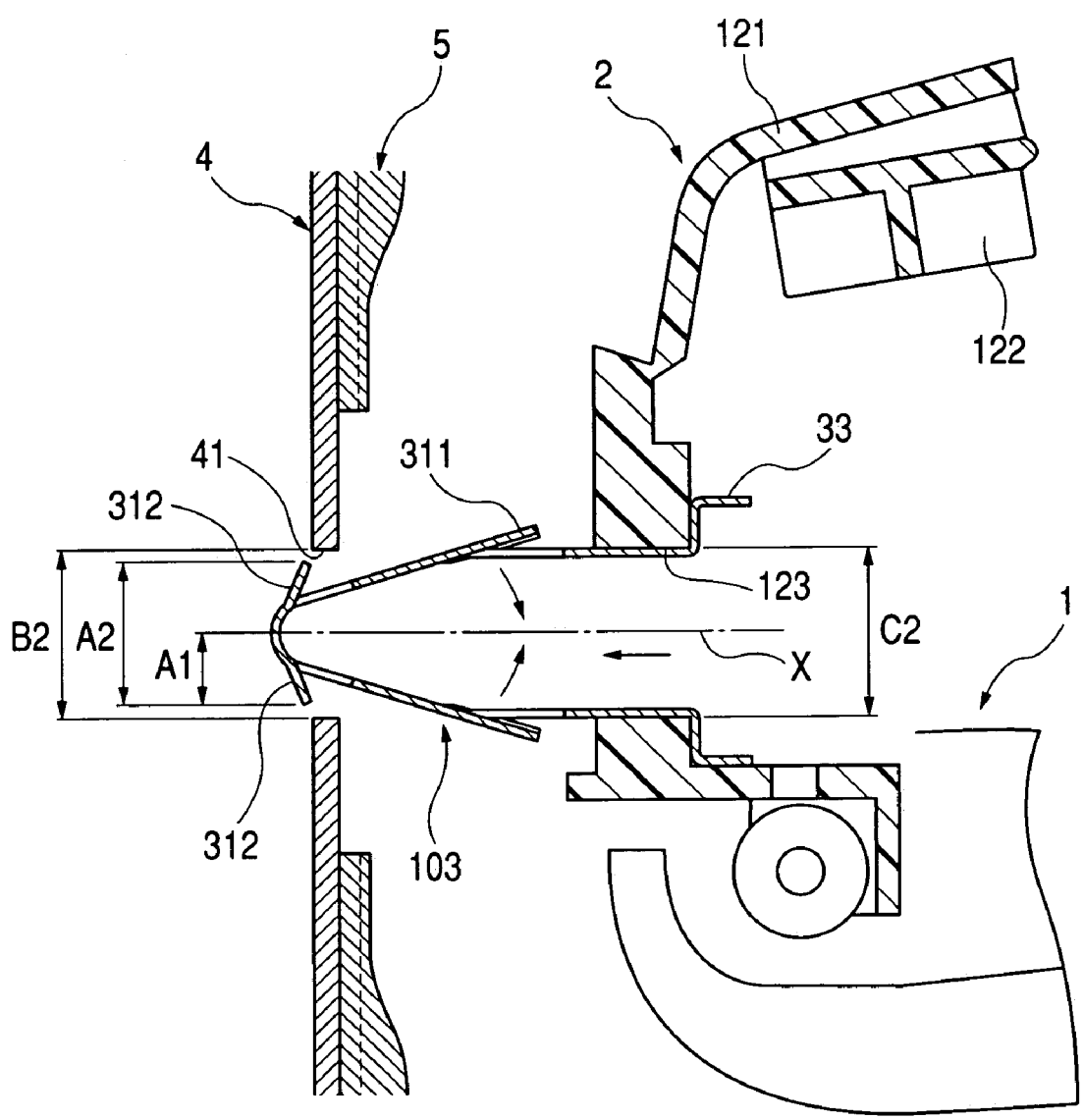
FIG. 29 is an explanatory cross section showing a state in which the assist grip is mounted to the body panel according to Embodiment 5.

As shown in FIG. 29, the leg portions 30 each include a hole-facing portion 32, which extends from the distal end guide member 35 and faces the inner wall surface of the clip insertion hole 123.

The engaging portions 33 are bent from the hole-facing portions 32 toward the outside of the pair of leg portions 30. A finger grip portion 331 formed by further bending the engaging portion 33 is provided at the distal end side of the engaging portion 33 for facilitating resilient deformation of the clip 103 for attaching or detaching the clip 103 to/from the attachment part 2.

The main locking pawl 313 is extended from the rear end 302 of the distal end guide member 35, and the detachment prevention pawl 312 is formed at the distal end guide member 35.

A distance A1 from the distal end of the detachment prevention pawl 312 to the centerline X between the pair of leg portions 30 is less than a half a distance B2 between the inner wall surfaces of the panel hole 41, which faces the leg portions 30. In Embodiment 5, since the detachment prevention pawl 312 is formed one each on the pair of leg portions 30, the distance A2 between the distal ends of the detachment prevention pawls 312 is smaller than the distance B2 between the inner wall surfaces of the panel hole 41. The distance A2 between the distal ends of the detachment prevention pawls 312 is smaller than a distance C2 between the inner wall surfaces of the clip insertion hole 123.

As described above, since the distance A2 between the distal ends of the detachment prevention pawls 312 is limited, the distal ends 301 of the clip 103 can be inserted into the clip insertion hole 123 and the panel hole 41 without interference between the detachment prevention pawls 312 and the holes 123 and 41. Therefore, the detachment prevention pawls 312 can be formed without deteriorating insertibility of the clip 103 into the panel hole 41.

As shown in FIG. 23 and FIG. 24, the attachment parts 2 of the assist grip 1 of Embodiment 5 are formed of cushion members for rotatably mounting the assist grip 1 to the body panel 4.

The pressure plug 122 is formed on the back surface of a cap 121, which covers the attachment part 2 from the front side thereof, and the cap 121 is formed integrally with the attachment part 2 via a hinge 221.

As shown in FIG. 23 and FIG. 24, in Embodiment 5, an elaborately designed interior panel 5 is provided on the front surface of the body panel 4.

The attachment part 2 is fixed to the body panel 4 and the interior panel 5 with an opposing surface 201 of the attachment part 2, which faces the body panel 4, abutted against the interior panel 5 and a projection 24 formed projectingly on the opposing surface 201 abutted against the body panel 4.

Figure 30:
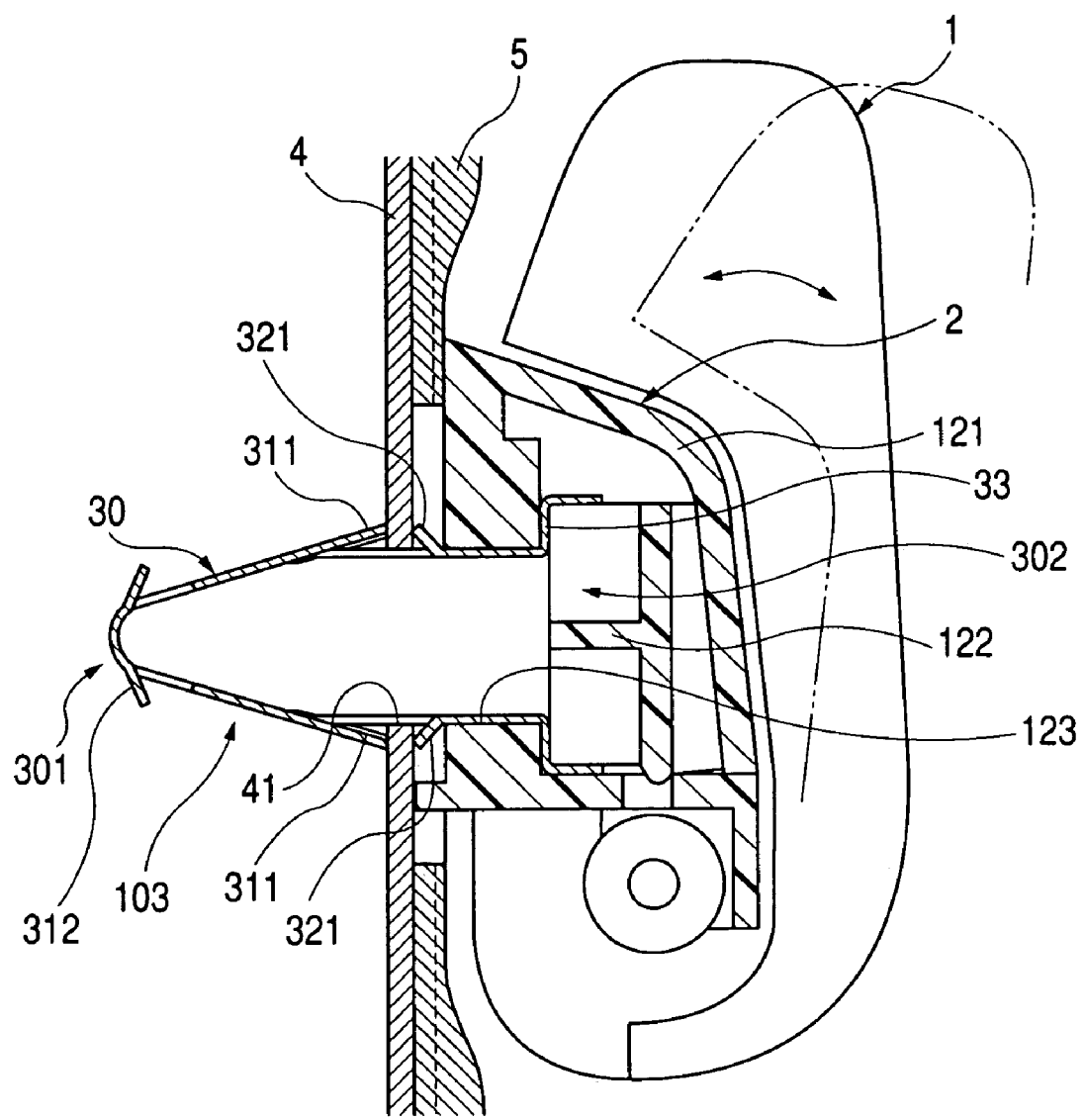
FIG. 30 is an explanatory cross-sectional view showing an assist grip mounting structure employing a clip having a secondary locking pawl according to Embodiment 5.

Alternatively, similarly to Embodiment 1, the pair of leg portions 30 of the clip 103 each may include a secondary locking pawl 321, which can clamp the body panel 4 with the main locking pawl 313, at the position closer to the rear end 302 with respect to the main locking pawl 313 as shown in FIG. 30.

As shown in FIG. 23 and FIG. 24, in the assist grip 1 mounting structure in Embodiment 5, the attachment part 2 and the body panel 4 are clamped between the main locking pawl 313 and the engaging portion 33 by engaging the main locking pawl 313 of the clip 103 with the peripheral edge of the panel hole 41 of the body panel 4, and engaging the engaging portion 33 of the clip 103 with the attachment part 2 at the portion in the vicinity of the clip insertion hole 123.

The pressure plug 122 is fitted into the rear end gap portion 303 of the clip 103 so as to prevent the rear end gap portion 303 from narrowing.

Therefore, the clip 103 and the attachment part 2 of the assist grip 1 are integrated via the pressure plug 122, and thus the main locking pawl 313 of the clip 103 is prevented from coming off the peripheral edge of the panel hole 41 of the body panel 4 due to unexpected resilient deformation of the pair of leg portions 30. As a consequence, a high degree of mounting strength of the assist grip 1 with respect to the body panel 4 is achieved.

As shown in FIG. 29, according to Embodiment 5, the assist grip 1 can be mounted to the body panel 4 simply by inserting the clip 103 into the clip insertion hole 32 of the attachment part 2 in advance, and pressing the clip 103 into the panel hole 41. Therefore, the assist grip 1 can be mounted easily.

When it is necessary to remove the assist grip 1 for maintenance, for example, after the pressure plug 122 is pulled out from the rear end gap portion 303, the clip 103 can be resiliently deformed so as to narrow the rear end gap portion 303 by pinching the rear ends 302 of the pair of leg portions 30. Therefore, both of the assist grip 1 and the clip 103 can be removed from the body panel 4 by releasing engagement of the main locking pawl 313 of the clip 103 with the peripheral edge of the panel hole 41.

Therefore, in the mounting structure of the assist grip according to Embodiment 5, both of the assist grip 1 and the clip 103 can easily be mounted to and dismounted from the body panel 4.

In addition, the detachment prevention pawl 312 is formed on the pair of leg portions 30 of the clip 103. The detachment prevention pawl 312 is formed at the position closer to the distal end 301 with respect to the main locking pawl 313, and it is inserted into the panel hole 41 in a state in which the assist grip 1 is mounted on the body panel 4.

Figure 31:
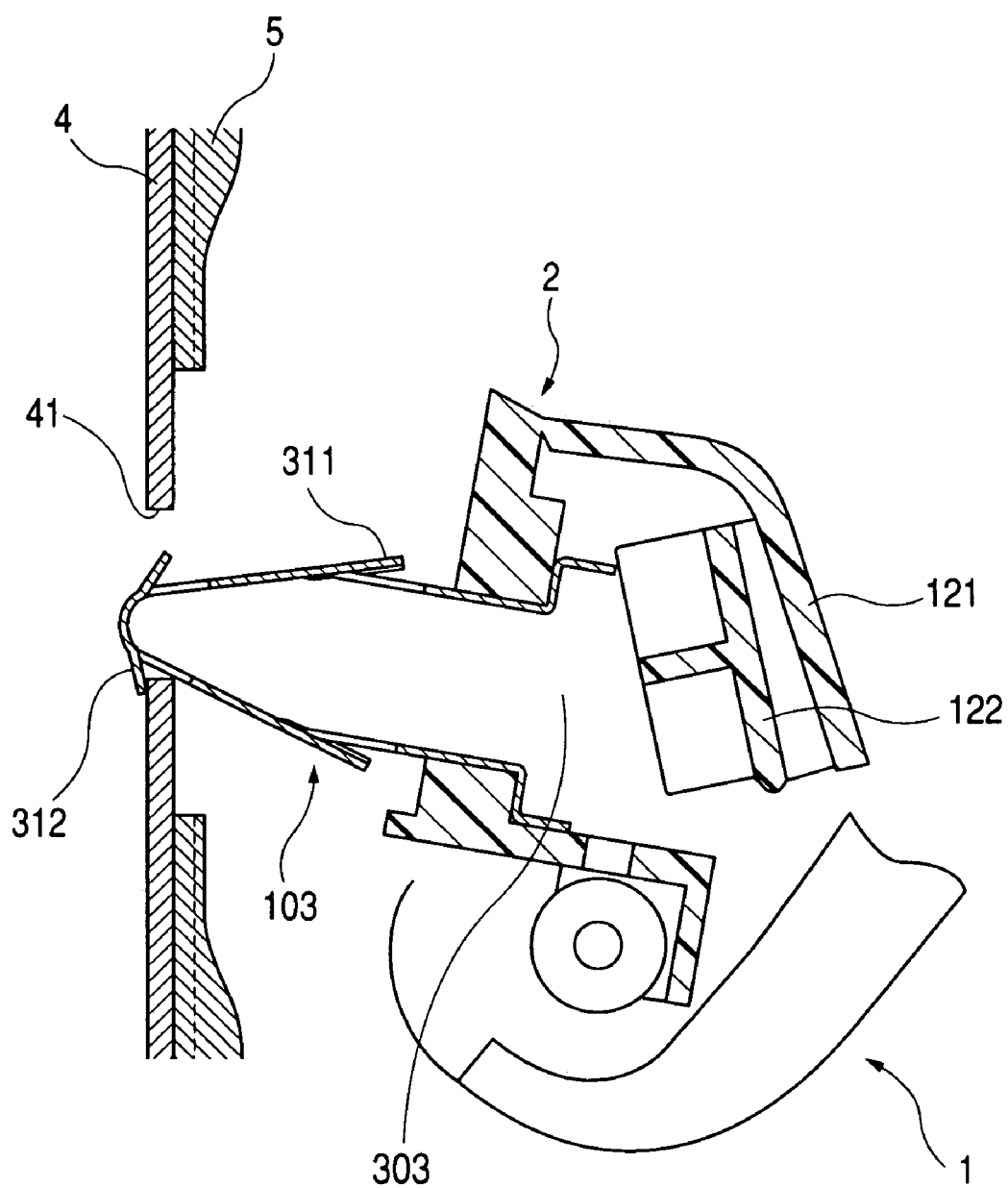
FIG. 31 is an explanatory cross sectional view showing the assist grip in a state in which a detachment prevention pawl engages the peripheral edge of a panel hole on the body panel.

As shown in FIG. 31, when an automobile having the assist grip 1 crushed and a strong impact or the like, which is generated when the curtain shield air bag is actuated, is exerted on the assist grip 1, and thus engagement of the main locking pawl 313 with the peripheral edge of the panel hole 41 is released, the detachment prevention pawl 312 can be engaged with the peripheral edge of the panel hole 41.

Therefore, according to the mounting structure of Embodiment 5, the assist grip 1 is prevented from coming off the body panel 4 unexpectedly.

(Embodiment 6)

Figure 32:
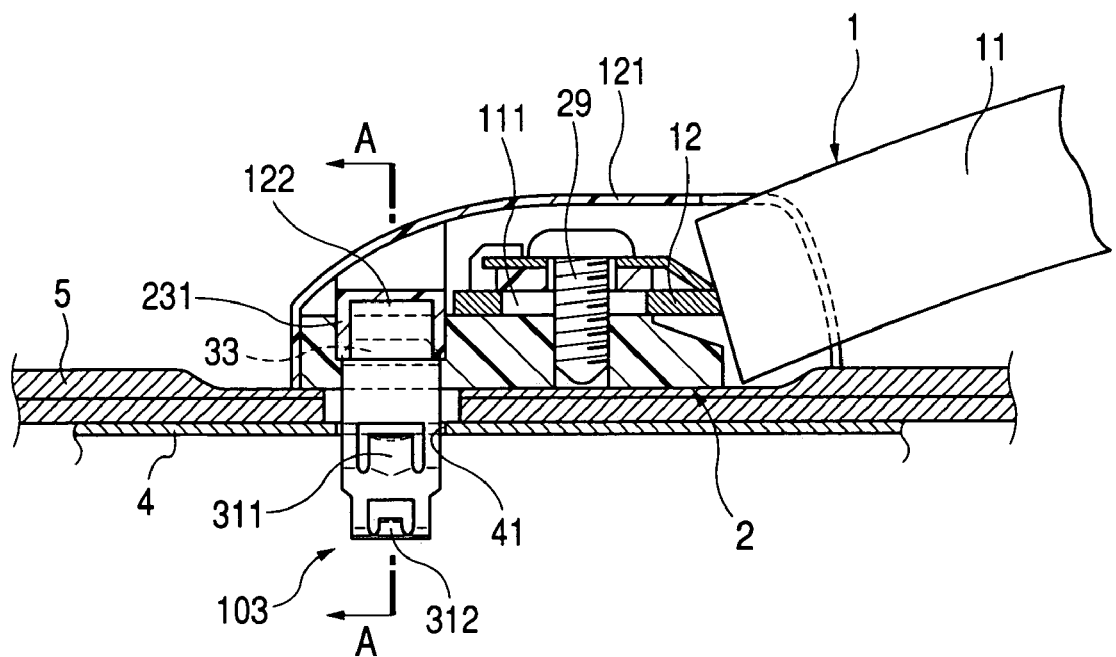
FIG. 32 is an explanatory cross-sectional view showing a pullout assist grip mounting structure according to Embodiment 6.
Figure 33:
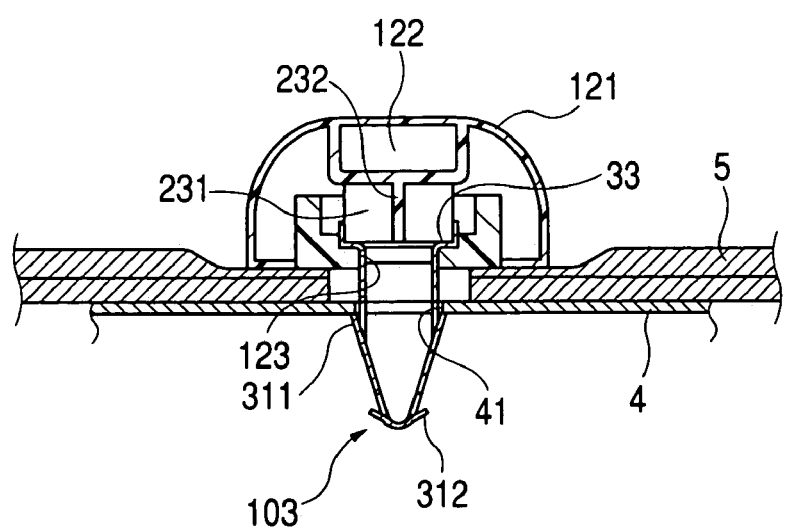
FIG. 33 is an explanatory cross-sectional view taken along the line A—A in FIG. 32, illustrating a pull out assist grip mounting structure according to Embodiment 6.

According to the assist grip 1 of Embodiment 6, as shown in FIG. 32, the joint members 12 at both ends are connected to the cushion members 2 that serve as the attachment part 2, and the joint members 12 are slidably connected to the cushion members 2, respectively. The sliding movement of the joint member 12 is achieved by forming an elongated hole 111 formed on the joint member 12 longitudinally of the assist grip 1, inserting a screw 29, which is engaged with the attachment part 2, into the elongated hole 111. Accordingly, the assist grip 1 of Embodiment 6 is mounted to the body panel 4 so as to be capable of drawing out.

In Embodiment 6 as well, other constructions are the same as Embodiment 5, and thus the same effects as Embodiment 5 is achieved.

(Embodiment 7)

Figure 34:
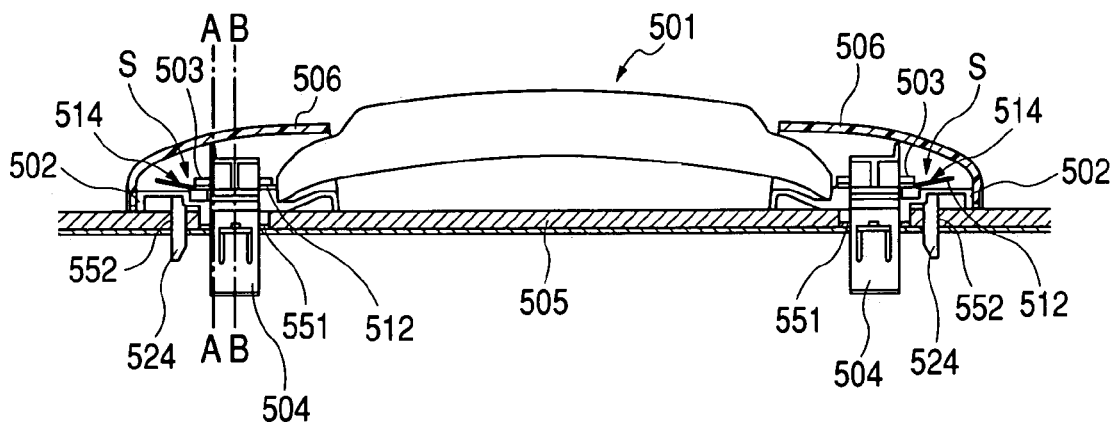
FIG. 34 is a general view, partly in section, showing an assist grip of Embodiment 7.
Figure 35:
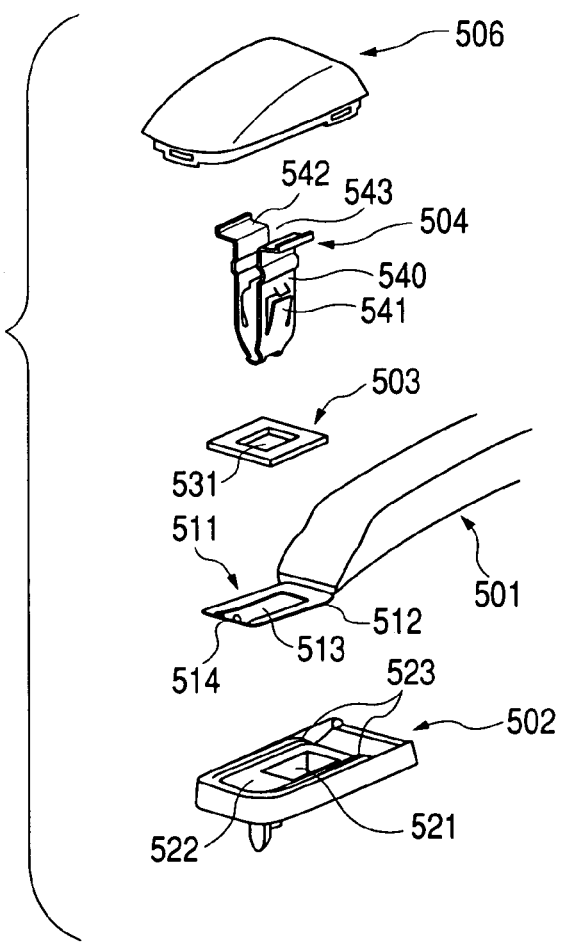
FIG. 35 is a development elevation of the assist grip according to Embodiment 7.

As shown in FIG. 34 and FIG. 35, in the mounting structure of an assist grip 501 of this embodiment, joint members 511 formed at both ends of the assist grip 501 are connected to a body panel 505 via clips 504. The joint member 511 is covered with a cap 506.

As shown in FIG. 35, the clip 504 is formed by bending a piece of metal plate, and includes a pair of leg portions 540 which are connected only at the distal end thereof, and a hooking member 542 formed by further bending the leg portion outward at the rear ends of the pair of leg portions 540. A gap 543 is defined between the pair of leg portions. The leg portion 540 is formed with an engaging portion 541, which is formed by cutting and bending apart thereof and is engaged with the peripheral edge of amounting hole on the back surface of the body panel when the leg portion 540 is inserted into the mounting hole on the body panel. Though it is not shown, there is a pawl facing the engaging portion 541. The pawl maintains the engaged state by clamping the body panel from the front side in cooperation with engagement of the engaging portion 541 with the body panel from the backside. Accordingly, the assist grip is mounted stably to the body panel.

A core member 512 formed of a metallic insert, which is embedded in the assist grip 501 and exposed at the ends, and extended from the both ends of the assist grip 501. The core member 512 is formed with an elongated hole 513, and a lock portion 514 of a substantially pawl shape is cut out from the core member 512 and integrally formed on one side of the elongated hole 513. The length of the elongated hole 513 is longer than the clip 504 longitudinally of the assist grip 501.

A base member 502 includes a positioning member 524 to be inserted into a positioning hole 552 formed on the body panel, and a recessed groove 522 in which the core member 512 is placed. The inside of the recessed groove is formed with a clip insertion hole 521 into which the leg portion 540 of the clip 504 is inserted. The length of the clip insertion hole 521 is longer than the length of the clip 504 like the elongated hole 513 of the core member 512, and is longer than the elongated hole 513, in the longitudinal direction of the assist grip 501.

A pressing member 503 is shaped like a substantially square plate, and is formed at the center thereof with a clip engagement hole 531. The leg portion 540 of the clip 504 is inserted into the clip engagement hole 531, and the hooking member 542 engages the peripheral edge thereof. The length of the pressing member 2503 is shorter than the clip insertion hole 521 in the longitudinal direction of the assist grip 501, and the clip engagement hole 531 has almost the same size as the clip 504.

Figure 36:
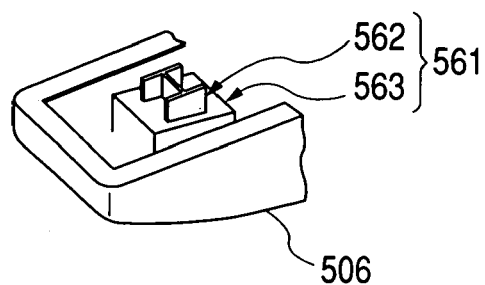
FIG. 36 is a perspective view showing a cap provided with a pressure plug of Embodiment 7.

The cap 506 is detachably attached to the base member 502 so as to cover the joint member of the assist grip 501. The cap 506 includes, as shown in FIG. 36, a pressure plug 561 integrally formed therewith, and the pressure plug 561 includes a head portion 562 of substantially H-shape and a seat member 563 having a hollow portion on the backside thereof. The reason why the seat member 563 has a hollow portion therein is to prevent deterioration of appearance as a result of generation of surface sink on the surface of the cap due to difference of mold shrinkage when forming the pressure plug 561 integrally with the cap 506, and to reduce the weight. The reason why the head portion 562 is formed into a substantially H-shape and is oriented vertically with respect to the longitudinal direction of the assist grip 501 is to secure a space for engagement between the lock portion 514 of the core member 512 and the peripheral edge of the clip engagement hole 531 of the pressing member 503, which serves as an engaged portion, as will be described in detail.

Referring now to FIG. 34 and FIG. 35, a method of mounting the assist grip 501 to the body panel using these members will be described.

The core member 512 of the assist grip 501 is placed in the recessed groove 522 of the base member 502, and the pressing member 503 having the clip engagement hole 531 is placed thereon. Accordingly, a communication hole defined by a series of the elongated hole 513 of the core member, the clip insertion hole 521 of the base 502, and the clip engagement hole 531 of the pressing member is formed.

When the leg portion 540 of the clip 504 is inserted into the communication hole and the hooking member 542 of the clip 504 engages the peripheral edge of the clip engagement hole 531 of the pressing member 503, the pressing member 503 and the base member 502 are assembled integrally with the core member 512 of the assist grip 501, and formed into a semi-assembly constituting the joint member 511 to be connected to the body panel 505.

Subsequently, the leg portion 540 of the clip 504 of the semi-assembly is inserted into a mounting hole 551 of the body panel 505 and the positioning member 524 of the base member 502 is inserted into the positioning hole 552 of the body panel 505. In this case, the gap 543 formed between the rear ends of the leg portions 540 are narrowed, and locking devices 541, which opens wider than the width of the mounting holes 551, are resiliently deformed, so that the leg portions 540 of the clip 504 pass through mounting hole 551 on the body panel 505. After the engaging portion 541 has passed through the mounting hole 551, resilient deformation of the leg portions 540 of the clip 504 and narrowing of the gap 543 are released, and the engaging portion 541 of the clip 504 engages the peripheral edge on the back side of the mounting hole 551 of the body panel 505, and consequently, the semi-assembly can be mounted to the body panel through one-touch operation. In other words, even under the situation in which working property is not good, mounting operation can easily be performed without necessity of turning screws as in the related art.

Figure 37:
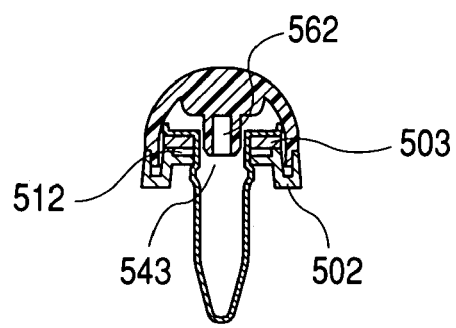
FIG. 37 is a cross-sectional view taken along the line A—A in FIG. 34.
Figure 38:
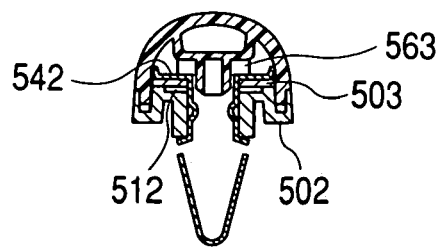
FIG. 38 is a cross-sectional view taken along the line B—B in FIG. 34.

Then the cap 506 is attached to the base member 502 so as to cover the joint member 511 of the assist grip 501 attached in this manner through one-tough operation. When the cap 506 is mounted, the head portion 562 of the pressure plug 561 formed inside the cap 506 is fitted into the gap 543 of the clip 504, and the seat member 563 abuts against the hooking member 542 of the clip 504 so as to press the same (See FIG. 37 and FIG. 38).

Since the head portion 562 is fitted, the gap 543 of the clip 504 is prevented from narrowing, and engagement of the clip 504 with respect to the body panel can stably be maintained. Since the seat member 563 abuts against the engaging portion 542 of the clip 504, a high degree of mounting strength of the assist grip 501 with respect to the body panel 505 is achieved. Since the pressure plug 561 is formed integrally with the cap 506, the construction may be simplified because it is not necessary to provide separate clip retaining means. In addition, the cap 506 contributes to improve the appearance of the end portions of the assist grip.

Since the seat member 563 includes a hollow portion and the pressure plug 561 is formed integrally, generation of surface sink, which tends to occur due to the difference of the thickness and molding shrinkage when being molded, can be prevented, and consequently, deterioration of the appearance of the cap surface can be prevented and weight reduction of the cap 506 is achieved.

According to the assist grip 501, which is mounted to the body panel in this manner, the core member 512 is movable in the elongated hole 513, which is longer than the clip 504 in the longitudinal direction, by a predetermined distance via the clip 504 in a state of being clamped between the base member 502 and the pressing member 503, the assist grip 501 can easily be pulled out for use.

Since the positioning member 524 is inserted into and fixed to the positioning hole 552 and the mounting hole 551 of the clip 504, the peripheral edges of the elongated hole 513, the clip engagement hole 531, and the clip insertion hole 521, which are different in size, are aligned on the side of the holes closer to the center in the longitudinal direction. Because of the difference in size between the pressing member 503 and the clip insertion hole 521 longitudinally of the assist grip 501, a space S is formed between the pressure member 503 and the base member 502, and the end of the core member 512 projects from the space S.

Figure 39:
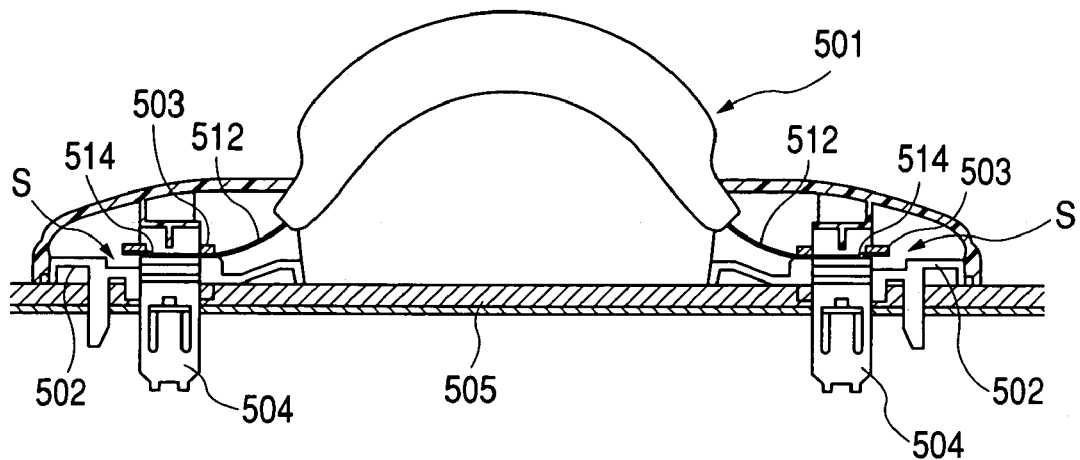
FIG. 39 is cross-sectional view, showing a pulled-out state of the assist grip according to Embodiment 7.

The state in which the assist grip is pulled out to the maximum extent possible is shown in FIG. 39. When the assist grip 501 is pulled out from the stored state shown in FIG. 34, the core member 512 projected from between the base member 502 and the pressing member 503 moves toward the longitudinal center and the lock portion 514 enters into the space S. When the assist grip 501 is further pulled out, the lock portion 514 moves so as to slip under the pressing member 503. At this moment, since the head portion 562 of the cap 506 is formed into a substantially H-shape, a space is secured with respect to the clip engagement hole 531. Therefore, as shown in FIG. 39, when the assist grip is pulled out to the maximum extent possible, the lock portion 514 can engage the peripheral edge of the clip engagement hole 531. In other words, the clip engagement hole 531 of the pressing member 503 also serves as an engaged portion of the lock portion 514. Since the lock portion 514 formed integrally with the core member 512 can engage the clip engagement hole 531 of the pressing member 503 because of the presence of a space secured by the shape of the head of the pressure plug 561 and the clip engagement hole 531 as an engaged portion, the pulled-out state can be maintained by a simple structure without necessity of a separate component.

Although the head portion 562 of the pressure plug 561 is formed into a substantially H-shape in this embodiment, it is not limited thereto, and various modes can be employed as long as it does not interfere with formation of a space, which enables engagement of the lock portion 514 with the peripheral edge of the clip engagement hole 531 of the pressing member 503, and functions as a pressure plug. Although the pressure plug 561 is formed integrally with the cap 506, the pressure plug 561 may be provided separately, as a matter of course. In addition, although the core member 512 embedded integrally into the assist grip is employed as a sliding portion, a member formed separately from the assist grip may be provided as a sliding portion at the end of the assist grip. The clip, the base member, the pressing member are also not limited to the shapes shown in the embodiment, and various modification may be made as long as the effect of the invention is achieved without departing the scope of the invention.

(Embodiment 8)

Figure 43:
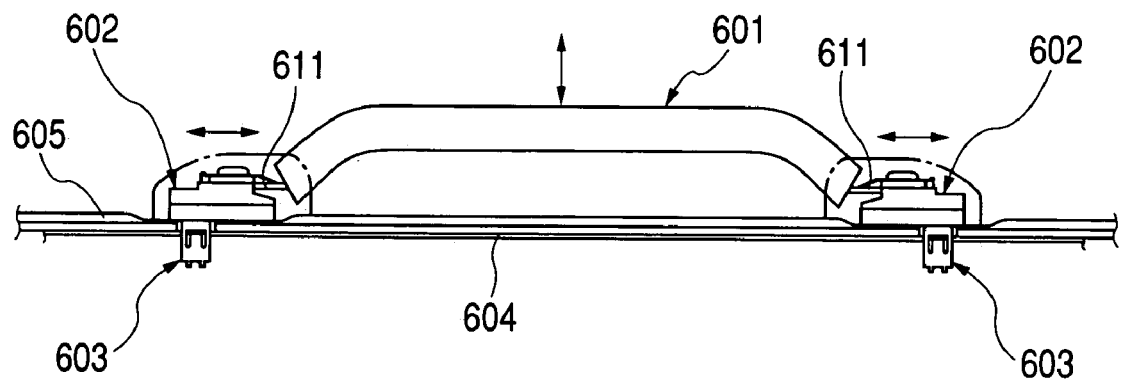
FIG. 43 is an explanatory drawing showing a state in which the assist grip is mounted to the body panel according to Embodiment 8.

As shown in FIG. 43, an assist grip 601 mounting structure according to Embodiment 8 is such that the joint members 611 provided at both ends of the assist grip 601 are slidably connected to a cushion member 602, and the cushion member 602 is attached to a body panel 604 via a clip 603, so that the assist grip 601 is mounted to the body panel 604 so as to be capable of pulling out therefrom.

Figure 44:
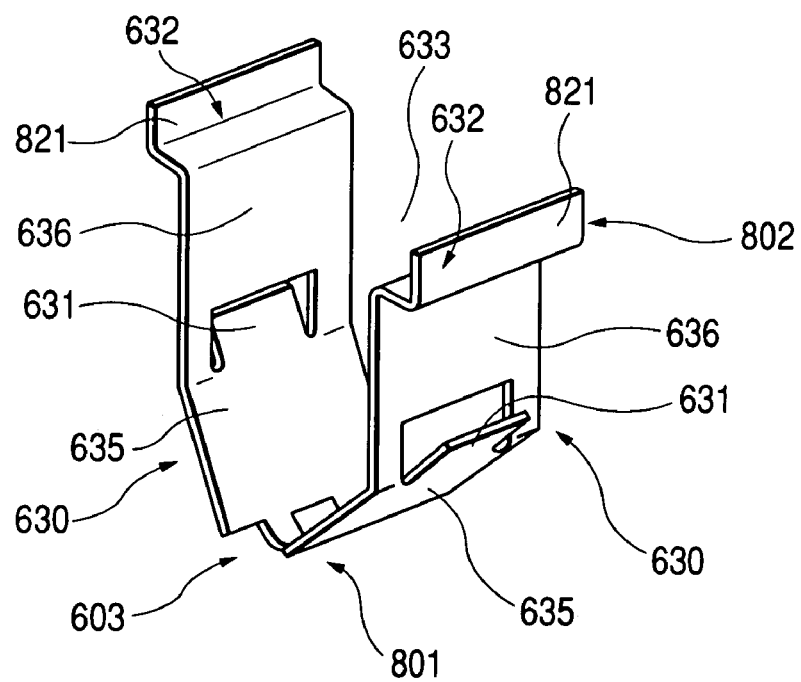
FIG. 44 is a perspective view showing the clip in Embodiment 8.
Figure 45:
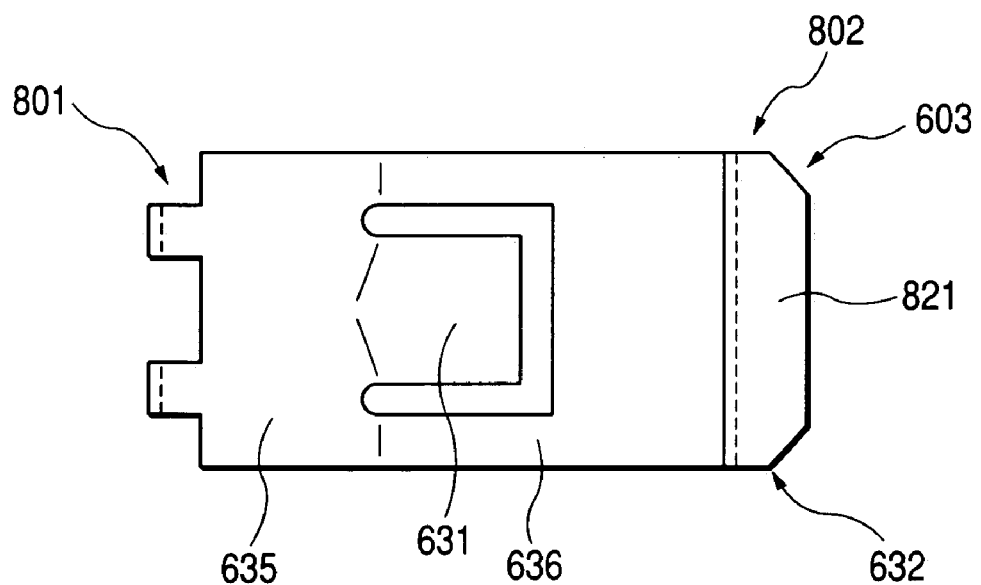
FIG. 45 is a side view showing the clip in Embodiment 8.
Figure 46:
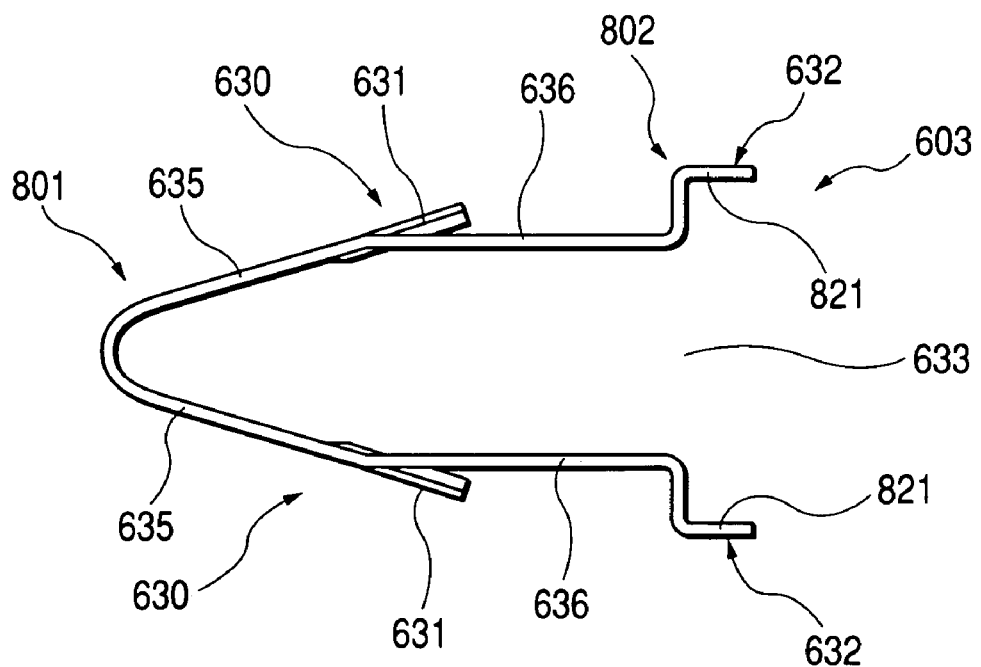
FIG. 46 is a front view showing the clip in Embodiment 8.

As shown in FIG. 44 to FIG. 46, the clip 603 includes a pair of left and right leg portions 630, which is connected only at a distal end 801 thereof, and the pair of leg portions 630 each includes an engaging portion 632, which engages the cushion member 602, and a locking device 631, which is engaged with the body panel 604.

Figure 40:
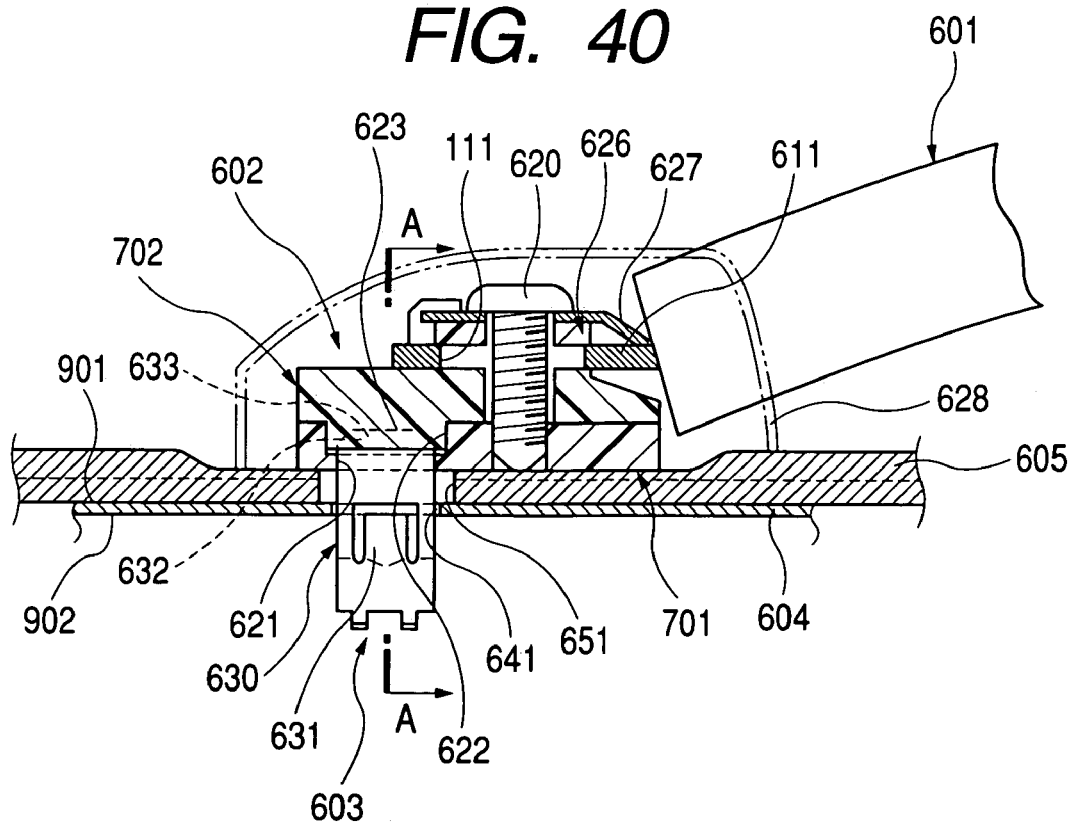
FIG. 40 is an explanatory cross-sectional view illustrating an assist grip mounted to a body panel according to Embodiment 8.
Figure 41:
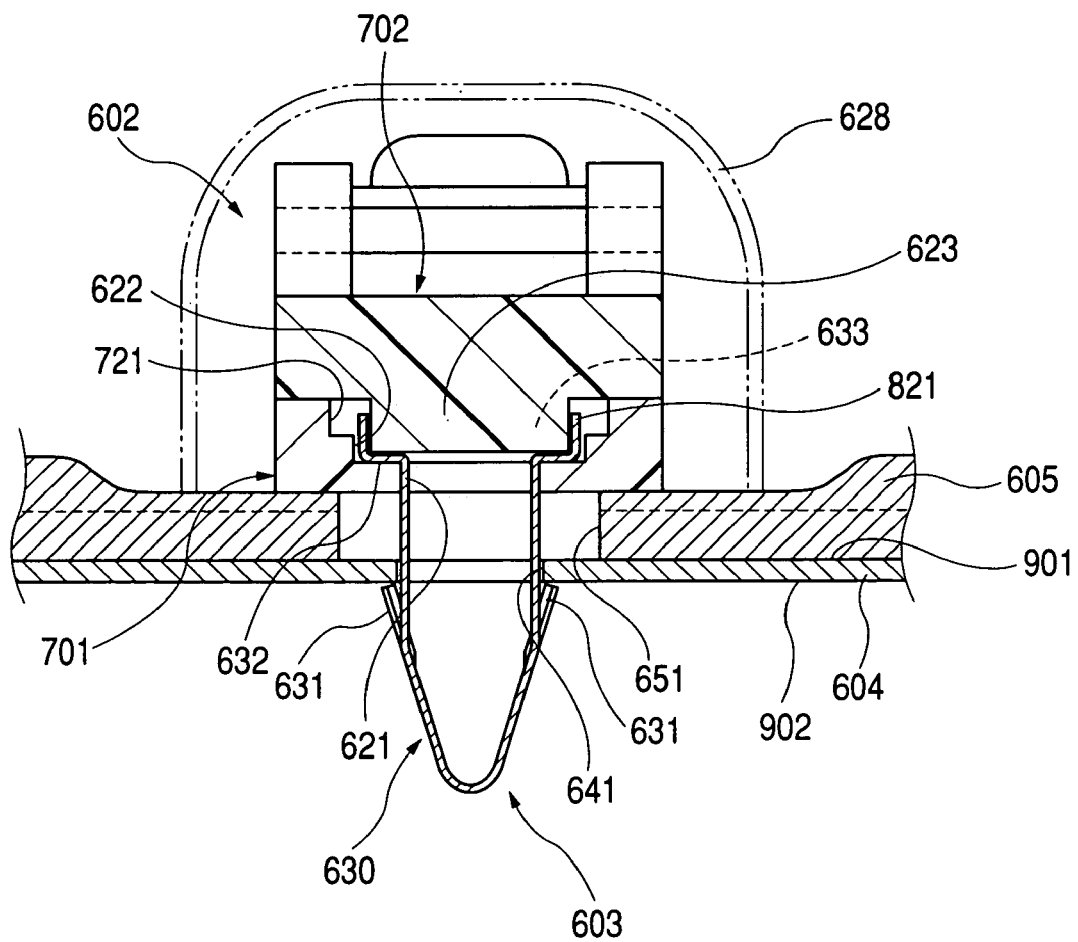
FIG. 41 is an explanatory cross-sectional view taken along the line A—A in FIG. 40, illustrating a state in which the assist grip is mounted to the body panel according to Embodiment 8.
Figure 42:
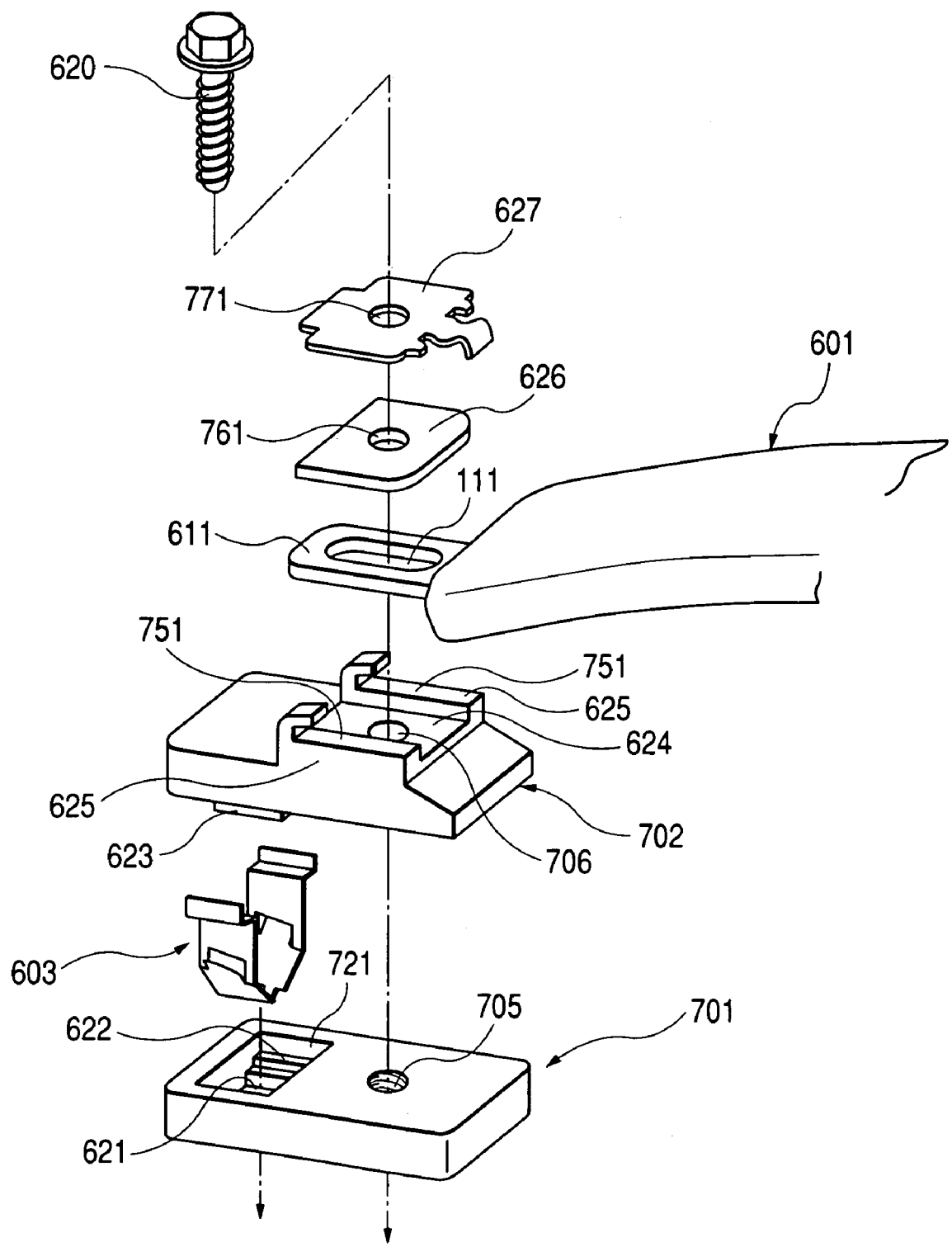
FIG. 42 is an explanatory perspective view showing a state in which the assist grip, a cushion member, and a clip are assembled according to Embodiment 8.

As shown in FIG. 40 to FIG. 42, the assist grip 601 is attached to the body panel 604 by inserting the distal end portion 801 of the clip 603 into a clip insertion hole 621 formed on the cushion member 602 and into a panel hole 641 formed on the body panel 604, catching the locking device 631 of the clip 603 on the peripheral edge of the panel hole 641, and engaging the engaging portion 632 of the clip 603 in the vicinity of the clip insertion hole 621.

In the assist grip 601 mounting structure, a pressure plug 623 is fitted into a gap 633 formed between the rear ends 802 of the pair of leg portions 630 of the clip 603 for preventing the rear end gap portion 633 from narrowing.

The assist grip 601 of Embodiment 8 is intended to mount in a compartment of an automobile, and the term "front side" or "front surface" represents the compartment side, or the surface on the compartment side of the automobile.

As shown in FIG. 40 and FIG. 41, according to Embodiment 8, the cushion member 602 is divided into a first cushion 701 formed with the clip insertion hole 621 and a second cushion 702 connected with the joint member 611 of the assist grip 601 and formed with the pressure plug 623. The second cushion 702 is fixed to the first cushion 701 in a state in which the pressure plug 23 is fitted in the rear end gap portion 33 formed between the rear ends of the clip 603 inserted into the clip insertion hole 621 of the first cushion 701.

The first cushion 701 is provided with an engaged portion 622 for engaging the engaging portion 632 of the clip 603 around the front side of the clip insertion hole 621. Furthermore, the front side of the engaged portion 622 is formed with a space 721 through which the operator can grip the finger grips 821 formed on the clip 603, which will be described later (See FIG. 41).

As shown in FIG. 42, the joint members 611 at both ends of the assist grip 601, each includes an elongated hole 111, and the second cushion 702 includes a recessed groove 624, in which the joint member 611 of the assist grip 601 can be stored, a pair of projections formed on both ends of the recessed groove 624, a spacer 626 for laying over a surface 751 of the pair of projections 625, and a retainer 627 for exerting a resilient force for returning the assist grip 601 to the original position after it is pulled out to the joint member 611.

The joint member 611 of the assist grip 601 is accommodated in the recessed groove 624, clamped between the recessed groove 624 and the spacer 626, and slidably connected to the second cushion 702 so as to be capable of a sliding movement along the recessed groove 624 by inserting a screw 620 engaged with the first cushion 701 into a screw hole 761 formed on the spacer 626 and the elongated hole 111 formed on the joint member 611.

In this manner, by storing the joint member 611 of the assist grip 601 in the recessed grove 624 on the cushion member 602 and allowing the same to slide therein, a stable sliding movement is realized. In addition, by clamping the joint member 611 between the recessed groove 624 of the cushion member 602 and the spacer 626, a smooth sliding movement of the joint member 611 is realized while preventing a load generated by tightening the screw 620 from exerting directly on the joint member 611.

As shown in FIG. 43, an interior panel 605 is provided on the surface on the compartment side of the body panel 604 (front surface 901), and the clip 603 engages the panel hole 641 on the body panel 604 through a through hole 651 formed on the interior panel 605.

As shown in FIG. 44 to FIG. 46, the clip 603 is formed by bending a piece of metal plate, and the pair of leg portions 630 is formed in such a manner that the bent portion comes to the distal end 801.

The pair of leg portions 630 includes, in sequence from the distal end 801 thereof, a guide portion 635 including a pair of bevels, parallel portions 636 including a pair of parallel surfaces continued from the guide portion 635, and engaging portions 632 formed by bending the parallel portions 36 outwardly of he pair of leg portions 630 by about 90°.

In Embodiment 8, the engaging portion 632 includes the finger grip 821 at the distal end thereof formed by further bending the engaging portion 632 by approximately 90°.

The locking device 631 is formed by cutting part of the material of the parallel portion 636 and opening it toward the outside.

As shown in FIG. 40 and FIG. 41, in the assist grip 601 mounting structure, a locking device 631 of the clip 603 is engaged with the peripheral edge of the panel hole 641 of a back surface 902 of the body panel 604, and the engaging portion 632 of the clip 603 engages the engaged portion 622 of the cushion member 602, so that the cushion member 602 and the body panel 604 are clamped between the locking device 631 and the engaging portion 632.

The pressure plug 623 of the second cushion 702 is fitted into the rear end gap portion 633 formed between the rear ends of the clip 603, so that the rear end gap portion 633 is prevented from narrowing. Therefore, the engaging portion 632 of the clip 603 is prevented from coming off the engaged portion 622 of the cushion member 602, and thus the engagement of the engaging portion 632 can stably be maintained. In addition, since the gap 633 between the rear ends is prevented from narrowing, the locking device 631 of the clip 603 is prevented from coming off the peripheral edge of the panel hole 641 of the body panel 604, and thus the locking state of the locking device 631 can stably be maintained.

Therefore, the clip 3 and the first cushion 701 are integrated by the pressure plug 623 of the second cushion 702, and the assist grip 601 can be attached to the body panel 604 stably via the first cushion 701 and the second cushion 702. Therefore, according to the mounting structure of Embodiment 8, a high mounting strength of the assist grip 601 with respect to the body panel 604 is achieved.

Figure 47:
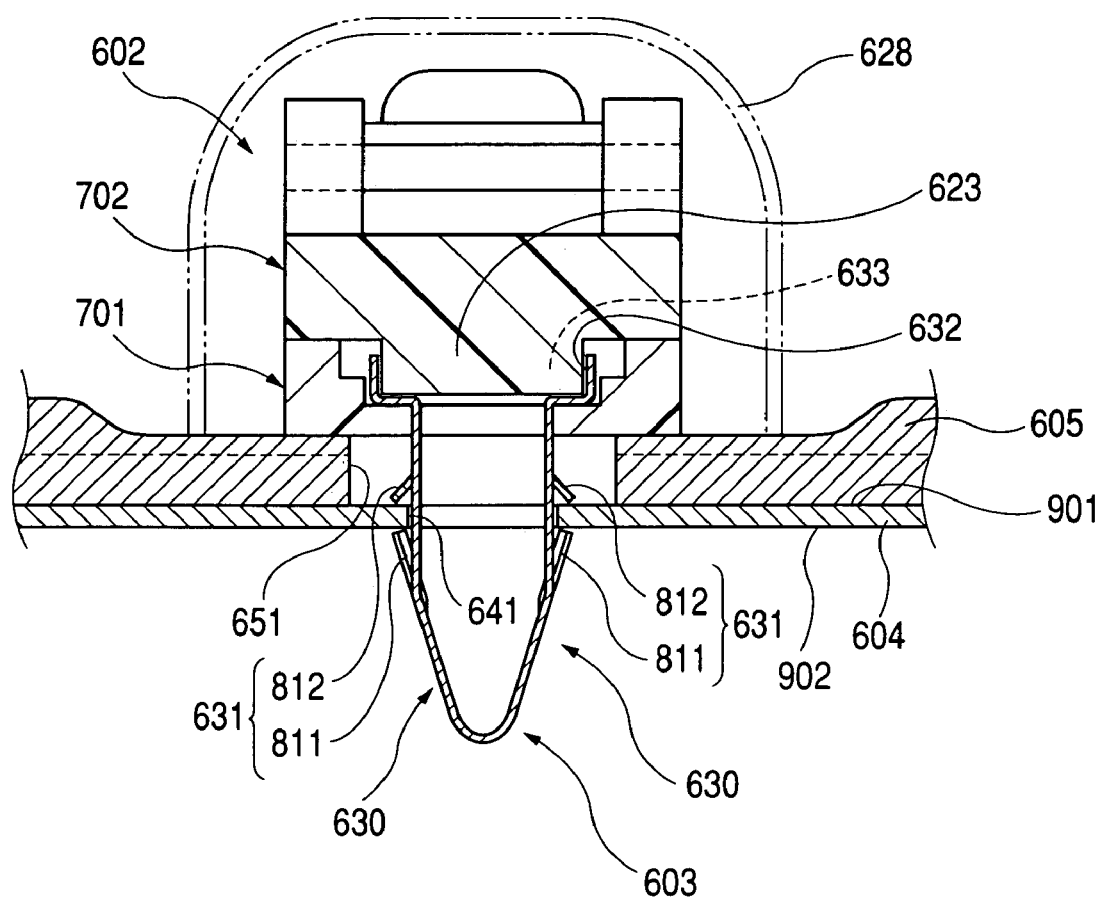
FIG. 47 is an explanatory cross-sectional view taken along the line A—A in FIG. 40, illustrating a state in which the assist grip is mounted to the body panel with another clip according to Embodiment 8.

As shown in FIG. 47, the locking device 631 formed on each leg portion 630 of the clip 603 includes a first locking pawl 811 to be inserted into the panel hole 641 on the body panel 604 and engaged with the back surface 902 of the body panel 604, and a second locking pawl 812 to be engaged with the front surface 901 of the body panel 604. In this arrangement, by clamping the body panel 604 between the first locking pawl 811 and the second locking pawl 812 of the clip 603, the mounting strength of the assist grip 601 can further be improved.

A method of mounting the assist grip 1 on the body panel 604 will now be described.

As shown in FIG. 42, the clip 3 is inserted into the clip insertion hole 621 of the first cushion 701, and the engaging portions 632 of the pair of leg portions 630 of the clip 603 are engaged with the engaged portion 622 of the first cushion 701. Then, the second cushion 702 is disposed on the first cushion 701, and the pressure plug 623 of the second cushion 702 is fitted into the rear end gap portion 633 of the clip 603 disposed on the first cushion 701.

Then, the joint member 611 of the assist grip 601 is inserted into the recessed groove 624 of the second cushion 702, and the spacer 626 is laid on the surfaces 751 of the pair of projections 625 and, simultaneously, the retainer 627 is disposed on the spacer 626.

Subsequently, the screw 620 is inserted into a screw hole 771 on the retainer 627, the screw hole 761 on the spacer 626, the elongated hole 111 on the joint member 611, and a screw hole 706 on the second cushion 702, and then is screwed into a female threaded portion 705 of the first cushion 701, so that the assist grip 601, the first cushion 701, the second cushion 702, and the clip 603 are integrally assembled into a semi-assembly 610 (See FIG. 48).

Figure 48:
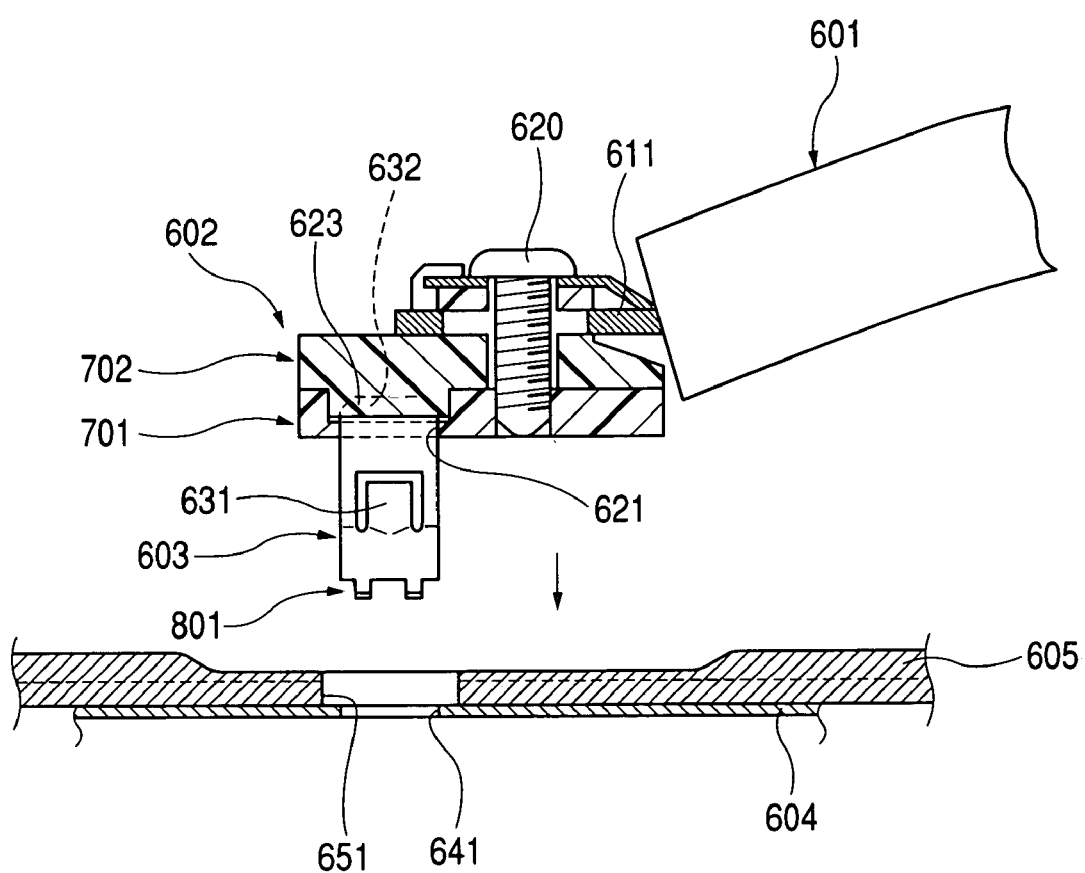
FIG. 48 is an explanatory drawing showing a state in which a semi-assembly is mounted to the body panel according to Embodiment 8.

As shown in FIG. 48, the semi-assembly 610 can be attached to the body panel 604 through one-touch operation by inserting the distal end 801 of the clip 603 and the locking devices 631 of the semi-assembly 610 into the panel hole 641 on the body panel 604, and engaging the locking device 631 of the clip 603 on the peripheral edge of the panel hole 641 on the back surface 902 of the body panel 604.

Therefore, it is not necessary to turn the screw 620 for mounting the assist grip 1 under the condition in which the working property is not good, and thus mounting work can be made easily.

After the assist grip 1 is mounted, since the engaging portion 632 is slidable with respect to the cushion member 602 along the elongated hole 111, the assist grip 601 can be pulled out easily for use (See FIG. 43).

Figure 49:
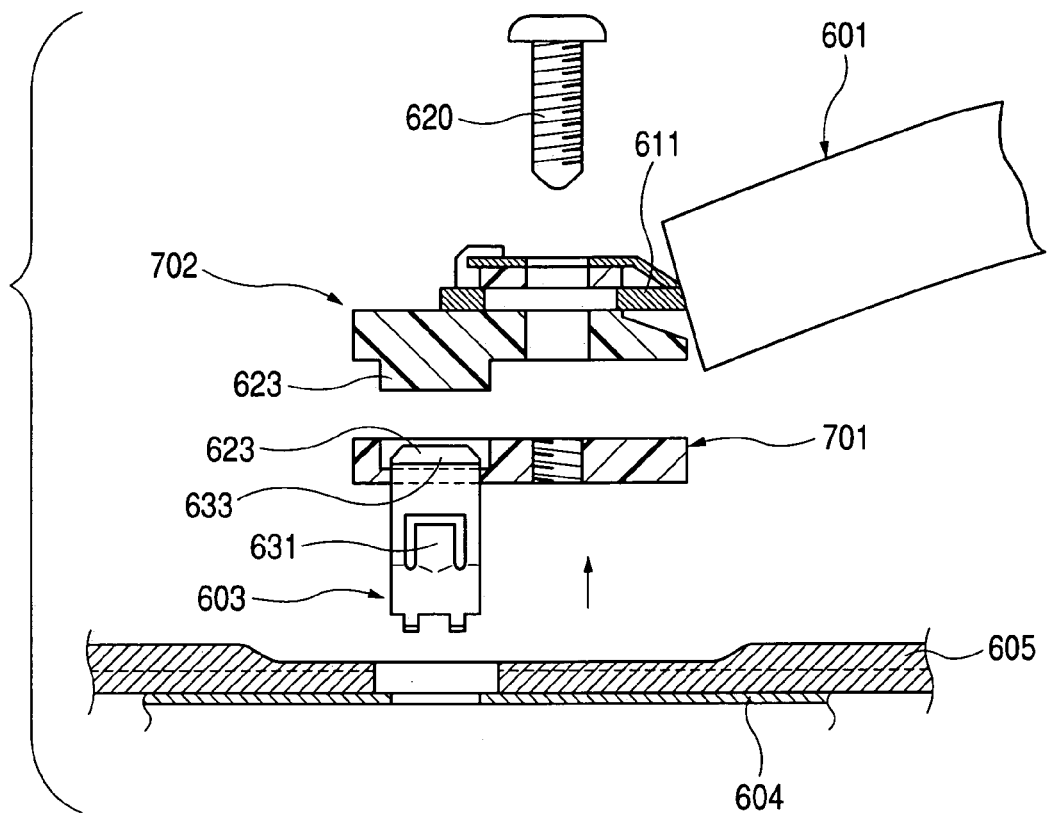
FIG. 49 is an explanatory drawing showing a state in which the assist grip is removed from the body panel according to Embodiment 8.

As shown in FIG. 49, when the assist grip 601 has to be removed, for example, in the case of maintenance, after the pressure plug 623 is pulled out, the clip 603 can be resiliently deformed by narrowing the rear end gap portion 633 by pinching the finger grips 821 of the pair of leg portions 630. Therefore, by releasing the locking device 631 of the clip 603 from the peripheral edge of the panel hole 641, the assist grip 601, the first cushion 701, the second cushion 702, and the clip 603 can all be removed from the body panel 604.

Therefore, according to the mounting structure of Embodiment 8, the assist grip 601, the first cushion 701, the second cushion 702, and the clip 603 can all be attached and removed easily with respect to the body panel 604.

(Embodiment 9)

Figure 50:
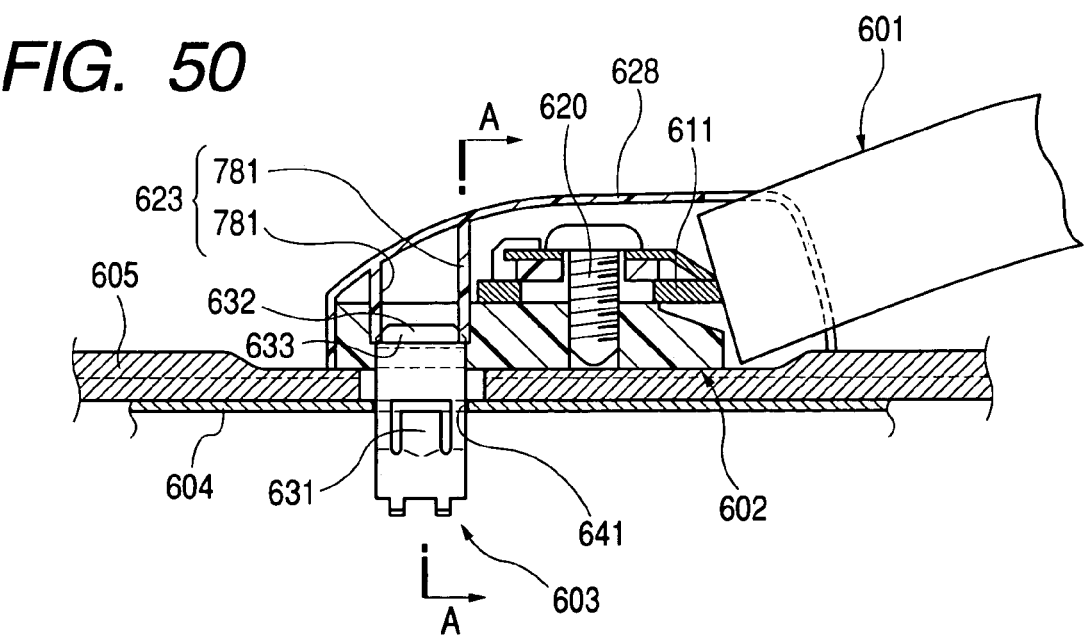
FIG. 50 is an explanatory cross-sectional view showing a state in which the assist grip is mounted to the body panel according to Embodiment 9.
Figure 51:
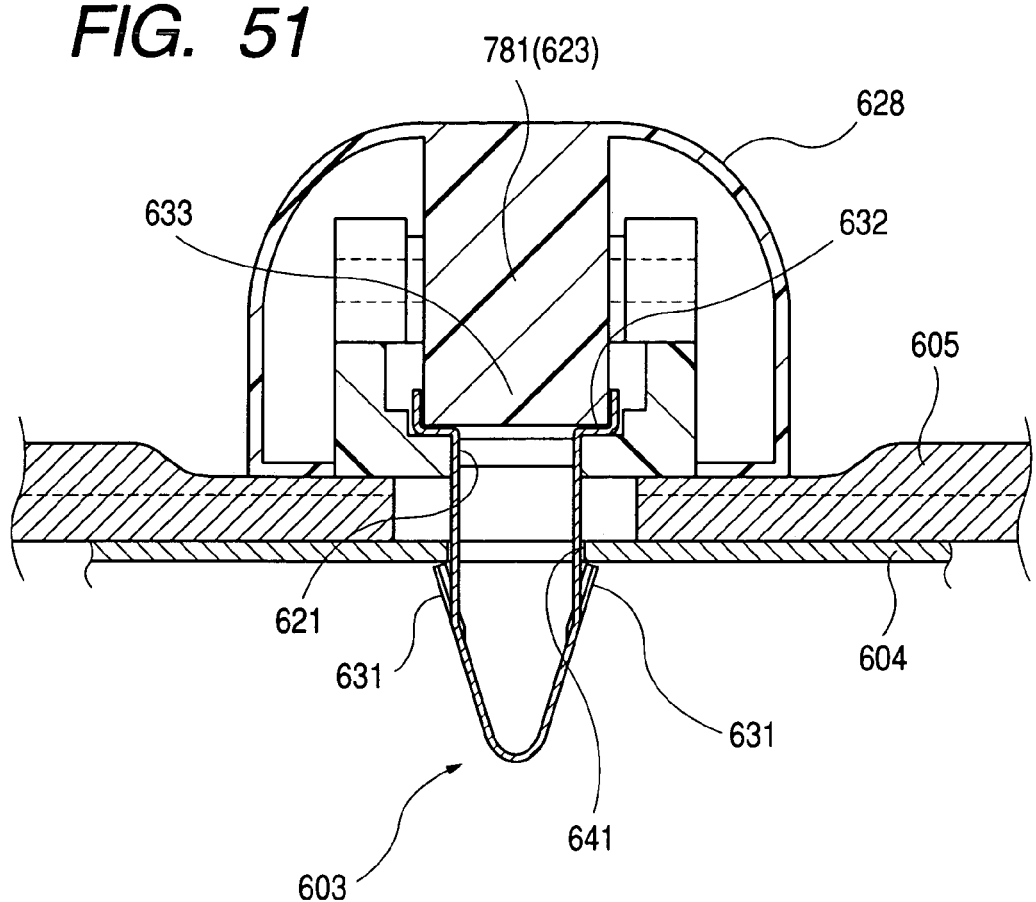
FIG. 51 is an explanatory cross-sectional drawing taken along the line A—A in FIG. 50, illustrating a state in which the assist grip is mounted to the body panel according to Embodiment 9.

As shown in FIG. 50 and FIG. 51, in the assist grip 601 mounting structure according to Embodiment 9, the cushion material 602 is not divided, and the pressure plug 623 is provided on a cap 628, which covers the cushion member 602 and the clip 603 and is detachable with respect to the cushion member 602.

Figure 52:
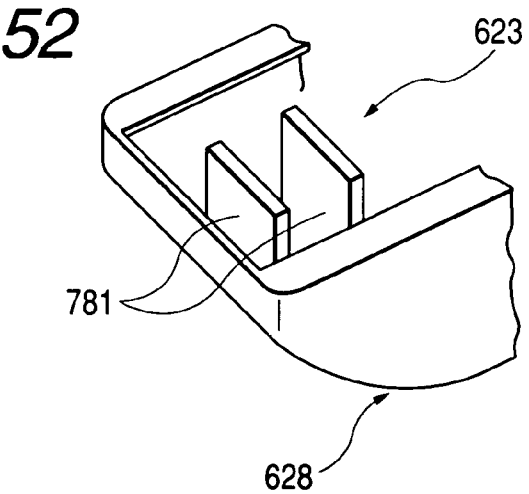
FIG. 52 is a perspective view showing a cap, which is provide with a pressure plug constructed of a plurality of plate strips according to Embodiment 9.

As shown in FIG. 52, the pressure plug 623 of Embodiment 9 includes a plurality of (two in this embodiment) plate strips (ribs) 781 to be inserted between the rear ends 802 of the pair of leg portions 640 of the clip 603.

Accordingly, a function to prevent narrowing of the rear end gap portion 633 of the clip 603 may easily be provided on the pressure plug 623, and thus reduction in weight of the pressure plug 623 may be realized. In addition, since the pressure plug 623 is formed of the plate strips 781, generation of surface sink may be prevented from occurring on the surface of the cap 628. Other constructions in Embodiment 9 are the same as in the first embodiment.

The plate strips 781 may be connected by a reinforcing strip (reinforcing rib) 782 with each other. In this case, the strength of the pressure plug 623 owing to the plurality of plate strips 781 may be improved by providing deflection-proof properties to the plate strips 781.

Figure 53:
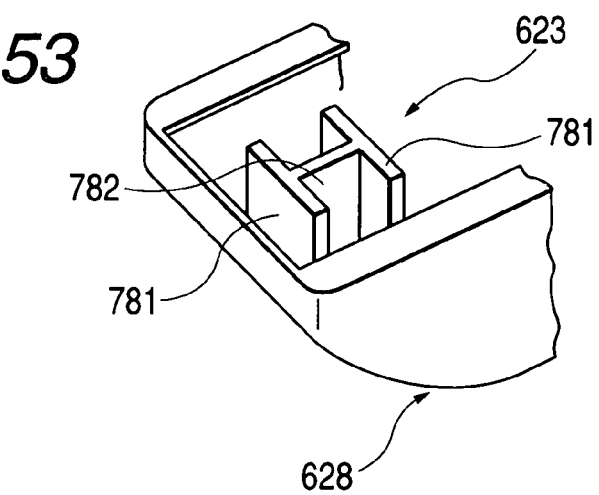
FIG. 53 is a perspective view showing a cap, which is provided with a pressure plug of H-shape in cross section according to Embodiment 9.
Figure 54:
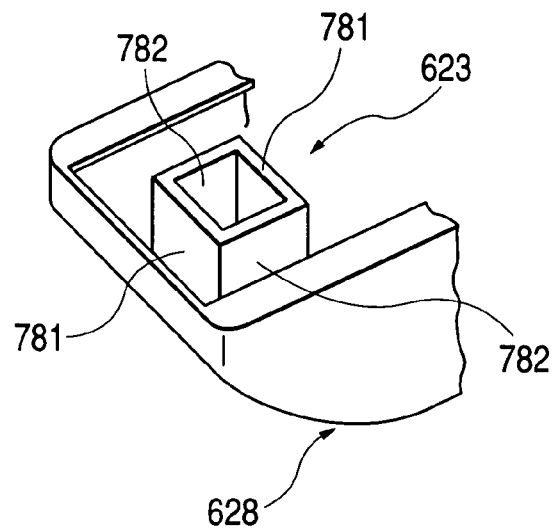
FIG. 54 is a perspective view showing a cap, which is provided with a pressure plug of annular shape in cross section according to Embodiment 9.

As a mode of the reinforcing strip 782, as shown in FIG. 53 for example, the pressure plug 623 may have a H-shape in cross section with two plat strips 781 and one reinforcing strip 782. Alternatively, the pressure plug 623 may have an annular cross section with two plate strips 781 and two reinforcing strips 782, as shown in FIG. 54.

Figure 55:
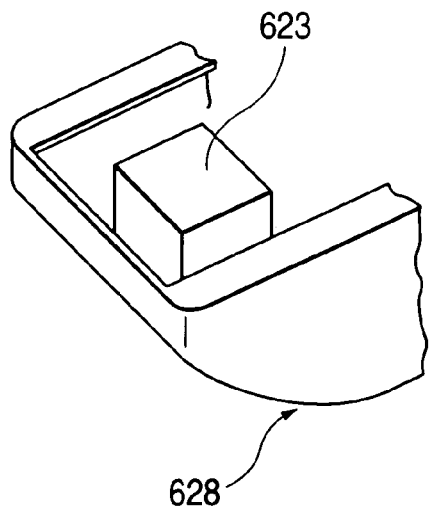
FIG. 55 is a perspective view showing a cap, which is provided with a pressure plug having solid core cross section according to Embodiment 9.

As shown in FIG. 55, the pressure plug 623 may have a solid core cross-section, as a matter of course. The various modes of the pressure plug 623 may be employed not only in the cap 628, but also in the case where the pressure plug 623 is provided on the cushion member 602 (the second cushion 702) shown in Embodiment 8.

When the assist grip 601 is mounted to the body panel 604, the clip 603 is inserted into the clip insertion hole 621 of the cushion member 602 and simultaneously, the assist grip 601 is slidably attached to the cushion member 602 to form the semi-assembly 610 as in the case of Embodiment 8.

Then, the semi-assembly 610 can be attached to the body panel 604 through one-touch operation by inserting the distal end 801 and the locking device 631 of the clip 603 in the semi-assembly 610 into the panel hole 641 of the body panel 604, and engaging the locking device 631 of the clip 603 on the peripheral edge of the panel hole 641 of the back surface 902 of the body panel 604.

Subsequently, by mounting the cap 628, the pressure plug 623 (the plurality of plate strips 781) of the cap 628 is fitted into the rear end gap portion 633 of the clip 603, the assist grip 601 is completely mounted.

When the assist grip 601 has to be removed, the assist grip 601, the first cushion 701, the second cushion 702, and the clip 603 can all be removed from the body panel 604 by removing the cap 628, pinching the finger grips 821 of the pair of leg portions 630 of the clip 603 and releasing the locking device 631 of the clip 603 from the peripheral edge of the panel hole 641, as in the case of Embodiment 8.

Therefore, according to the mounting structure of Embodiment 9, the assist grip 601, the cushion member 602 and the clip 603 can all be attached and detached with respect to the body panel 604. The other effects as in Embodiment 8 may be achieved in Embodiment 9 as well.

(Embodiment 10)

Figure 56:
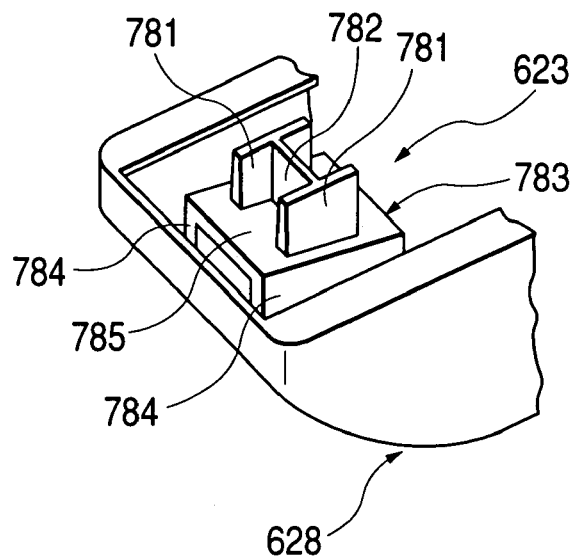
FIG. 56 is a perspective view showing a cap, which is provided with a pressure plug of H-shape in cross section at an upright portion, according to Embodiment 10.
Figure 57:
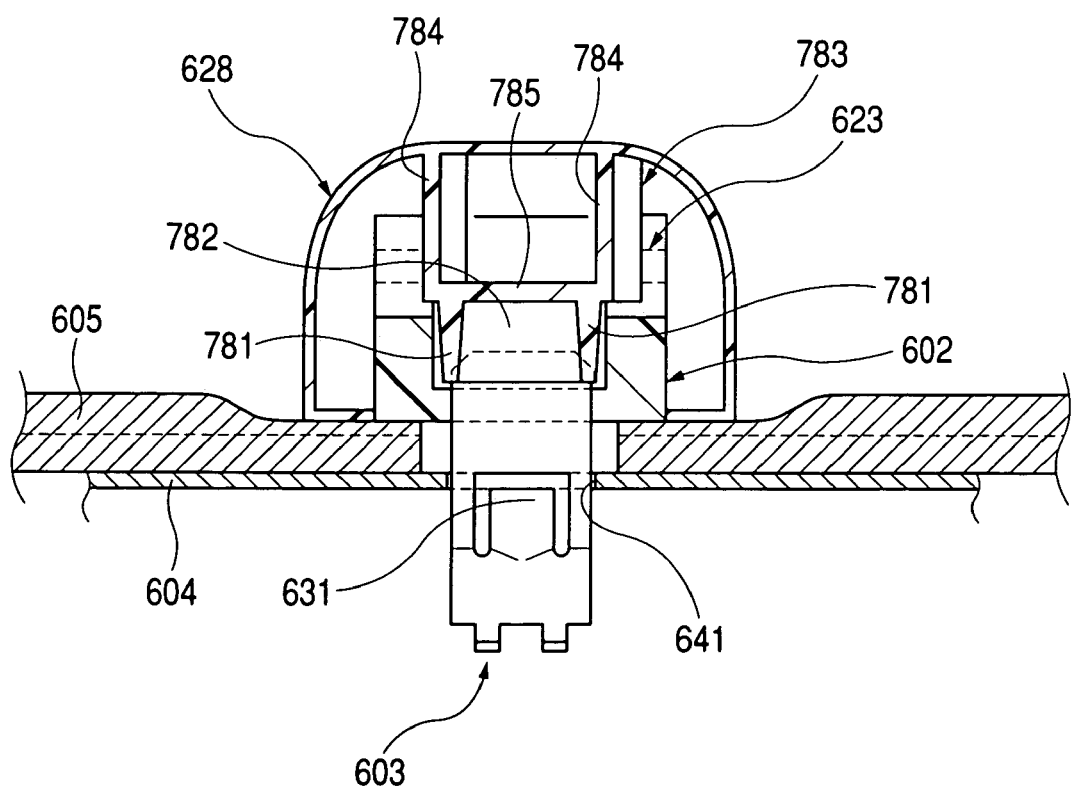
FIG. 57 is an explanatory cross sectional view taken along the line A—A in FIG. 50, illustrating a state in which the assist grip is mounted to the body panel, according to Embodiment 10.
Figure 58:
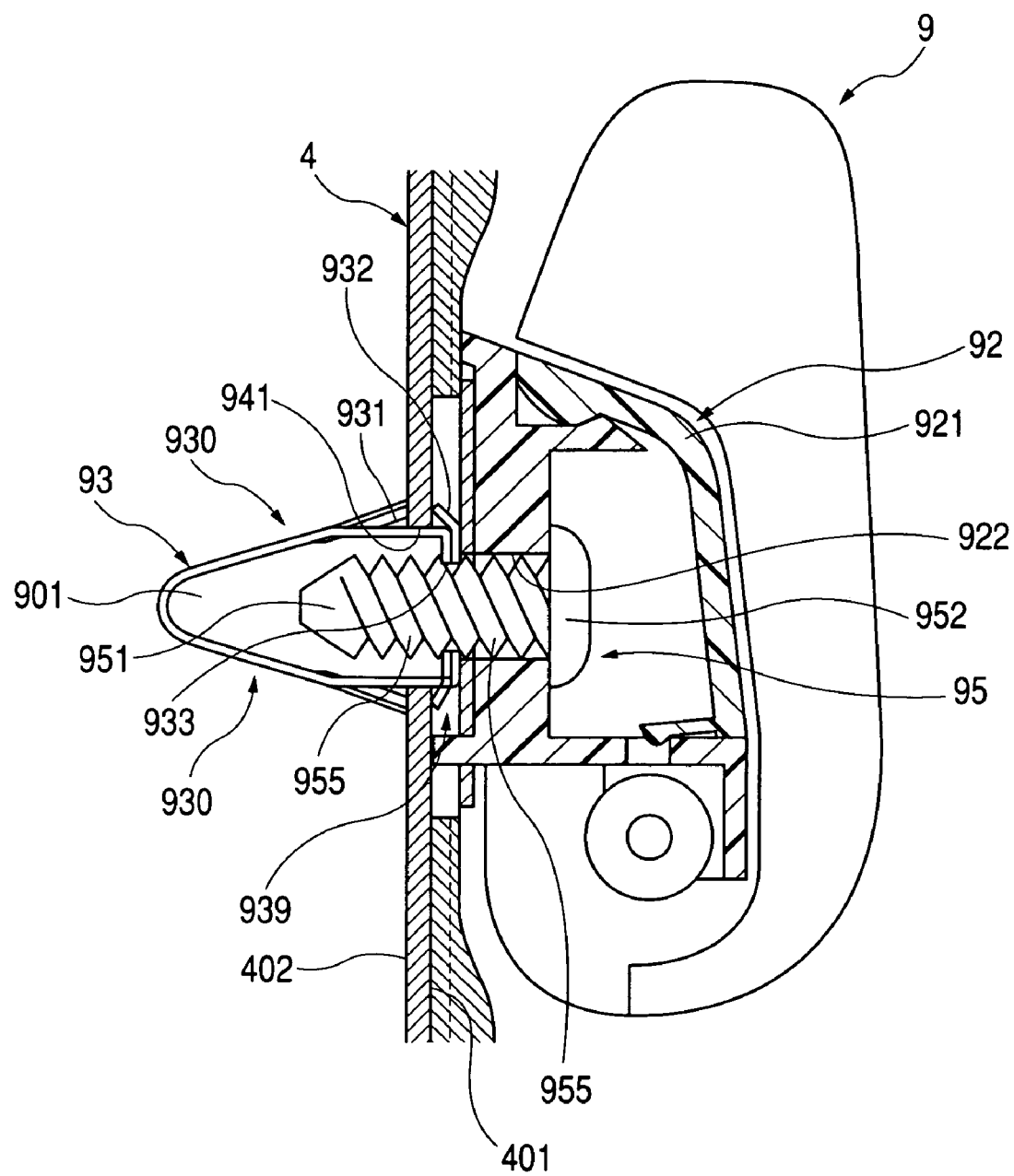
FIG. 58 is an explanatory cross-sectional view showing a mounting structure of the assist grip in the related art.
Figure 59:
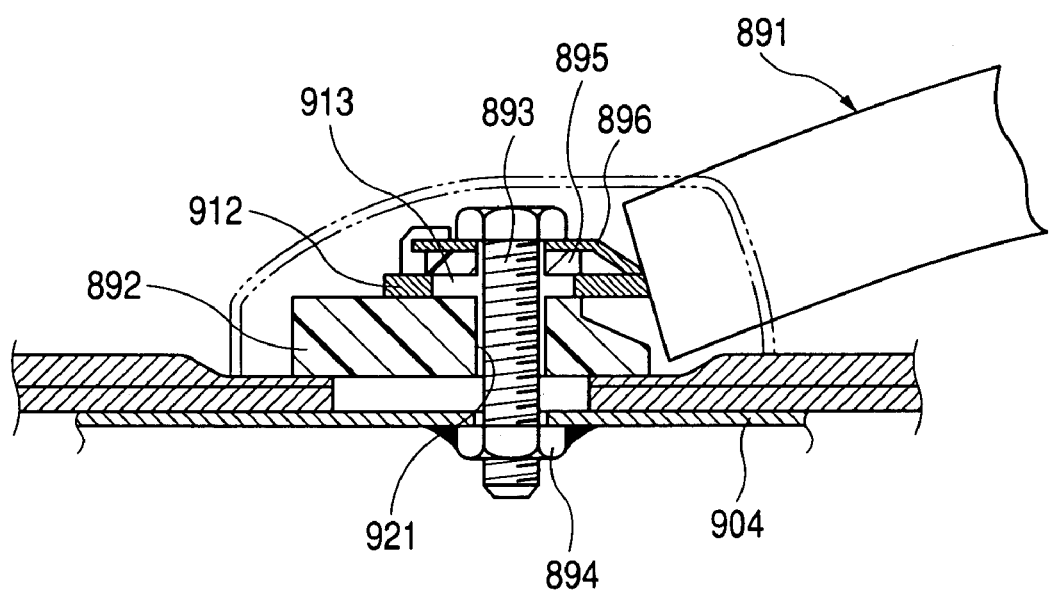
FIG. 59 is an explanatory cross section showing a mounting structure of the assist grip in the related art.

As shown in FIG. 56 and FIG. 57, in the assist grip 601 mounting structure of this embodiment, the pressure plug 623 formed of the plate strips 781 is provided on the cap 628 as in Embodiment 9. The pressure plug 623 of Embodiment 10 is provided on a seat portion 783 projecting upright from the back surface of the cap 628. The seat portion 783 can be constructed of a pair of upright portions 784 and a plate portion 785 extending therebetween, and may be inclined with respect to the cap 628.

The plate strips 781 may have a cross-sectional area, which increases in thickness toward the proximal end.

Although the pressure plug 623 in Embodiment 10 is formed into the H-shape in cross section with the two plate strips 781 and the reinforcing strip 782 connecting therebetween, other various modes may be employed as in Embodiment 9.

According to the cap 628 in Embodiment 10, generation of surface sink may be prevented further effectively from occurring on the surface of the cap 628. In Embodiment 10, the same effects as in Embodiment 9 may be achieved.

What is claimed is:

1. A vehicle assist grip structure for mounting on a vehicle interior panel, comprising:
    an attachment part including a clip insertion hole;
    an assist grip body member rotatably coupled to at least one end of said attachment part;
    a clip that is separate from said attachment part and that includes a pair of leg portions that are connected at a distal end thereof so as to be resiliently deformable, said pair of leg portions forming a rear end gap portion at a rear end thereof, said clip being inserted both through said clip insertion hole in said attachment part and through a panel hole in said panel to affix said attachment part to said panel; and
    a pressure plug fitted into said rear end gap portion of said clip to thereby prevent narrowing of a gap formed between said pair of leg portions.

2. A mounting structure according to claim 1, wherein at least one of said leg portions includes a locking device for engaging with a portion of said panel at a vicinity of said panel hole and an engaging portion for engaging a peripheral edge of said clip insertion hole formed in said attachment part.

3. A mounting structure of a vehicle interior part on a panel, comprising:
    a clip having a pair of leg portions connected at a distal end thereof so as to be resiliently deformable, and forming a rear end gap portion at a rear end thereof, said clip for being inserted into a panel hole formed on said panel and a clip insertion hole formed in said vehicle interior part;
    a pressure plug fitted into said rear end gap portion of said clip to thereby prevent narrowing of a gap formed between said pair of leg portions;
    an interior panel disposed on a front surface of said panel, said vehicle interior part includes an opposing surface that opposes said panel, and a body contact portion formed on said opposing surface,
    said opposing surface abuts against said interior panel, and said body contact portion abuts against said panel, wherein
    a reinforcing plate having a through hole, which communicates with said clip insertion hole, is disposed on an opposing surface of said vehicle interior part, and
    the distal end of the clip is inserted into said through hole on said reinforcing plate, so that said opposing surface of said vehicle interior part abuts against said interior panel, and said body contact portion abuts against said panel.

4. A mounting structure according to claim 2, wherein said locking device includes a first locking pawl, which is inserted into said panel hole and engages a back surface of said panel, and a second locking pawl, which engages the front surface of said panel.

5. A mounting structure according to claim 1, wherein a rear end of said pressure plug and the rear end of said clip are covered by a cap that is integrally hinged to said attachment part.

6. A mounting structure according to claim 5, wherein said pressure plug is formed integrally on a back surface of said cap.

7. A mounting structure according to claim 5, wherein said cap is separately formed from said attachment part.

8. A mounting structure according to claim 1, wherein said clip is formed from a metal plate.

9. A mounting structure according to claim 2, wherein said locking portion is formed separately from said engaging portion.

* * * * *